United States Patent
Li et al.

(10) Patent No.: US 11,726,317 B2
(45) Date of Patent: Aug. 15, 2023

(54) WAVEGUIDES HAVING INTEGRAL SPACERS AND RELATED SYSTEMS AND METHODS

(71) Applicant: Magic Leap, Inc., Plantation, FL (US)

(72) Inventors: Ling Li, Cedar Park, TX (US); Ali Karbasi, Coral Gables, FL (US); Christophe Peroz, San Francisco, CA (US); Chieh Chang, Cedar Park, TX (US); Sharad D. Bhagat, Austin, TX (US); Brian George Hill, Duxbury, MA (US); Melanie Maputol West, San Francisco, CA (US); Ryan Jason Ong, Austin, TX (US); Xiaopei Deng, Cedar Park, TX (US); Shuqiang Yang, Austin, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 455 days.

(21) Appl. No.: 16/909,922

(22) Filed: Jun. 23, 2020

(65) Prior Publication Data
US 2020/0400941 A1    Dec. 24, 2020

Related U.S. Application Data

(60) Provisional application No. 62/908,247, filed on Sep. 30, 2019, provisional application No. 62/865,689, filed on Jun. 24, 2019.

(51) Int. Cl.
*G02B 27/00* (2006.01)
*G02B 27/01* (2006.01)

(52) U.S. Cl.
CPC ..... *G02B 27/0006* (2013.01); *G02B 27/0172* (2013.01); *G02B 27/0176* (2013.01);
(Continued)

(58) Field of Classification Search
CPC ............ G02B 27/0006; G02B 27/0172; G02B 27/0176; G02B 2027/016; G02B 7/017; G02B 2027/0169
See application file for complete search history.

(56) References Cited

U.S. PATENT DOCUMENTS

| | | |
|---|---|---|
| 6,832,037 B2 | 12/2004 | Aylward et al. |
| 6,850,221 B1 | 2/2005 | Tickle |

(Continued)

FOREIGN PATENT DOCUMENTS

| | | |
|---|---|---|
| CA | 2976955 | 9/2016 |
| WO | WO 2016/141372 | 9/2016 |

(Continued)

OTHER PUBLICATIONS

International Preliminary Report on Patentability in International Appln. No. PCT/US2020/039199, dated Jan. 6, 2022, 21 pages.
(Continued)

*Primary Examiner* — Roy P Rabindranath
(74) *Attorney, Agent, or Firm* — Fish & Richardson P.C.

(57) ABSTRACT

A head-mounted, near-eye display system comprises a stack of waveguides having integral spacers separating the waveguides. The waveguides may each include diffractive optical elements that are formed simultaneously with the spacers by imprinting or casting. The spacers are disposed on one or more major surfaces of the waveguides and define a distance between immediately adjacent waveguides. Adjacent waveguides may be bonded using adhesives on the spacers. The spacers may fit within indentations of overlying waveguides. In some cases, the spacers may form one or more walls of material substantially around a perimeter of an associated waveguide. Vent holes may be provided in the walls to allow gas flow into and out from an interior volume defined by the spacers. Debris trapping structures may be provided (Continued)

between two walls of spacers to trap and prevent debris from entering into the interior volume.

48 Claims, 47 Drawing Sheets

(52) U.S. Cl.
CPC .............. *G02B 2027/0161* (2013.01); *G02B 2027/0169* (2013.01)

(56) References Cited

U.S. PATENT DOCUMENTS

| | | | |
|---|---|---|---|
| 7,228,051 | B2 | 6/2007 | Cok et al. |
| 7,974,505 | B2 | 7/2011 | Hill et al. |
| 8,917,962 | B1 | 12/2014 | Nichol |
| 2004/0071405 | A1 | 4/2004 | Baney et al. |
| 2006/0028436 | A1 | 2/2006 | Armstrong |
| 2007/0081123 | A1 | 4/2007 | Lewis |
| 2008/0085089 | A1 | 4/2008 | Catching et al. |
| 2012/0099820 | A1 | 4/2012 | Rolston et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0188118 | A1 | 7/2013 | Oka et al. |
| 2013/0208234 | A1 | 8/2013 | Lewis |
| 2013/0242262 | A1 | 9/2013 | Lewis |
| 2014/0071539 | A1 | 3/2014 | Gao |
| 2014/0168260 | A1* | 6/2014 | O'Brien ................... G02B 6/00 385/134 |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0116739 | A1 | 4/2016 | TeKolste et al. |
| 2017/0205618 | A1 | 7/2017 | Basset et al. |
| 2017/0276948 | A1 | 9/2017 | Welch et al. |
| 2017/0322376 | A1 | 11/2017 | Wu et al. |
| 2018/0059320 | A1 | 3/2018 | Miller et al. |
| 2018/0267312 | A1 | 9/2018 | Melli |
| 2018/0299607 | A1* | 10/2018 | Menezes .............. G02B 6/0016 |
| 2018/0348429 | A1 | 12/2018 | Young et al. |
| 2019/0004215 | A1* | 1/2019 | Black .................. H01L 21/0273 |
| 2019/0111642 | A1* | 4/2019 | Chang ................. B29C 35/0888 |
| 2019/0212597 | A1* | 7/2019 | Waldern .................. G03F 7/027 |
| 2020/0310131 | A1* | 10/2020 | Ide ........................ G02B 13/004 |
| 2020/0408969 | A1* | 12/2020 | Yoon .................... G02B 6/0016 |
| 2021/0109278 | A1 | 4/2021 | Peroz et al. |
| 2021/0157032 | A1 | 5/2021 | Peroz et al. |
| 2021/0384574 | A1* | 12/2021 | Ito ......................... B32B 15/085 |

FOREIGN PATENT DOCUMENTS

| | | |
|---|---|---|
| WO | WO 2019/195193 | 10/2019 |
| WO | WO 2019195186 | 10/2019 |
| WO | WO 2020263866 | 12/2020 |

OTHER PUBLICATIONS

International Search Report and Written Opinion, re PCT Application No. PCT/US19/25236, dated Aug. 6, 2019.
International Preliminary Report for Patentability, re PCT Application No. PCT/US19/25236, dated Oct. 6, 2020.
International Search Report and Written Opinion, re PCT Application No. PCT/US2020/039199, dated Nov. 4, 2020.
ARToolKit: https://web.archive.org/web/20051013062315/http://www.hitl.washington.edu:80/artoolkit/documentation/hardware.htm, archived Oct. 13, 2005.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

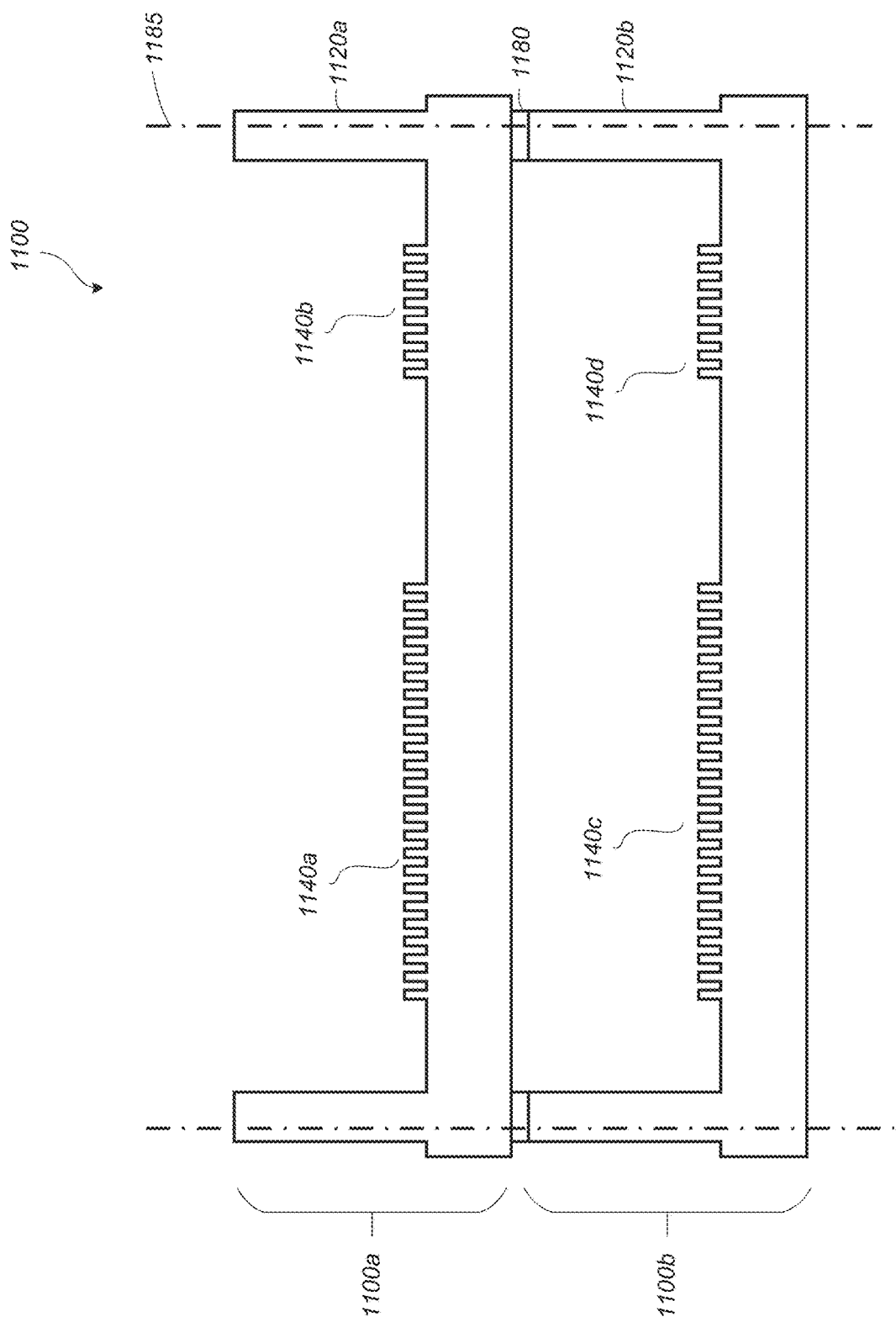

WAVEGUIDES HAVING INTEGRAL SPACERS AND RELATED SYSTEMS AND METHODS

PRIORITY CLAIM

This application claims the benefit of priority of U.S. Provisional Application No. 62/865,689, filed on Jun. 24, 2019; and U.S. Provisional Application No. 62/908,247, filed on Sep. 30, 2019. Each of these provisional applications is incorporated herein by reference.

INCORPORATION BY REFERENCE

This application incorporates by reference the entirety of each of the following patent applications: PCT Application No. PCT/US2019/025224 filed on Apr. 1, 2019, entitled HYBRID POLYMER WAVEGUIDE AND METHODS FOR MAKING THE SAME; U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Some aspects relate to a display system comprising: a stack of waveguides, the stack of waveguides comprising: a first waveguide comprising an optically transmissive body, a first major surface, and a spacer integral with the optically transmissive body, the spacer extending vertically from the first major surface; a second waveguide comprising an optically transmissive body and a second major surface, the second major surface facing and spaced apart from the first major surface of the first waveguide by the spacer; and an adhesive provided on a top surface of the spacer, the adhesive attaching the spacer to the second major surface of the second waveguide, wherein the adhesive has an as-deposited viscosity of 10 mPa·s to 100 mPa·s. In some embodiments, the spacer extends along a perimeter of the first waveguide. In some embodiments, the spacer defines an edge of the waveguide. In some embodiments, the adhesive constitutes a first adhesive, and wherein the stack of waveguides further comprises a second adhesive forming an adhesive mass extending between and attaching the first major surface of the first waveguide to the second major surface of the second waveguide. In some embodiments, the first adhesive and the second adhesive have different viscosities. In some embodiments, the second adhesive has an as-deposited viscosity of 10,000 mPa·s to 50,000 mPa·s. In some embodiments, the adhesive is located peripherally to the spacer on the first major surface of the first waveguide. In some embodiments, the first waveguide further comprises one or more diffractive optical elements in an area of the first major surface interior of the spacer. In some embodiments, the first major surface of the first waveguide further comprises an adhesive-trapping depression between the one or more diffractive optical elements and the adhesive. In some embodiments, the adhesive is disposed on the top surface and on lateral sides of the spacer. In some embodiments, the first waveguide comprises a plurality of spacers. In some embodiments, one or more surfaces contacting the adhesive are rough or have a texture that is not smooth. In some embodiments, the spacer comprises one or more vent holes extending laterally through the spacer. In some embodiments, the first waveguide comprises a plurality of spacers, wherein each spacer comprises one or more vent holes. In some embodiments, pairs of spacers of spacers of the plurality of spacers are laterally elongated alongside one another, wherein the stack of waveguides further comprises one or more debris trapping structures located in a volume between adjacent pairs spacers of the plurality of spacers. In some embodiments, the spacer is located in an interior area of the first major surface of the first waveguide. In some embodiments, the spacer comprises a single point contact spacer having a maximum transverse cross-sectional dimension of 500 µm or less. In some embodiments, the second major surface of the second waveguide comprises an indentation accommodating the spacer in the indentation. In some embodiments, the stack of waveguides comprises a plurality of waveguides, wherein two or more waveguides of the plurality of waveguides comprise a spacer and an indentation, wherein the indentations accommodate spacers of underlying waveguides. In some embodiments, the spacer comprises a shape selected from the group consisting of rectangular prism, rectangular pyramid, triangular prism, triangular pyramid, cylinder, and cone. In some embodiments, the adhesive comprises a light absorber. In some embodiments, the adhesive is doped with a black colorant. In some embodiments, the first and the second waveguide are separated an air gap having a size defined by the spacer and adhesive.

In some embodiments, the adhesive has a refractive index greater than 1.65. In some embodiments, the first and second waveguides each comprise: in-coupling optical elements configured to in-couple incident image light; and out-coupling optical elements configured to out-couple the in-coupled image light. In some embodiments, the display system further comprises a light projector system configured to project the image light to the in-coupling optical elements. In some embodiments, the spacer comprises a light absorbing material.

Some aspects relate to a display system comprising: an eyepiece comprising: a waveguide comprising: an optically transmissive body comprising at least one spacer integral with the optically transmissive body; and out-coupling optical elements configured to out-couple light propagating within the optically transmissive body; and an overlying waveguide spaced from the waveguide by the at least one spacer; and a pillar formed of an adhesive attaching the optically transmissive body to a surface of an overlying waveguide. In some embodiments, the out-coupling optical elements comprise a plurality of protrusions and intervening recesses on a major surface of the optically transmissive body, wherein the at least one spacer extends from the major surface to a height greater than a height of the plurality of protrusions. In some embodiments, the adhesive has an as-deposited viscosity of 10,000 mPa·s to 50,000 mPa·s. In some embodiments, the waveguide comprises a pair of integral spacers, wherein the adhesive is located between the pair of integral spacers. In some embodiments, n the adhesive is doped with a black colorant. In some embodiments, the adhesive has a refractive index greater than 1.65. In some embodiments, the adhesive is located on a surface of the optically transmissive body between the out-coupling optical elements and the at least one spacer. In some embodiments, the surface of the optically transmissive body comprises an adhesive-trapping depression between out-coupling optical elements and the adhesive. In some embodiments, the adhesive is located adjacent to a peripheral edge of the optically transmissive body. In some embodiments, the at least one spacer is positioned between the out-coupling optical elements and the adhesive. In some embodiments, the adhesive constitutes a first adhesive, and wherein the eyepiece comprises a second adhesive bonded to a surface of the at least one spacer and the overlying waveguide. In some embodiments, the optically transmissive body comprises a plurality of spacers. Some aspects relate to a display system comprising: an eyepiece comprising: a waveguide comprising out-coupling optical elements configured to out-couple light propagating within the optically transmissive body; an overlying waveguide spaced from the waveguide; and a pillar formed of an adhesive extending from the waveguide to the overlying waveguide, wherein the adhesive has an as-deposited viscosity between 10,000 mPa·s and 50,000 mPa·s. In some embodiments, the height is 30 μm to 200 μm. In some embodiments, the waveguide comprises an integral spacer extending adjacent the pillar, the spacer extending vertically to contact the waveguide. In some embodiments, the adhesive is doped with a black colorant. In some embodiments, the adhesive has a refractive index greater than 1.65. In some embodiments, the adhesive defines an edge of the waveguide and the overlying waveguide. In some embodiments, the waveguide comprises an adhesive-trapping depression on a surface of the waveguide between the out-coupling optical elements and the pillar. In some embodiments, the depression has a width between 50 um and 2 mm. In some embodiments, the depression has a depth between 50 um and 0.4 mm.

Some aspects relate to a method for making a waveguide stack, the method comprising: forming an underlying waveguide, wherein forming the underlying waveguide comprises: defining integral out-coupling optical elements and an integral spacer on a major surface of the underlying waveguide, wherein the integral spacer is spaced-apart from the out-coupling optical elements and extends to a height above the out-coupling optical elements; providing an adhesive on the major surface of the underlying waveguide; and attaching an overlying waveguide to the underlying waveguide using the adhesive, wherein the integral spacer defines a gap between the major surface of the underlying waveguide and a bottom surface of the overlying waveguide. In some embodiments, the integral out-coupling optical elements and the integral spacer are formed simultaneously. In some embodiments, the method further comprises curing the adhesive after attaching an overlying waveguide to the underlying waveguide. In some embodiments, the method further comprises singulating the underlying waveguide and the overlying waveguide. In some embodiments, singulating comprises cutting the underlying waveguide and the overlying waveguide along a singulation path. In some embodiments, cutting the underlying waveguide comprises cutting the underlying waveguide with a laser. In some embodiments, singulating comprises removing at least a portion of the integral spacer. In some embodiments, singulating comprises removing at least a portion of the adhesive. In some embodiments, singulating comprises removing the entirety of the integral spacer. In some embodiments, the adhesive constitutes a first adhesive, and wherein a second adhesive is provided on a top surface of the integral spacer. In some embodiments, the second adhesive has an as-deposited viscosity of 10 mPa·s to 100 mPa·s. In some embodiments, the first adhesive has an as-deposited viscosity of 10,000 mPa·s to 50,000 mPa·s. In some embodiments, the adhesive is provided adjacent to the integral spacer. In some embodiments, the adhesive is provided peripherally to the integral spacer on the major surface of the underlying waveguide. In some embodiments, the adhesive is provided between the out-coupling optical elements and the integral spacer on the major surface of the underlying waveguide. In some embodiments, a plurality of integral spacers are defined on the major surface of the underlying waveguide. In some embodiments, the adhesive fills a volume between two spacers of the plurality of spacers. In some embodiments, the method further comprises roughening one or more surfaces of the underlying waveguide and the overlying waveguide before attaching the overlying waveguide to the underlying waveguide, wherein the one or more surfaces comprise surfaces in contact with the adhesive. In some embodiments, the method further comprises forming one or more vent holes extending laterally through the integral spacer.

Some aspects relate to a display system comprising: an eyepiece comprising: a waveguide comprising out-coupling optical elements configured to out-couple light prop gating within the optically transmissive body; and an overlying waveguide spaced from the waveguide; and an adhesive attaching the waveguide to the overlying waveguide, wherein the surfaces of the optically transmissive body and the overlying waveguide in contact with the adhesive are rough. In some embodiments, the rough surfaces comprise nanostructures for increasing adhesion of the adhesive. In some embodiments, the waveguide comprises an integral spacer, the spacer separating the waveguide and the overlying waveguide. In some embodiments, the display system further comprises a pair of integral spacers extending along a perimeter of the waveguide In some embodiments, spacers of the pair of integral spacers each comprise vent holes extending laterally through the spacers. In some embodiments, the adhesive is disposed on an upper surface of the spacer, wherein the upper surface is one of the rough surfaces. In some embodiments, the adhesive has an as-deposited viscosity between 10,000 mPa·s and 50,000 mPa·s and forms a pillar having a height 10 μm to 200 μm. In some embodiments, the display system further comprises an adhesive-trapping depression on a major surface of the waveguide between the out-coupling optical elements and the adhesive.

Some aspects relate to a display system comprising: an eyepiece comprising a waveguide comprising: light out-coupling optical elements; a spacer integral with the waveguide, the spacer extending along a perimeter of the waveguide; and one or more vent holes formed within the spacer, the one or more vent holes comprising through openings extending laterally through the spacer, wherein the vent holes have a width of 100 μm or less. In some embodiments, wherein the integral spacer defines an edge of the waveguide. In some embodiments, the display system further comprises an adhesive attaching the waveguide to an overlying waveguide, wherein the adhesive has an as-deposited viscosity between 10,000 mPa·s and 50,000 mPa·s and forms a pillar having a height 10 μm to 200 μm extending from the waveguide to the overlying waveguide. In some embodiments, the display system further comprises an adhesive on a top surface of the spacer, the adhesive attaching the waveguide to an overlying waveguide, wherein the adhesive has an as-deposited viscosity of 10 mPa·s to 100 mPa·s.

Some aspects relate to a display system comprising: an eyepiece comprising: a waveguide comprising: light out-coupling optical elements; a pair of spacers integral with the waveguide, the spacers extending around a perimeter of the waveguide, where the spacers extend alongside one another to define a channel there between; and one or more laterally-extending vent holes within each of the spacers, an overlying waveguide attached to the waveguide, wherein the overlying waveguide is spaced from the waveguide by the pair spacers. In some embodiments, the one or more vents holes in a first of the spacers are located in remote locations from the one or more vents formed in a second of the spacers. In some embodiments, the display system further comprises debris trapping structures formed between adjacent walls of spacers of the plurality of walls of spacers. In some embodiments, the debris trapping structures comprise physical barriers configured to catch debris flowing through the channel between the pair spacers. In some embodiments, the debris trapping structures comprise angled extensions of the spacers, the angled extensions extending into the channel. In some embodiments, the pair of spacers extend parallel to one another. In some embodiments, the waveguide further comprises one or more additional integral spacers extending along the perimeter of the waveguide. In some embodiments, the one or more additional integral spacers define a volume with another of the integral spacers, further comprising an adhesive in the volume, wherein the adhesive attaches the waveguide to the overlying waveguide.

Some aspects relate to a display system comprising: an eyepiece comprising: a waveguide comprising: light extracting optical elements on an active area of a major surface of the waveguide; and a plurality of spacers in the active area, an overlying waveguide, wherein the spacers separate the waveguide and the overlying waveguide, and wherein the spacers have an areal density of 1 spacer or less per mm². In some embodiments, the spacers have a cross-sectional shape on a plane transverse to a height of the spacers, wherein a maximum dimension of the cross-sectional shape is 300 μm or less. In some embodiments, the display system further comprises one or more integral spacers extending along a perimeter of the waveguide. In some embodiments, the display system further comprises an adhesive attaching the integral spacers extending along the perimeter of the waveguide to the overlying waveguide, wherein the adhesive has an as-deposited viscosity between 10 mPa·s and 100 mPa·s. In some embodiments, the display system further comprises an adhesive attaching the waveguide to the overlying waveguide, wherein the adhesive has an as-deposited viscosity between 10,000 mPa·s and 50,000 mPa·s and forms a pillar having a height 10 μm to 200 μm.

Some aspects relate to a method for making a waveguide stack, the method comprising: forming an underlying waveguide, wherein forming the underlying waveguide comprises: defining integral out-coupling optical elements and an integral spacer on a major surface of the underlying waveguide, wherein the integral spacer is spaced-apart from the diffractive optical elements and extends to a height above the diffractive optical elements; providing an adhesive on an overlying waveguide; and attaching the overlying waveguide to the underlying waveguide using the adhesive provided on the overlying waveguide, wherein the integral spacer defines a gap between the major surface of the underlying waveguide and a bottom surface of the overlying waveguide. In some embodiments, defining the integral out-coupling optical elements and the integral spacer comprises casting the waveguide in a mold. In some embodiments, defining integral out-coupling optical elements comprises forming a diffractive grating. In some embodiments, providing the adhesive comprises depositing an adhesive having a viscosity of 10 mPa·s to 100 mPa·s.

In some embodiments, a display system comprises an eyepiece comprising a stack of waveguides. The stack of waveguides comprises a first waveguide comprising an optically transmissive body and a spacer integral with the optically transmissive body, the spacer having an end, the end comprising one or more ridges extending across the end. The stack of waveguides also comprises adhesive disposed in a volume defined by the one or more ridges; and a second waveguide overlying the first waveguide and in contact with the adhesive. The one or more ridges may comprise a plurality of ridges forming a grating. The one or more ridges may extend around a perimeter of the end of the spacer to surround the volume. The adhesive may have a maximum thickness of 1 μm or more. The maximum thickness may also be 35 μm or less. A surface of the second waveguide in contact with the adhesive may have a rough texture. The first waveguide and the second waveguide may each comprise light incoupling optical elements and light outcoupling optical elements. The light outcoupling optical elements of the first waveguide and of the second waveguide may be configured to output light with different amounts of wavefront divergence.

In some other embodiments, a method for making an eyepiece is provided. The method comprises forming a waveguide stack. Forming the waveguide stack comprises:

providing a waveguide having an integral spacer, the spacer having one or more ridges extending across an end of the spacer; providing adhesive on the one or more ridges and in a volume between the one or more ridges of the spacer; and contacting the adhesive with an other waveguide to adhere the integral spacer to the other waveguide. Providing adhesive may comprise jet depositing adhesive on and between the one or more ridges. Providing adhesive may comprise depositing a layer of adhesive having a maximum thickness of 1-35 µm. The one or more ridges comprise a plurality of ridges forming a grating. The one or more ridges may extend around a perimeter of the end of the spacer to surround the volume.

In some embodiments, a display system is provided. The display system comprises an eyepiece comprising a stack of waveguides. The stack of waveguides comprises a first waveguide formed of a polymer; a second waveguide formed of the polymer; and a spacer separating and extending between the first and second waveguides. The spacer is formed of the polymer; and the first waveguide, the spacer, and the second waveguide form a continuous mass of the polymer. The first and second waveguides may comprise parallel sheets of the polymer. The first and second waveguides may each comprise light incoupling optical elements and light outcoupling optical elements. The light incoupling optical elements and light outcoupling optical elements may comprise diffractive gratings formed of the polymer. The light outcoupling optical elements of the first waveguide and the light outcoupling optical elements of the second waveguide may be configured to output light with different amounts of wavefront divergence.

In some embodiments, a method for making an eyepiece is provided. The method comprises forming a waveguide stack. Forming the waveguide stack comprises providing a waveguide having an integral spacer, the waveguide formed of a polymer; providing, on an end of the spacer, an adhesive solution comprising chemical species for forming the polymer; contacting the solution with an other waveguide; and hardening the solution to form a monolithic mass comprising the integral spacer, the waveguide, and the other waveguide. Providing a solution may comprise jet depositing the solution onto the end of the spacer. Providing a waveguide may comprise depositing, into the mold, a waveguide-forming solution comprising chemical species for forming the polymer. The adhesive solution may have a lower viscosity than the waveguide-forming solution. The end of the spacer may comprise one or more ridges defining a volume, and providing the adhesive solution may comprise providing the adhesive solution in the volume. The one or more ridges may comprise a plurality of ridges forming a grating. The one or more ridges may extend around a perimeter of the end of the spacer to enclose the portion of the volume.

BRIEF DESCRIPTION OF THE DRAWINGS

FIG. 11C illustrates an example of a stack of waveguides comprising an adhesive at the interface between spacers and immediately neighboring waveguides.

DETAILED DESCRIPTION

Figure 1:
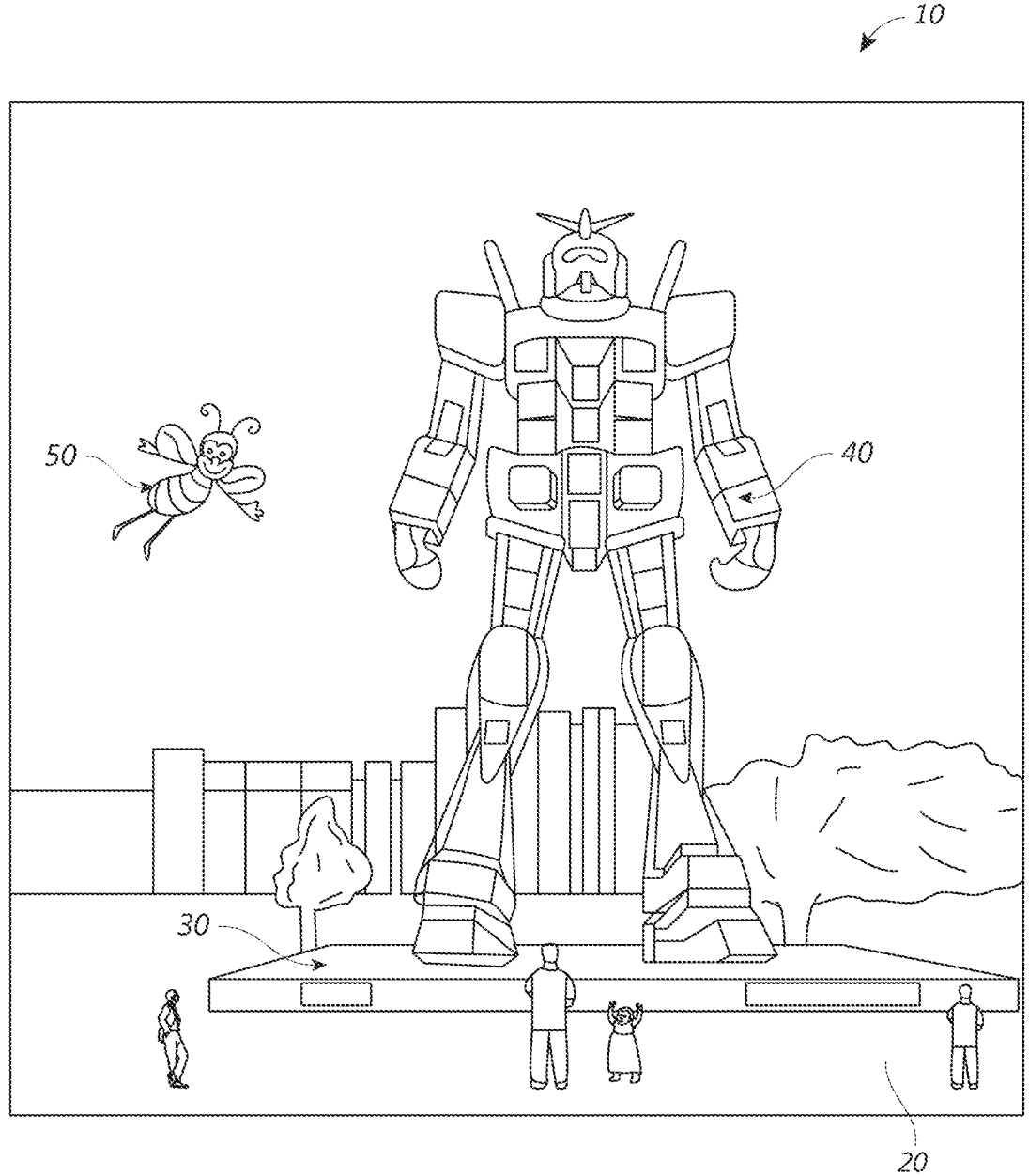
FIG. 1 illustrates a user's view of augmented reality (AR) through an AR device.

Near-eye augmented and virtual reality display systems may include eyepieces for directing image information into the eyes of a viewer. The eyepieces may be formed of stacks of waveguides that are spaced apart by intervening beads of glue. It will be appreciated that the sizes of the beads and the separation between the waveguides provided by the beads may impact the optical performance of the eyepiece and the perceived image quality of the display system. For example, the beads may be formed at specific locations and then an overlying waveguide may be pressed onto the beads at specific pressures, after which the beads may be hardened by curing. As a result, formation of the beads may require precise alignment and controlled pressure to maintain a constant separation distance between the waveguides throughout the stack of waveguides. It may be challenging to provide such precise alignment and pressure control.

In addition, complications may arise during the dispensing of liquid adhesives. Air bubbles and gaps may be present during adhesive dispensing. Solid adhesives, on the other hand, may have difficulties in bubble-free application and accurate adhesive alignment.

Also, where the waveguides are formed of polymers, the polymer waveguides may be flexible and utilizing beads of material alone to separate the waveguides may not provide sufficient mechanical or structural stability for maintaining the desired separation between waveguides. For example, some stacking systems may use liquid adhesives mixed with microspheres, which are intended to set the gap between adjacent layers. However, microspheres almost invariably contain some size variation, resulting in inconsistent separation between layers regardless of other factors. In addition, the viscosity of the adhesive may prevent uniform pressing on the adhesive throughout the surface area of the eyepiece.

In some embodiments, one or more waveguides, which may be used to form a stack of waveguides, may include integral spacers for providing a desired separation from overlying or underlying structures, such as other waveguides. The waveguides may form an eyepiece which is part of a display system (e.g., AR or VR headsets), with the waveguides having light out-coupling optical elements for directing image light to a user's eye. In some embodiments, the light out-coupling optical elements may be surface relief features, e.g. diffractive optical elements that are formed simultaneously with the integral spacers. In addition to display systems, various embodiments described herein may be applied generally to the stacking of polymer layers where a fixed distance is required between layers.

In some embodiments, the spacers and the main body of the waveguides form a monolithic structure, and such spacers may be referred to integral spacers. In some embodiments, the waveguide may be a hybrid waveguide comprising a plurality of layers, one of which may include the spacers and the out-coupling optical elements. In some embodiments, the spacers and the main body of the waveguide (or a layer of a hybrid waveguide) may be formed of the same material which extends continuously and homogeneously from the main body (or layer of the hybrid waveguide) to define the spacers.

In some embodiments, the out-coupling optical elements may be located in an active area of the waveguide, while the spacers may be located in an inactive area of the waveguide (e.g., an area of the waveguide spaced apart from an area having the diffractive optical elements), such that the spacers do not interfere with sightlines of a user of a display system comprising the waveguide. For example, the spacers may extend along substantially the entirety of the perimeter of the waveguide. In some embodiments, contact spacers may be located in an active area of the waveguide, but the contact spacers may be sized and shaped such that they are substantially not visible to the user (e.g., such that interference with the sightlines of a user may be eliminated or sufficiently mitigated to provide good display quality).

It will be appreciated that one or more spacers of a waveguide provide a desired spacing between the waveguide and an overlying waveguide. Preferably, the spacers attach or bond together the waveguides using an adhesive. In some embodiments, a low-viscosity adhesive may be utilized on surfaces of the spacer which contact an overlying waveguide, to bond the spacer (and integral waveguide) to the overlying waveguide. Advantageously, the low-viscosity adhesive may provide good wetting and gap-filling properties for superior adhesion to the spacer and overlying waveguide. In some embodiments, the low-viscosity adhesive may have a viscosity of 5 mPa·s to 100 mPa·s.

In some other embodiments, one or more spacers may be used to space a waveguide from an overlying waveguide, while adhesive bonding together the waveguides may extend directly from a surface of the waveguide to the overlying waveguide, such that the adhesive forms a pillar that extends vertically substantially an entire height of the spacer. These pillars may advantageously provide additional mechanical support to the waveguide stack and/or may allow subsequent removal of the spacers. In such embodiments, the adhesive is preferably a high viscosity adhesive, e.g., having a viscosity in the range of 10,000 mPa·s to 50,000 mPa·s. In some embodiments, whether the adhesive is a high or low-viscosity adhesive, adhesive-trapping structures may be provided between the active area of the waveguide (e.g., the area containing light out-coupling optical elements) and the adhesive.

In some embodiments, the upper end of the spacer for interfacing with an overlying waveguide may comprise ridges that act as barriers to prevent the undesired running or flow of adhesive. For example, the ridges may enclose a volume into which adhesive is deposited, or may form a grating structure with volumes for receiving adhesive, with the volumes elongated in a direction that channels adhesive away from optical structures or from other structures of the waveguide which are desired to be free of adhesive.

In some embodiments, the adhesive joining a spacer and overlying waveguide together may be formed of the same polymer as the spacer and waveguide. For example, an adhesive solution comprising the same chemical species for forming the polymer may be applied to the end of the spacer, the spacer with the adhesive solution may be joined to an overlying waveguide, and the adhesive solution may subsequently be hardened (e.g., by curing). Advantageously, a monolithic stack of waveguides may thus be formed, with the same polymer material extending from waveguide to spacer to overlying waveguide.

In a stack of waveguides, it will be appreciated that the spacers may enclose a volume separating two neighboring waveguides. To allow gas flow into and out of that volume, one or more vent holes in the spacer may be provided. Vent holes in the integral spacers may be formed during casting of the polymer eyepieces. Alternatively, the vent holes may be created by contacting a milling nozzle or laser light with the surface of the eyepiece from the side and/or the top of a waveguide stack. If a milling nozzle or laser is to be used, the integral spacer may be cast as a closed loop around the periphery of the waveguide and the vent hole may be formed subsequently during a milling step.

In some embodiments, a waveguide may comprise two or more walls formed of integral spacers around the periphery of the waveguide. In some embodiments, vent holes can be formed in each wall formed of integral spacers. To prevent debris from flowing into the active area of the waveguide during singulation (e.g., during dicing or cutting a part of a large sheet of optically-transmissive material into individual waveguides), vent holes may be formed in different locations in each wall formed of integral spacers. Furthermore, it will be appreciated that pairs of integral spacers may define a channel between them and debris-trapping structures can be formed in these channels (e.g., near vent holes) to prevent debris from traveling through the channels and entering the active area through a vent hole in an interior spacer.

In some embodiments, singulation may be performed along an outline extending through one or more spacers. In such cases, the spacers themselves may define one more edges of the singulated waveguide. In some other embodiments, as noted herein, the singulation path may cause removal of the spacers entirely, thereby leaving, e.g., pillars formed of adhesive to bond and space apart neighboring waveguides.

In some embodiments, the spacers are disposed on one major surface of a waveguide and indentations are provided on an opposite major surface of the waveguide. The indentations are sized and positioned to align with spacers of immediately neighboring waveguides, thereby forming a self-aligned stack of waveguides. Tops of the spacers may be provided with light scattering features and/or a light leakage prevention material (e.g., an anti-reflective coating and/or a light absorbing material) to prevent light leakage between the waveguides. In some embodiments, adhesive (e.g. beads of glue) may be used to align and adhere spacers (of another waveguide) to the opposite major surface of the waveguide. Adhesive may be used alone to align and adhere spacers or may be utilized in combination with the indentations to enhance the adhesion and mechanical stability of the waveguide stack. Furthermore, spacers may be provided with roughened, uneven, or irregular surfaces to increase contact area and provide small structures which enhance adhesion between the spacers and the opposite major surface of the waveguide.

In some embodiments, the spacers and/or indentations may have varying sizes (e.g. widths), orientations, placements, and/or multiple spacers and/or indentations may be formed as neighboring groups of spacers and/or indentations. For example, both major surfaces of the waveguide may include spacers and indentations, thereby forming an interlocking system of spacers and indentations with underlying and/or overlying matching waveguides to form a stack of waveguides. Advantageously, the varying sizes and/or neighboring groups of spacers and/or indentations may increase the mechanical and structural stability of a single waveguide and/or stack of waveguides.

In some embodiments, where waveguides form an eyepiece for a display system, different waveguides of the stack of waveguides may be configured to in-couple and/or out-couple light of different colors, e.g., different component colors for forming a full-color image. In addition or alternatively, different waveguides of the waveguides may be configured to output light with different amounts of wavefront divergence, to display image content at different apparent distances from the viewer.

Advantageously, the spacers integral with the waveguides provide a rigid structure for easily and reproducibility separating spacers of a stack of spacers. In addition, providing matching indentations in the waveguides further facilitates the making of consistent stacks of spacers by providing self-aligned stacking. The consistent separation between spacers may provide consistent optical performance by consistently preventing light from leaking between the waveguides, in addition to facilitating the total internal reflection of light through individual waveguides. Moreover, manufacturing processes may be simplified by eliminating separate steps for depositing beads of the material, precisely applying pressure to waveguides, and then hardening the glue material. Rather, where the waveguides comprise light-out coupling optical elements that are surface features, the spacers may be formed simultaneously with the out-coupling optical elements. In some embodiments, spacers may be provided without the use of any adhesive. However, even when the spacers are used in combination with beads of glue or other adhesive materials, the presence of the spacers may reduce the required precision when applying pressure, as the spacers provide a fixed physical barrier between adjacent waveguides, preventing the waveguides from advancing closer to each other beyond the spacers.

An advantage of polymer eyepieces is that the eyepieces may be cast as monolithic pieces comprising integral spacers and nanostructures for light propagation. The built-in spacers may be cast with highly consistent height, which contributes to the creation of a consistent air gap between adjacent layers, improving performance of the overall layered structure. These eyepieces may be stacked by utilizing these integral spacers to form more functional and complex display assemblies.

The methodologies discussed herein may simplify the polymer layer assembly process, and significantly improve performance of, for example, waveguide-based polymer eyepieces for AR or VR applications. The methods of assembly described herein may produce robust polymer eyepiece (e.g. waveguide) stacks with consistent gaps throughout the stack, resulting in display devices having consistent and increased performance.

As discussed herein, waveguides having integral spacers may form eyepieces for augmented and virtual reality display systems. The waveguides may be configured to output light to display image content for a viewer. It will be appreciated that some light beams within the waveguides may travel through the waveguides without being out-coupled for the viewer. Such light may be referred to herein as unutilized light. Unutilized light may, in some circumstances, reflect off of edges of the waveguides and propagate back through the waveguides, where the light may propagate out of the waveguide (e.g. be out-coupled by out-coupling elements in the waveguides, or escape total internal reflection due to the angles at which the light reflects off of the edges). Undesirably, this propagation of unutilized light out of the waveguide may cause visual artifacts such as ghosting and/or reductions in the contrast of the display system.

In some embodiments, one or more waveguides, which may be used to form a stack of waveguides (which may include integral spacers to separate neighboring waveguides), may include edge treatments to reduce or mitigate unwanted reflections and propagation of unutilized light out of a waveguide, thus improving image quality. The edge treatments may include, as examples, light absorbing material that is applied to one or more edges of the waveguide and/or reflection-preventing structures formed at those edges. In some embodiments, the edge treatments may include blackening materials, black ink, light absorbing materials, edge roughening, out-coupling gratings, light-trapping structures, absorbing polymers, and combinations of these and other treatments.

Advantageously, in some embodiments, various edge treatments may be formed simultaneously with the formation of spacers and/or diffractive optical elements. For example, an imprint mold may include patterns for defining the edge treatments (e.g., the patterns may define a rough texture, out-coupling optical elements, and/or light trapping microstructures).

In some embodiments, the waveguides with integral spacers disclosed herein may be formed using an imprinting or casting process. For example, the integral spacers and the waveguide may be formed simultaneously by a casting process in which waveguide material, in a liquid state, is flowed onto or into a mold containing a negative of the features (e.g., spacers and/or optical elements such as gratings) desired to be formed on the surface of the waveguide. The material is then allowed to solidify and the mold is removed, leaving a waveguide with integral spacers (and possibly other features such as optical elements).

Reference will now be made to the drawings, in which like reference numerals refer to like parts throughout. Unless indicated otherwise, the drawings are schematic not necessarily drawn to scale.

Example Display Systems

Figure 2:
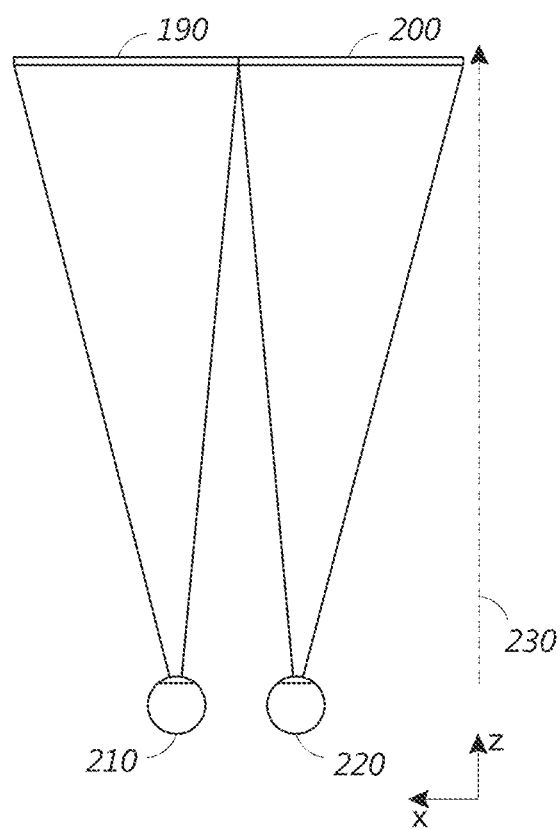
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
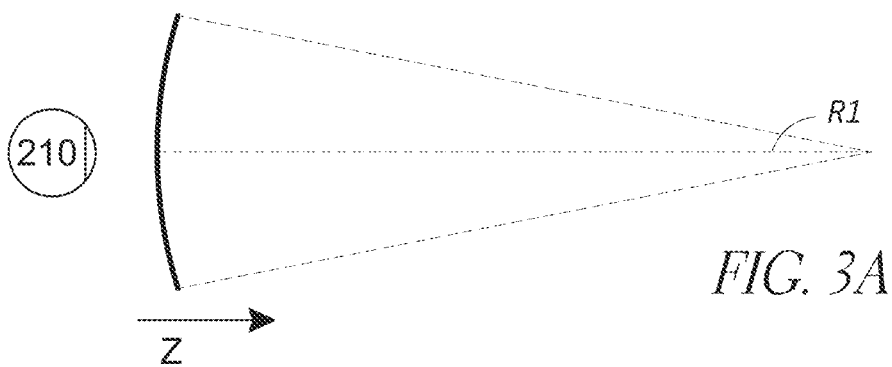
FIGS. 3A-3C illustrate relationships between radius of curvature and focal radius.
Figure 3B:
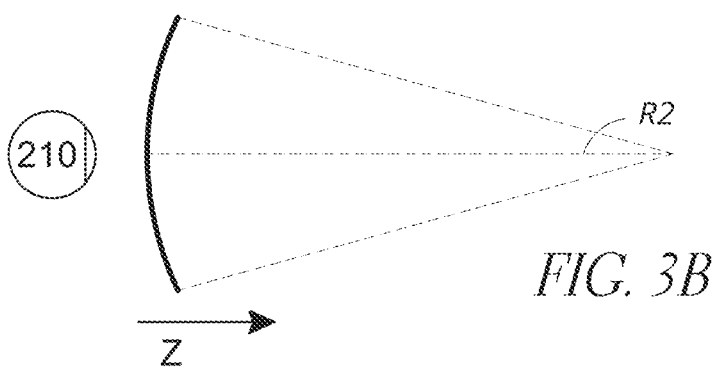
Figure 3C:
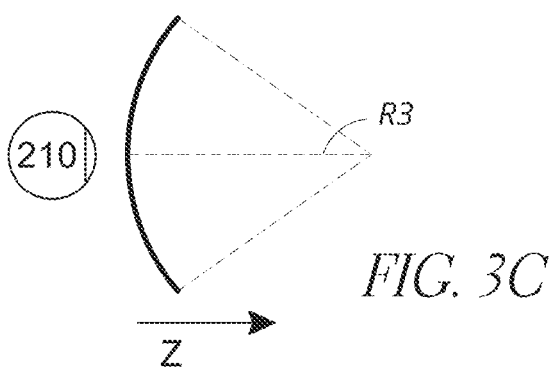

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
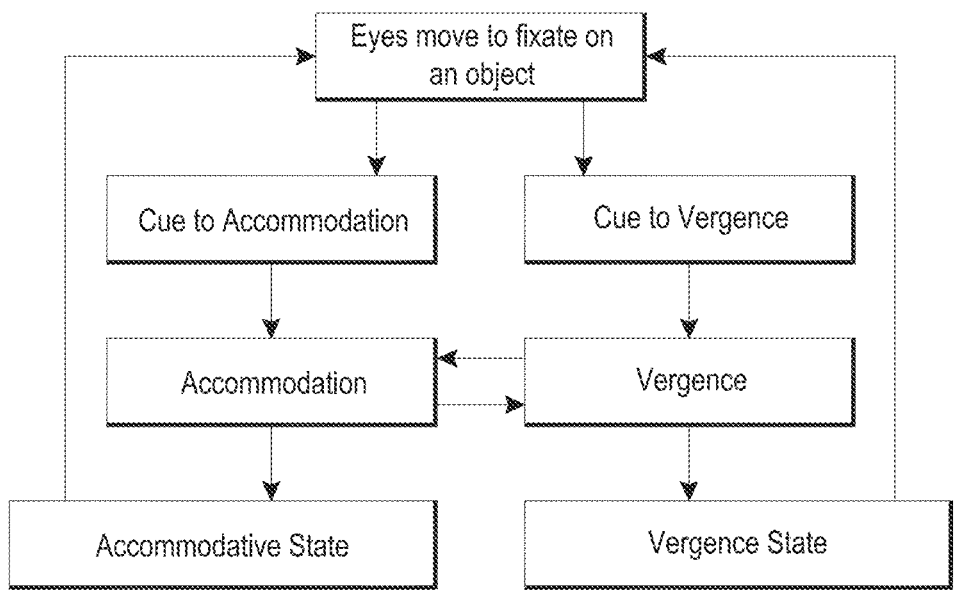
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
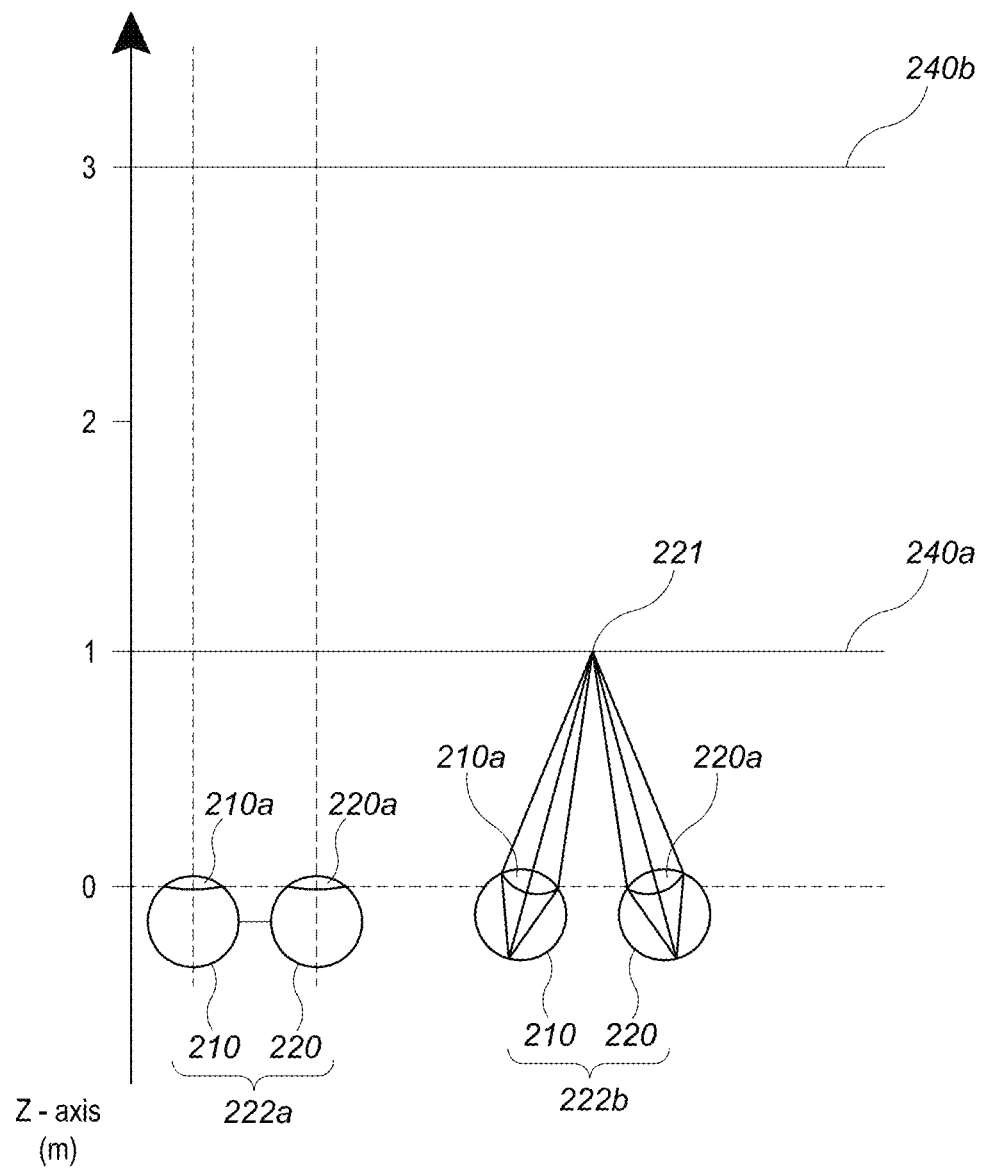
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
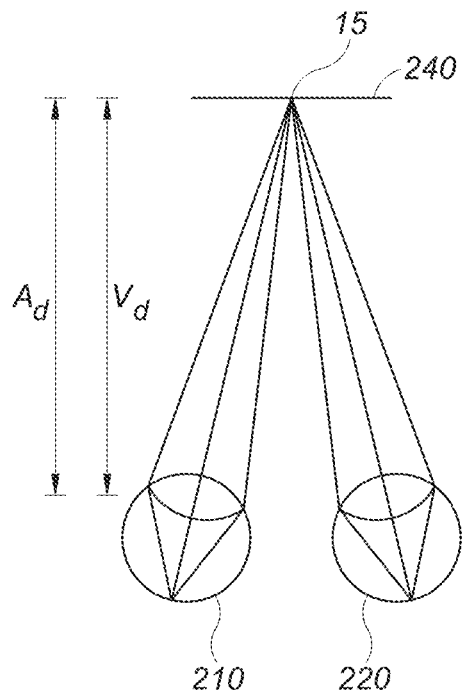
FIG. 4C illustrates an example of a representation of a top-down view of a user viewing content via a display system.
Figure 4D:
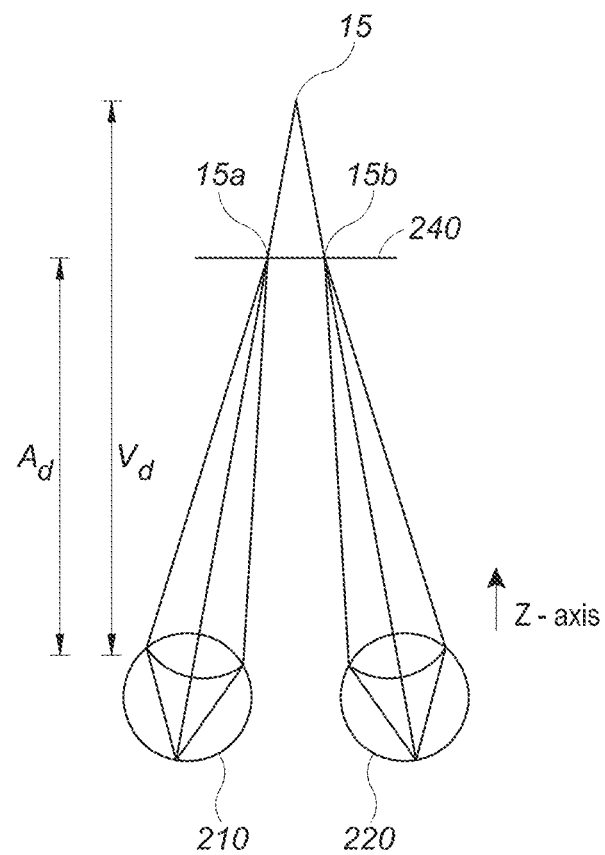
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$–$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, from the center of rotation of an eye, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
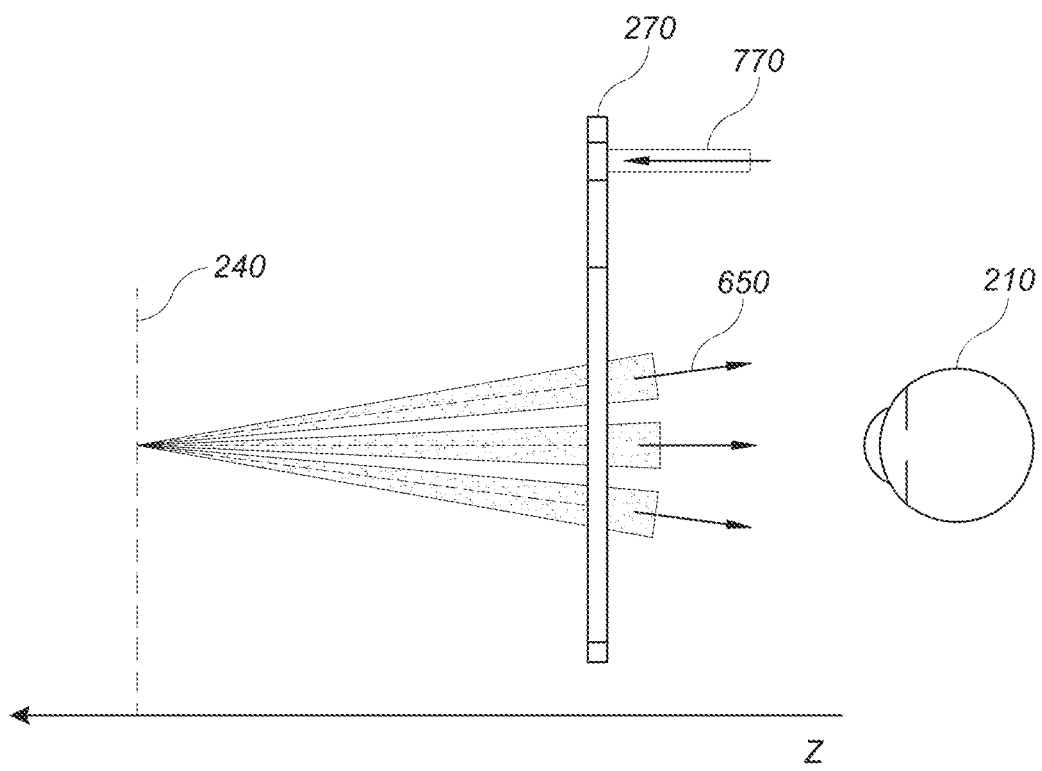
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated that a depth plane may follow the contours of a flat or a curved surface. In some embodiments, advantageously for simplicity, the depth planes may follow the contours of flat surfaces.

Figure 6:
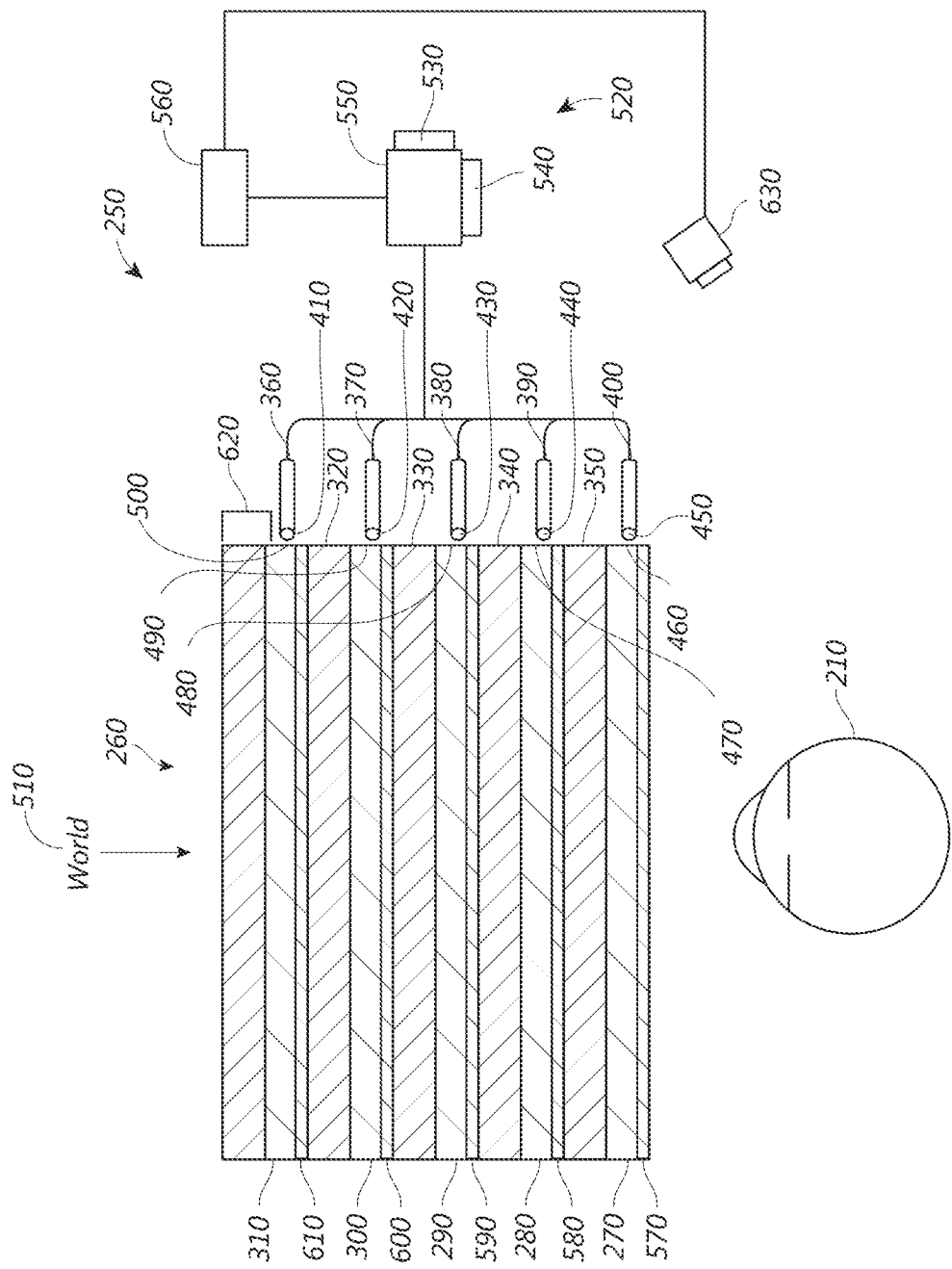
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). It will be appreciated that the major surfaces of a waveguide correspond to the surfaces of the waveguide between which the thickness of the waveguide extends. In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
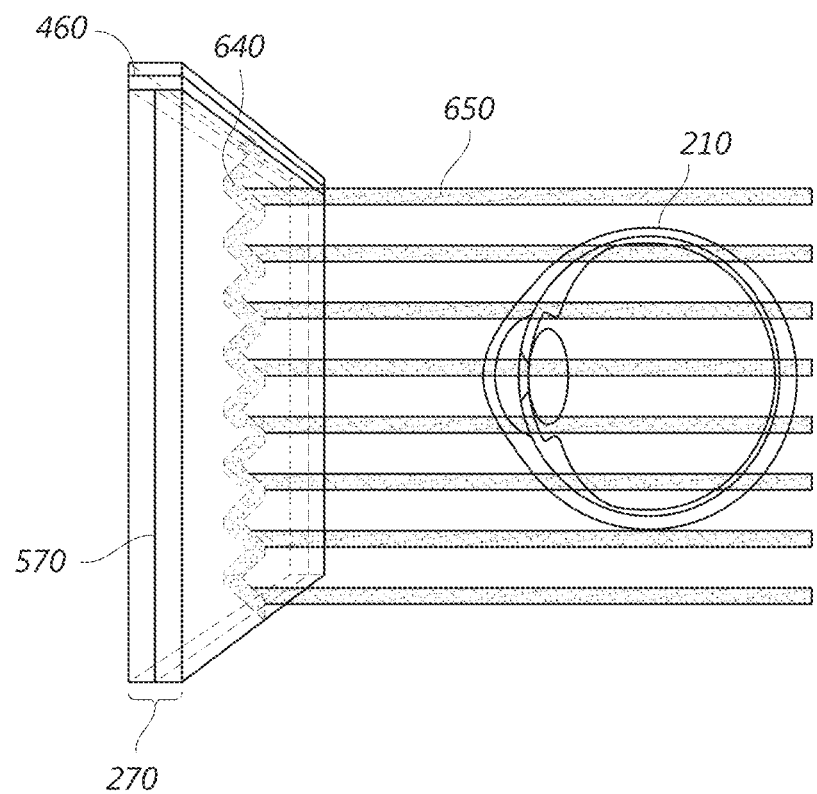
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
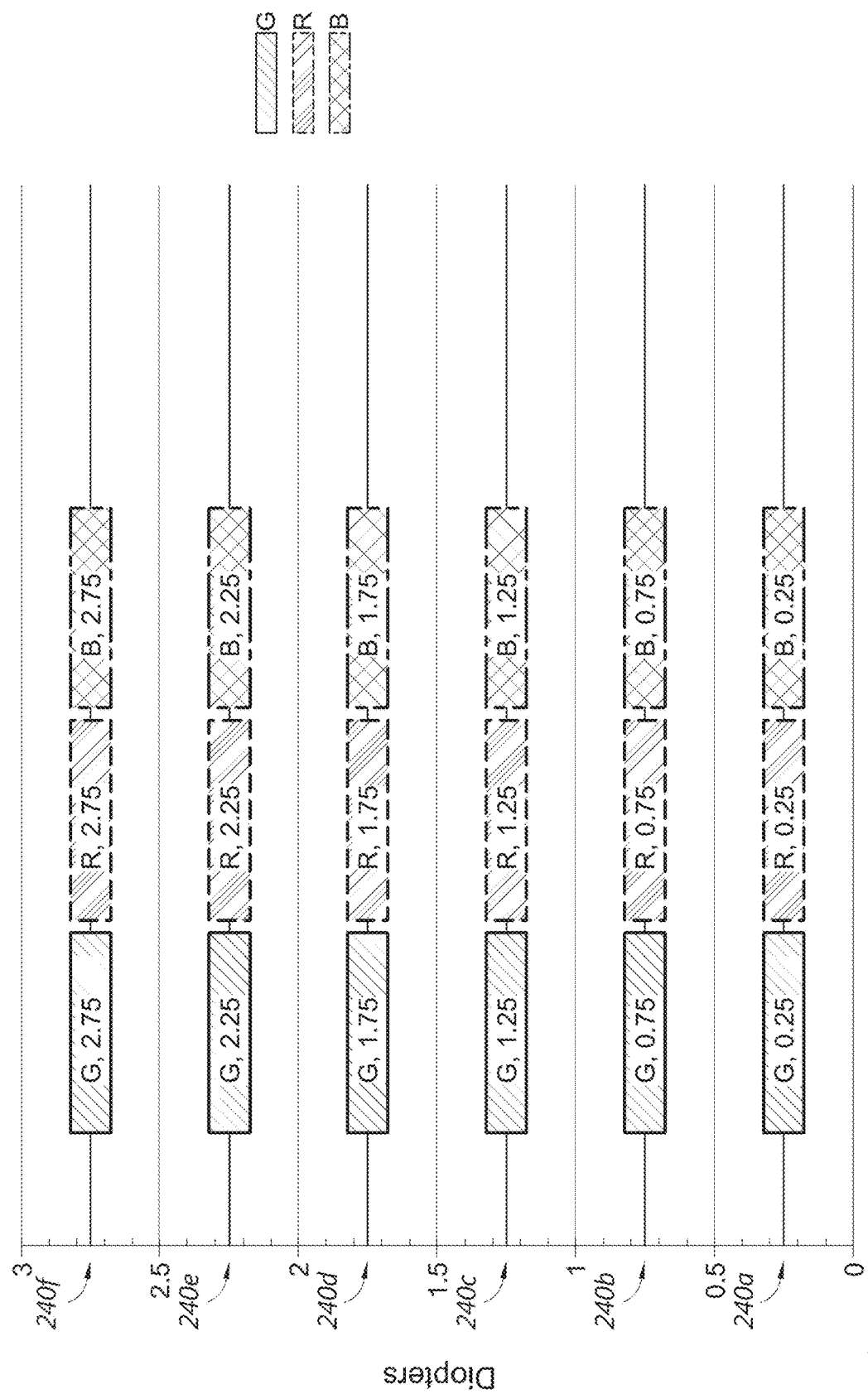
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
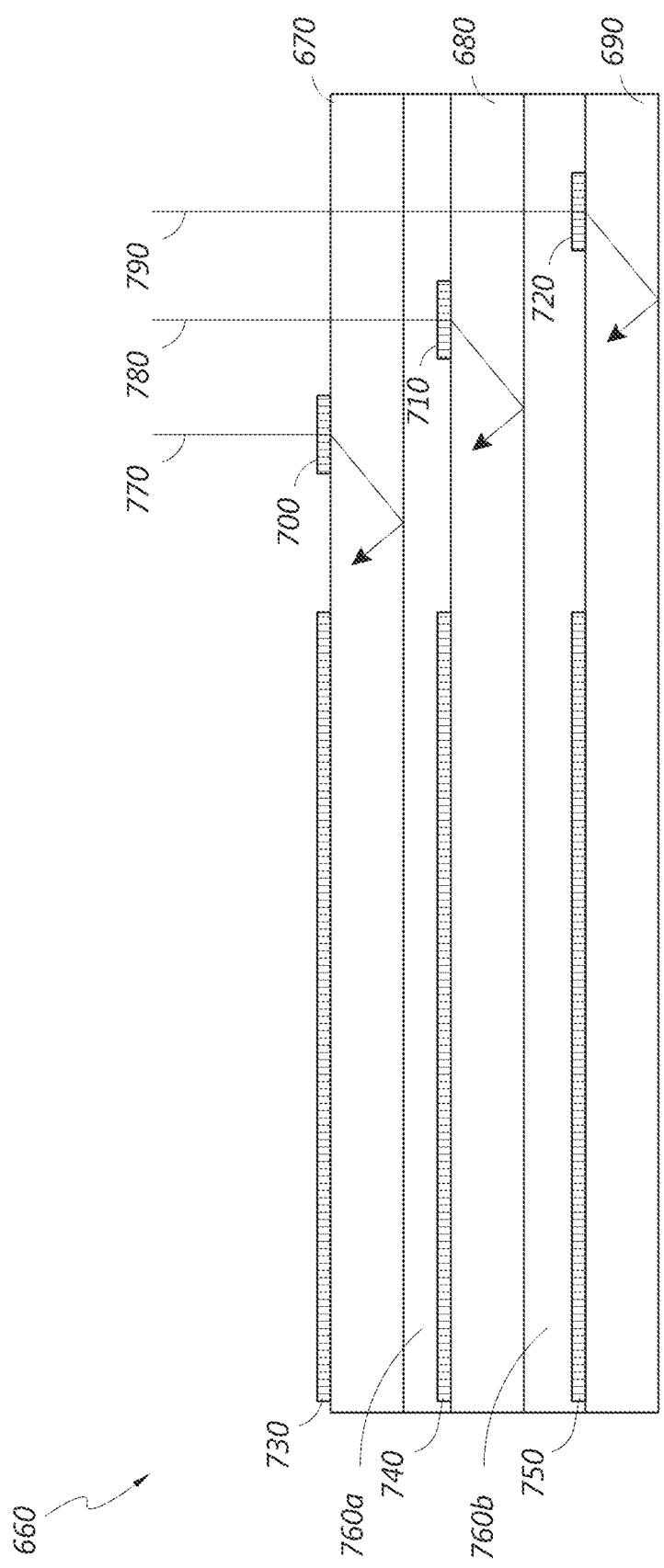
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The incoupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
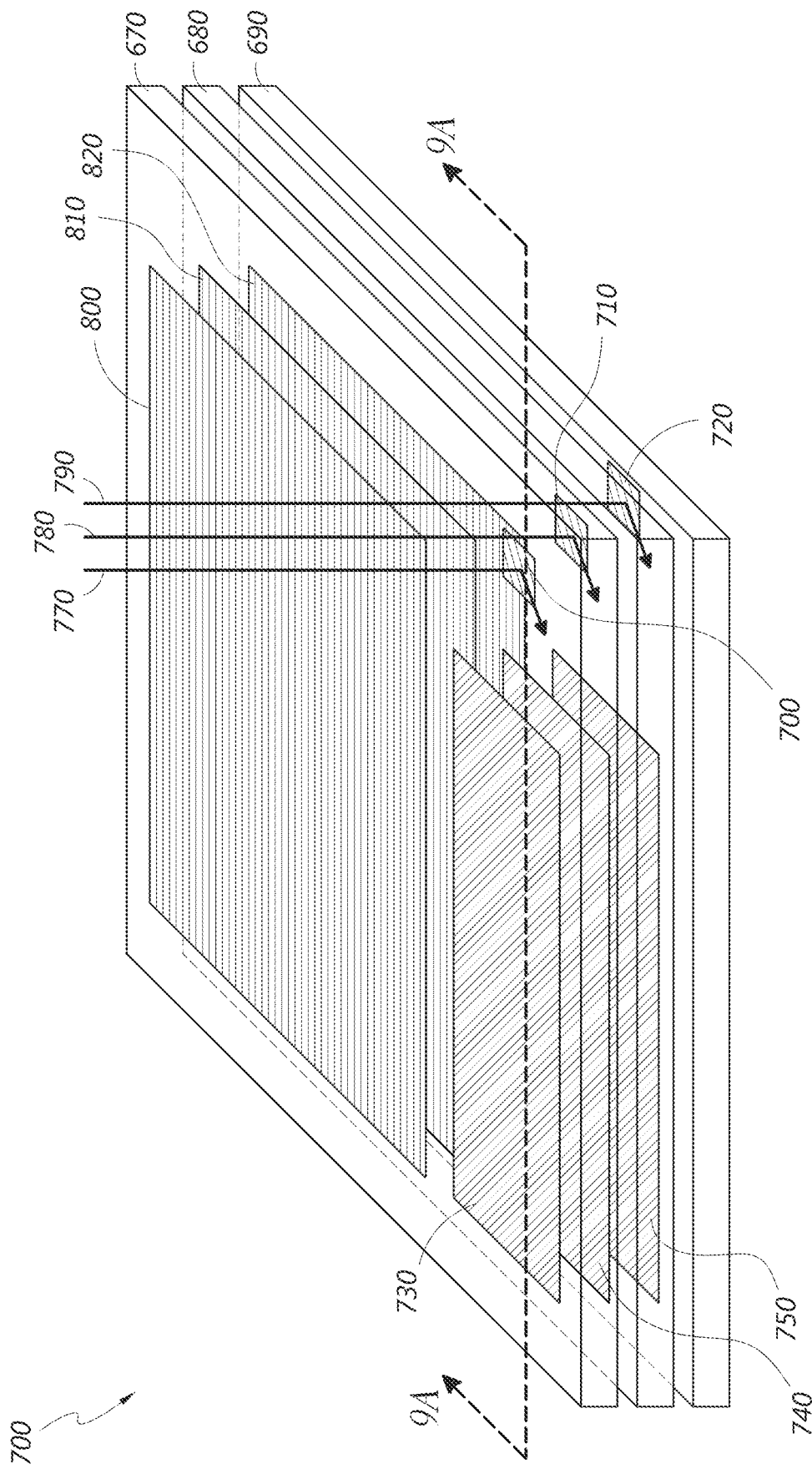
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
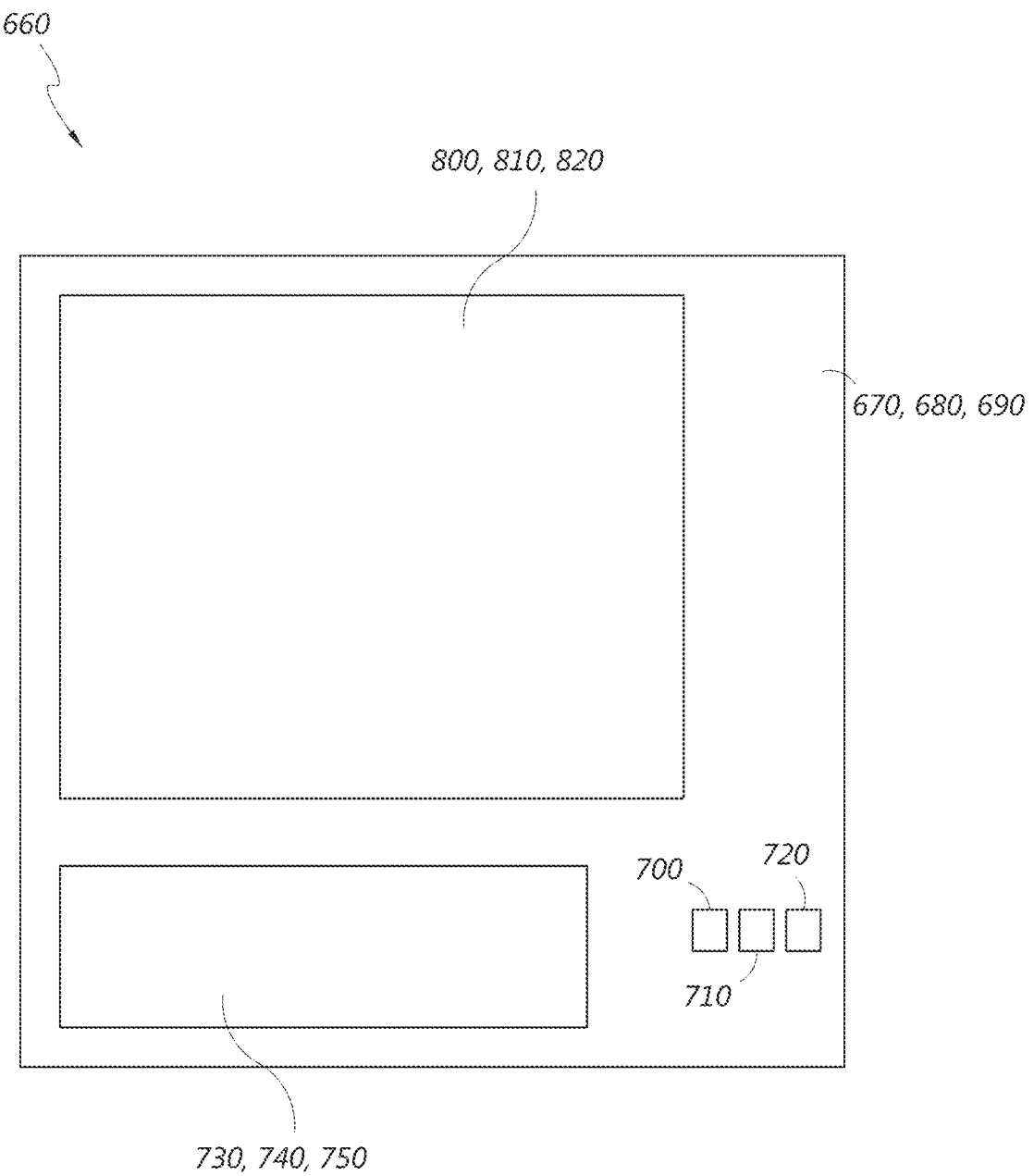
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
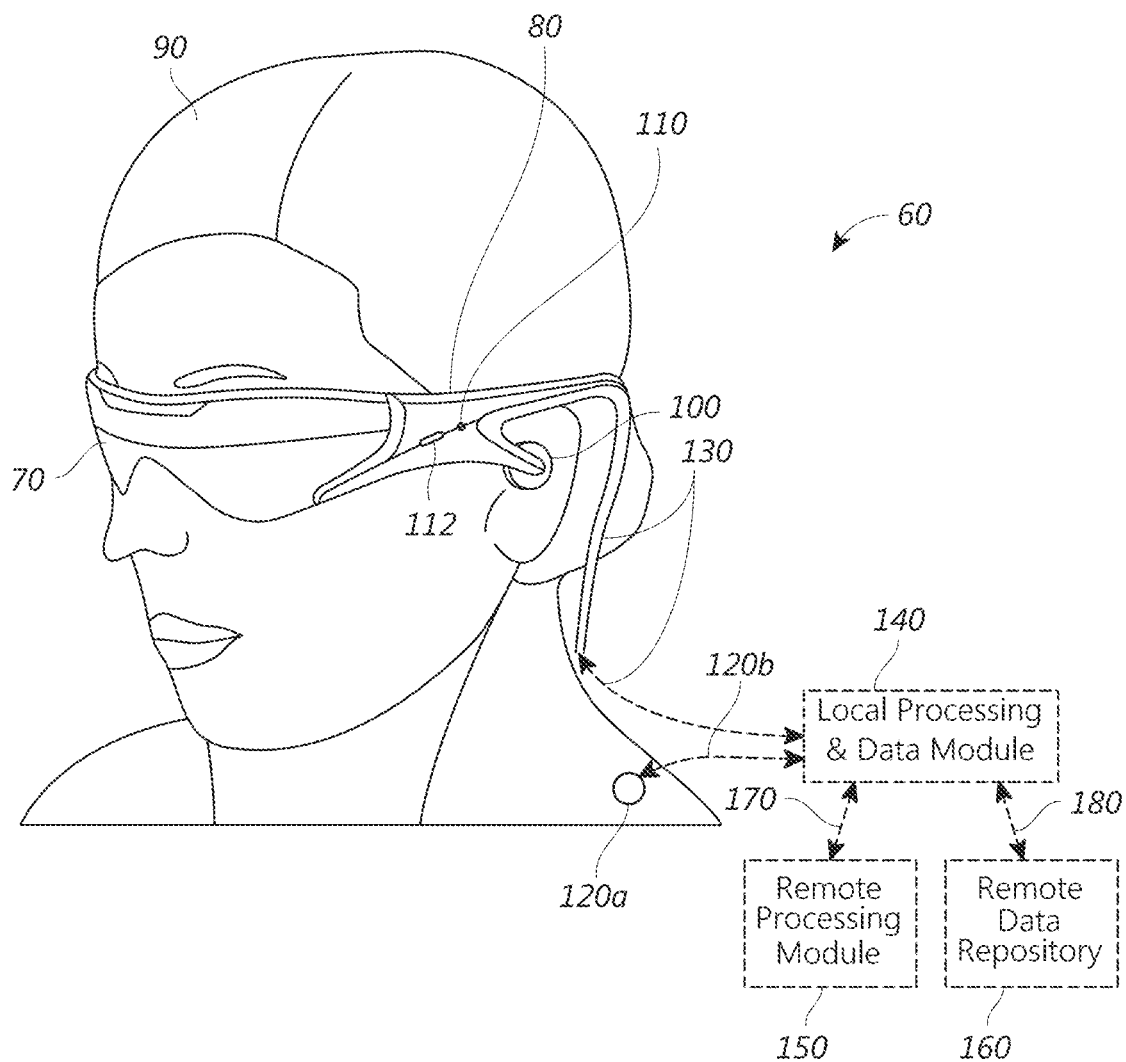
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Waveguide Structures

Figure 10A:
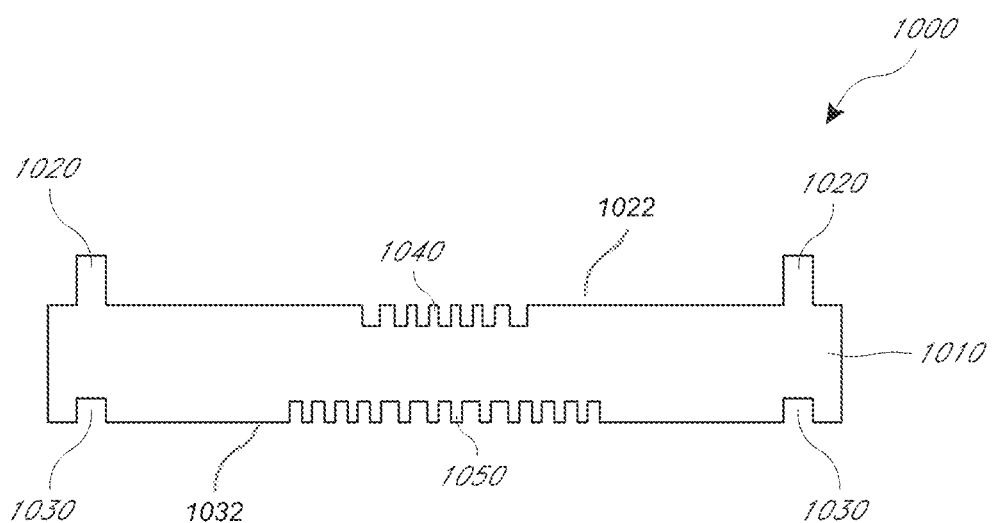
FIG. 10A illustrates an example of a waveguide comprising spacers.

Referring now to FIG. 10A, an example of a waveguide comprising spacers is illustrated. A waveguide 1000 comprises a main optically transmissive body 1010 and spacers 1020 extending vertically from a major surface 1022 of the main body 1010. Preferably, the spacers 1020 are integral with the waveguide 1000 and form a monolithic structure with at least a part of the waveguide defining the major surface 1022. More preferably, the spacers 1020 form a monolithic structure with the entire waveguide 1000, with the material of the waveguide 1000 extending vertically to form the spacers 1020. As a result, the spacers 1020 and main body 1010 may be formed of the same material and be without an intervening boundary.

In some embodiments, the spacers 1020 may be formed of a different material than the main body 1010, such that an intervening boundary exists at the interface of the spacers 1020 and the main body 1010. For example, the spacers 1020 may comprise locally deposited material, which is then imprinted to form the spacers 1020.

In some embodiments, indentations 1030 are provided extending into a major surface 1032 of the waveguide 1000. As illustrated, the major surface 1032 and, thus, the indentations 1030 are disposed on a side of the waveguide 1000 opposite the major surface 1022. As discussed further herein, the indentations 1030 are preferably positioned, shaped, and sized such that spacers of an underlying waveguide (not illustrated) may be accommodated within those indentations 1030. Similarly, the spacers 1020 are preferably position, shaped, and sized such that they may be accommodated within indentations of an overlying waveguide (not illustrated). In some embodiments, the waveguide 1000 may be provided without indentations 1030 and any underlying spacers may simply contact the major surface 1032. Furthermore, in some embodiments, spacers 1020 may be provided on major surface 1032 and indentations 1030 may be provided on major surface 1022, such that spacers 1020 extend to an underlying waveguide to be accommodated by indentations 1030 on major surface 1022 of the underlying waveguide. In some embodiments, no indentations 1030 are provided on either major surface 1022 or major surface 1032, such that the spacers 1020 disposed on major surface 1022 extend to and directly contact major surface 1032 (or major surface 1022 when the spacers are disposed on major surface 1032 of an overlying waveguide).

With continued reference to FIG. 10A, in some embodiments, the major surface 1022 may comprise surface relief features 1040. As illustrated, the spacers 1020 extend vertically to a height greater than the top of the surface relief features 1040. Preferably, the spacers 1020 have a height sufficient to space the waveguide 1000 from an overlying or underlying waveguide by a desired separation distance, e.g., 10 μm or more, or 30 μm or more, or 10 μm to 200 μm. In some embodiments, the spacers 1020 have a height of 30 μm or more. As discussed herein, the spacers 1020 may fit within the indentations 1030 of an overlying waveguide or underlying in some embodiments. In such embodiments, the height of the spacers 1020 may be equal to the desired separation between waveguides (e.g., 30 μm) plus the height of the indentations in which the spacers are inserted. If no indentations 1030 are provided, the height of the spacers 1020 may be equal to the desired separation between waveguides (e.g. 30 μm).

Additionally or alternatively to the surface relief features 1040, in some embodiments, the opposing major surface 1032 may comprise surface relief features 1050. In some embodiments, one or both of the surface relief features 1040 and 1050 may include a pattern of protrusions and indentations sized and arranged to form a diffractive optical element, such as diffractive gratings. It will be appreciated that such diffractive optical elements may correspond to one or more of the in-coupling optical elements 700, 710, 720; light distributing elements 730, 740, 750; or out-coupling optical elements 800, 810, 820 of FIGS. 9A-9C. In some embodiments, the waveguide 1000 may omit one or both of the surface relief features 1040, 1050 such that the major surfaces 1022, 1032 may be smooth except for spacers 1020, 1030, respectively. Furthermore, it will be appreciated that the surface relief features 1040 and 1050 may differ in size, number placement, and/or orientation from the illustrated embodiments. For example, surface relief features 1040, 1050 may comprise a plurality of diffractive gratings (e.g., for light in-coupling) disposed away from the center of the waveguide 1000 along major surfaces 1022, 1032.

In some embodiments, the surface relief features 1040, 1050 may advantageously increase the density of surface relief features across a given expanse of the waveguide 1000 and may be identical. In some other embodiments, the surface relief features 1040, 1050 may be different. For example, the surface relief features 1040 may be configured to diffract light of different wavelengths and/or different incident angles and/or to output light at different angles from the surface relief features 1050.

With continued reference to FIG. 10A, the waveguide 1000 is formed of an optically transmissive material, e.g., a highly transparent material. Preferably, the material has a high refractive index, which may provide advantages for providing a large field of view. In some embodiments, the material has a refractive index greater than 1.5, or greater than 1.65. The material forming the waveguide 1000 may be a highly transparent polymer material, e.g., an organic polymer material. Examples of high refractive index materials include polyimide-based high index resins, halogen-containing (e.g., bromine or iodine-containing) polymers, phosphorous containing polymers, thiol-ene based polymers, and high refractive index resin materials. Examples of high refractive index resin materials include those commercially available from NTT-AT of Kawasaki-shi, Kanagawa, Japan, such as the high refractive index resins sold under the name #565 and #566; and high refractive index resin materials commercially available from Akron Polymer System of Akron, Ohio, USA, such as the high refractive index resins sold under the name APS-1000, APS2004, APS-4001, and as part of the APS 3000 series.

Figure 10B:
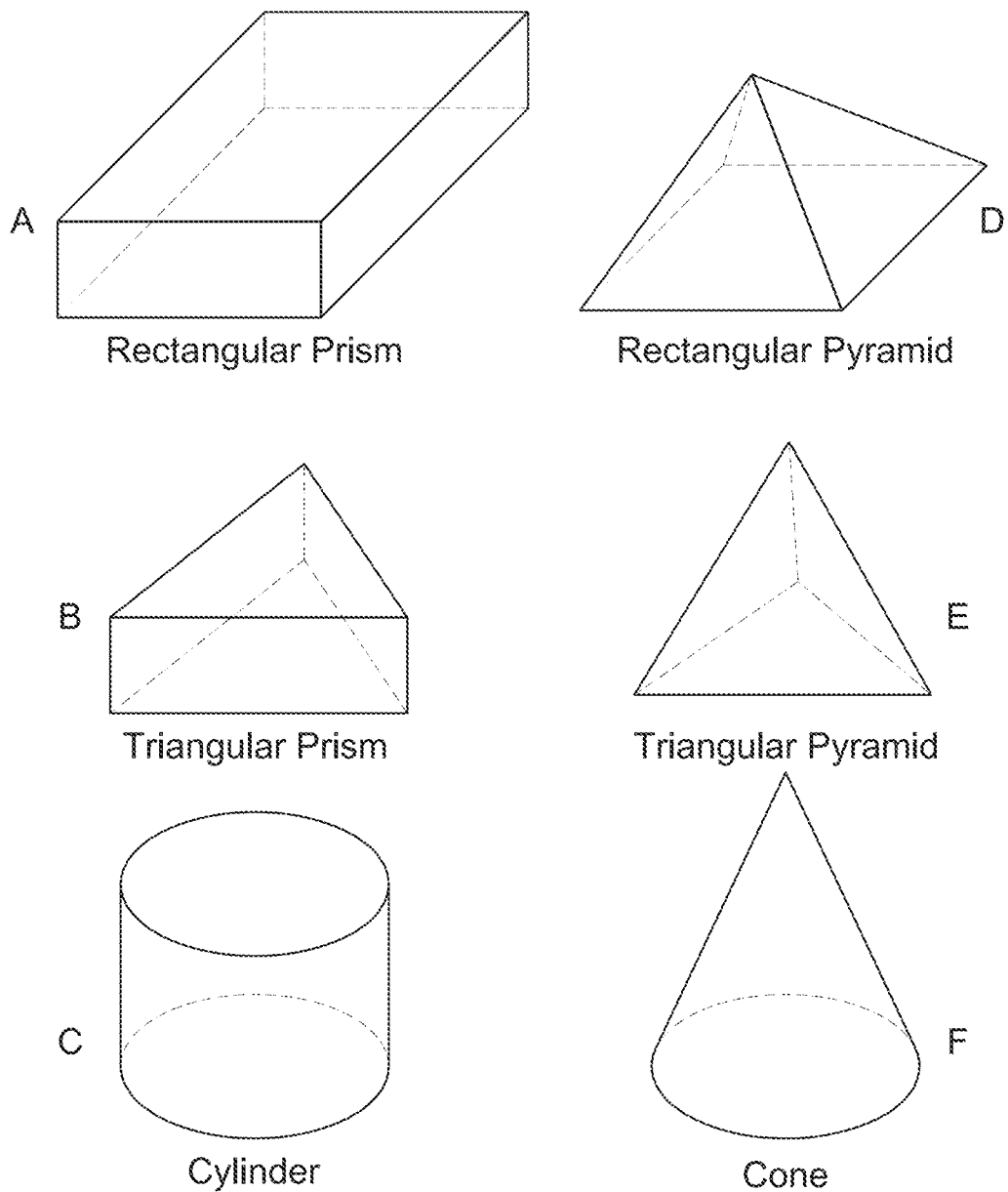
FIG. 10B illustrates examples of 3-dimensional shapes for spacers and indentations for accommodating the spacers.

With reference now to FIG. 10B, examples of 3-dimensional shapes for spacers and indentations for accommodating the spacers are illustrated. In some embodiments, the spacers 1020 and corresponding indentations 1030 may be laterally-elongated three-dimensional volumes. It will be appreciated that such laterally-elongated volumes may provide advantages for structural stability and mechanical strength, particularly where the waveguides are utilized to form stacks of similar waveguides. An example of such a laterally-elongated three-dimensional volume is shape A, a rectangular prism. In some embodiments, the spacers 1020 and corresponding indentations 1030 may have other shapes including rectangular prisms (shape B), cylinders (shape C), rectangular pyramids (shape D), triangular pyramids (shape E), and cones (shape F). It will be appreciated that, in a single waveguide and/or a stack of waveguides, multiple different shapes may be utilized in some embodiments. In some embodiments, the tops of the spacers 1020, having a pointed shape (e.g., a rectangular pyramid (shape D), a triangular pyramid (shape E), or a cone (shape F)), may be rounded or flattened to reduce stress at the point of contact with an overlying structure such as another waveguide. Where the spacers 1020 are formed by imprinting, the desired rounding or flattening of the tops of the shapes may be formed by an appropriately shaped mold or imprint reticle. It will be appreciated that the sides and tops of the spacers 1020 may comprise other shapes according to the requirements and specifications of an optical device comprising the stack of waveguides.

Figure 10C:
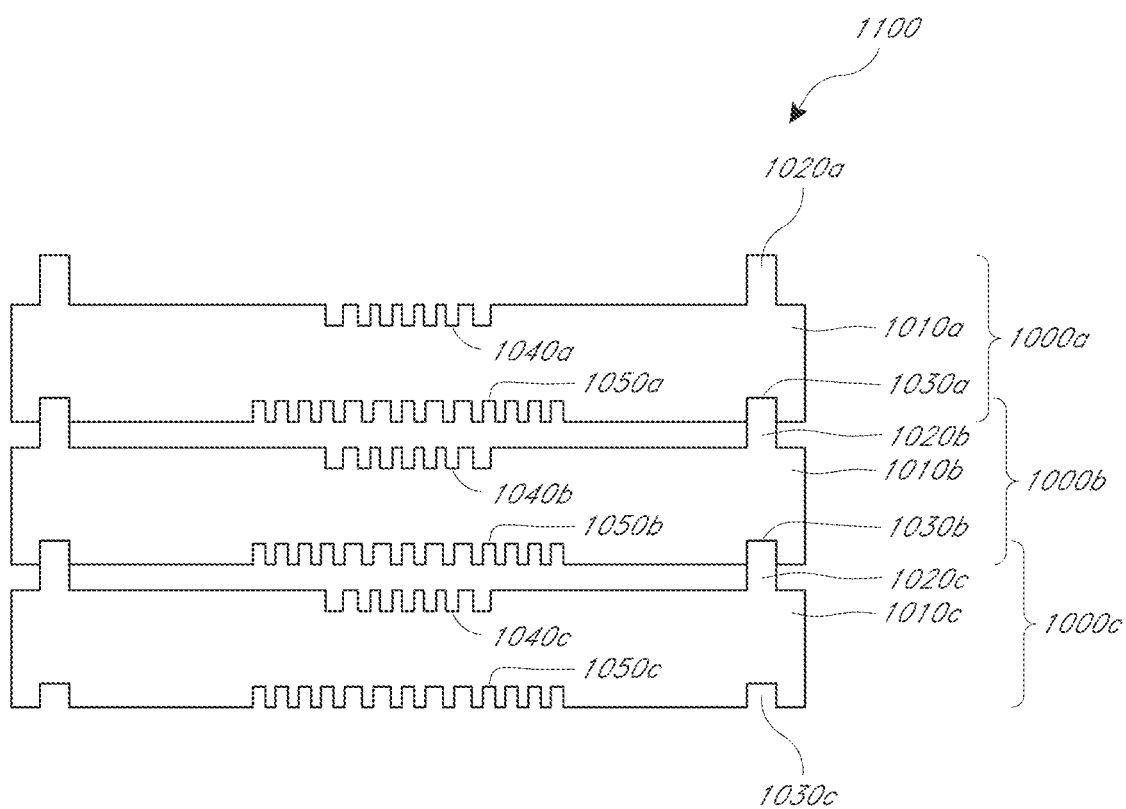
FIG. 10C illustrates an example of a stack of waveguides comprising spacers.

With reference now to FIG. 10C, an example of a stack of waveguides comprising spacers as illustrated. A stack 1100 of waveguides comprises individual waveguides 1000a, 1000b, and 1000c. Individual waveguides 1000a, 1000b, and 1000c comprise, respectively, optically transmissive bodies 1010a, 1010b, 1010c. Each waveguide further comprises, respectively, spacers 1020a, 1020b, 1020c. Preferably, each waveguide also comprises, respectively, indentations 1030a, 1030b, 1030c for accommodating the spacers of a directly underlying waveguide. It will be appreciated that the spacers have a height greater than the depth of the indentations, such that, once accommodated into the indentations, the spacers separate the waveguides by a gap (e.g., an air gap). As illustrated, the spacers 1020b fit within the indentations 1030a, and the spacers 1020c fit within the indentations 1030b.

In some embodiments, one or more of the waveguides 1000a, 1000b, 1000c may comprise surface relief features on one or more major surfaces of those waveguides. For example, each of these waveguides may comprise surface relief features 1040a, 1050b corresponding to the surface relief features 1040, 1050 of the waveguide 1000 (FIG. 10A). In some embodiments, different ones of the waveguides 1000a, 1000b, 1000c may include diffractive optical elements configured to in-couple and/or out-couple light of different wavelengths, e.g., corresponding to different component colors for forming a full-color image. For example, the waveguides 1000a, 1000b, 1000c may correspond to the waveguides 670, 680, 690 of FIGS. 9A-9C.

It will be appreciated that light may propagate through the waveguides 1000a, 1000b, 1000c by total internal reflection, e.g., from in-coupling optical elements to out-coupling optical elements. In addition, light leakage between the waveguides may degrade image quality. To reduce the likelihood that the spacers 1020, 1020a, 1020b, 1020c may be conduits for light leakage between waveguides, the spacers 1020, 1020a, 1020b, 1020c are preferably disposed at locations that are out of the path of propagation of light between in-coupling optical elements and out-coupling optical elements. Furthermore, the spacers 1020, 1020a, 1020b, 1020c may be preferably disposed at locations that are out of the path of light between an image injection device, such as image injection devices 360, 370, 380, 390, 400 of FIG. 6, and in-coupling optical elements. Furthermore, the spacers 1020, 1020a, 1020b, 1020c may be preferably disposed at locations that are out of the path of light between out-coupling optical elements and the eye of a user of a display device. For example, the spacers 1020, 1020a, 1020b, 1020c may be located along a perimeter of their respective waveguides.

Figure 11A:
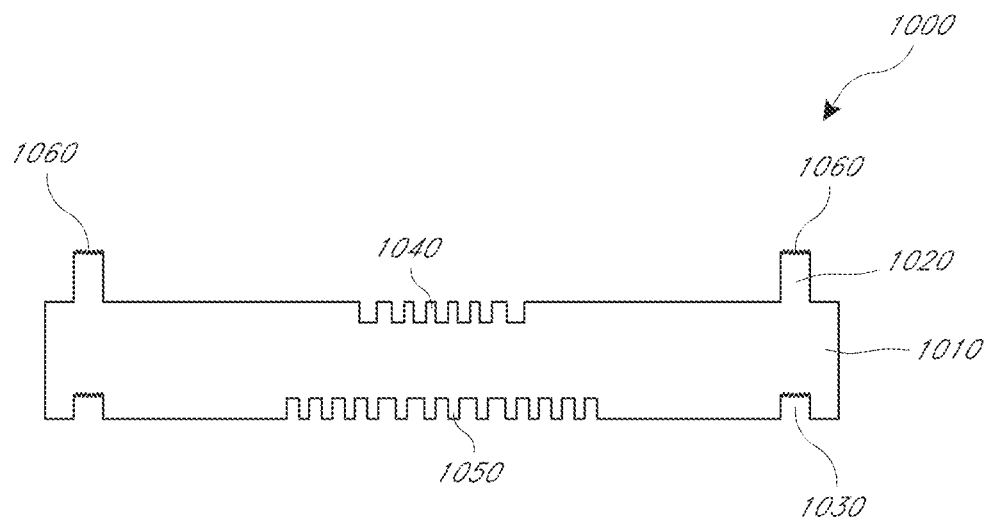
FIG. 11A illustrates an example of a waveguide comprising spacers with light scattering features.

In some embodiments, light leakage between waveguides may be mitigated using one or both of light scattering features and light leakage prevention materials at the interface between spacers 1020, 1020a, 1020b, 1020c and immediately adjacent waveguides. Examples of light leakage prevention materials include light absorbing materials and layers of material forming anti-reflective coatings. FIG. 11A illustrates an example of a waveguide comprising spacers 1020 with light scattering features 1060 on surfaces of the spacers that are configured to interface with an overlying waveguide. In some embodiments, the light scattering features 1060 may take the form of peaks and valleys (e.g., irregularly oriented peaks and valleys) on the surface of the spacers 1020. In some embodiments, the light scattering features 1060 may be provided only on top surfaces of the spacers. In some other embodiments, the light scattering features 1060 may also extend on the sides of the spacers 1020. It will be appreciated that light scattering features 1060 may be formed by roughening surfaces of the spacers 1020, e.g., by abrasion. In some embodiments, roughening spacers 1020 may prevent light leakage and also enhance the adhesion of the bonding between immediately adjacent waveguide layers. In some embodiments, the light scattering features 1060 may be formed during the formation of the spacers 1020. For example, spacers 1020 may be formed by imprinting, and the mold used to form the spacers 1020 may include a pattern to form the light scattering features 1060 at the tops of the spacers 1020 thereby advantageously allowing simultaneous formation of the waveguide features (e.g., diffractive optical elements 1040), spacers 1020, and the light scattering features 1060. Thus, the light scattering features 1060 may comprise regularly or irregularly shaped features and, in some embodiments, may take the form of a nanotextured surface, such as a grating (e.g., a nanograting). It will be appreciated that conventional waveguide materials such as glasses are generally considered not compatible with such simultaneous formation, due to concerns regarding breakage of discrete integral protrusions such as spacers and an inability to accurately reproduce the constituent features that form the diffractive optical elements 1040 and light scattering features 1060.

Figure 11B:
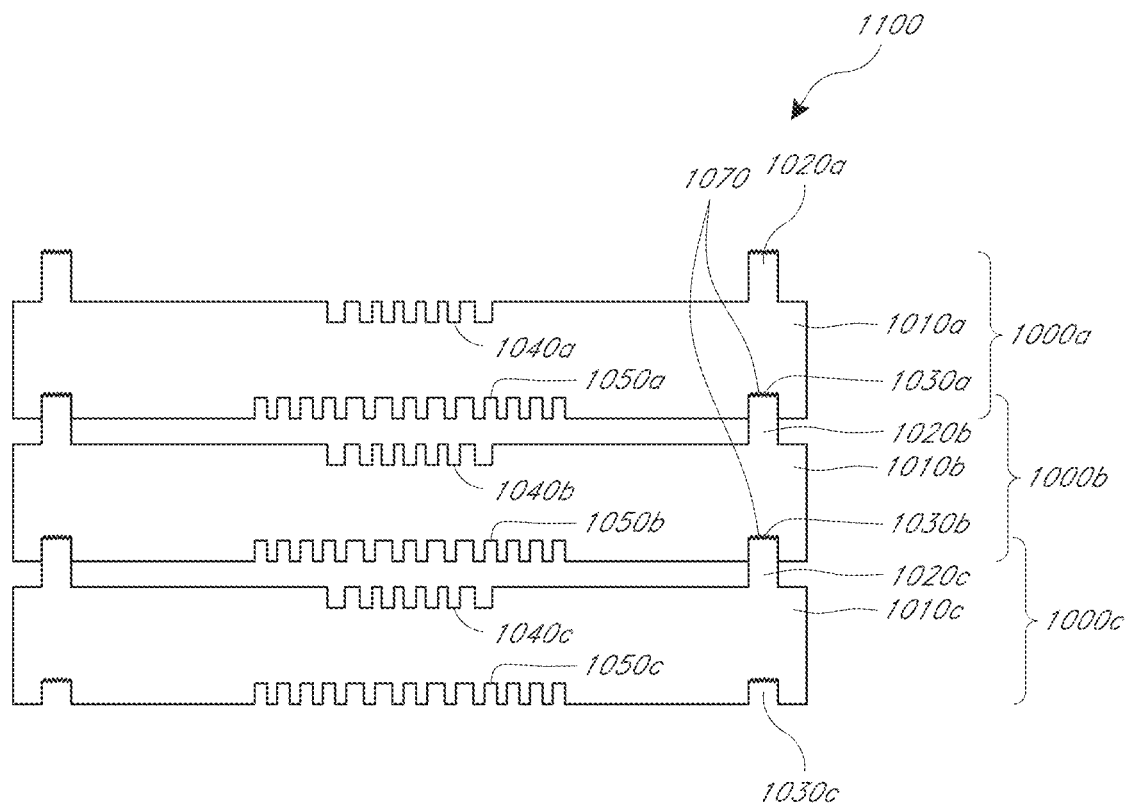
FIG. 11B illustrates an example of a stack of waveguides comprising spacers and light leakage prevention material at the interface between spacers and immediately neighboring waveguides.

As noted above, in some embodiments, one or more layers of material may be utilized to prevent light leakage between spacers and waveguides. FIG. 11B illustrates an example of a stack of waveguides 1100 comprising spacers 1020a, 1020b, 1020c and light leakage prevention material 1070 at the interface between the spacers and immediately neighboring ones of the waveguides 1000a, 1000b, 1000c. For example, light leakage prevention material 1070 may be a light absorbing material and/or one or more layers of material forming an antireflective coating. The light leakage prevention material 1070 may be provided between spacers 1020b and waveguide 1000a. Light leakage prevention material 1070 may also be provided between spacers 1020c and waveguide 1000b. The light leakage prevention material 1070 may also be provided on spacers 1020a and on indentations 1030c. In some embodiments, the light leakage prevention material 1070 may be applied to the spacers before attaching the spacers to another waveguide. For example, light leakage prevention material 1070 may be deposited on surfaces of the spacers before inserting the spacers into matching indentations in an overlying waveguide. Examples of light absorbing materials to serve as the light leakage prevention material 1070 include carbon black, meso-porous carbon, carbon nanotubes (single-walled as well as multi-walled nanotubes). Example of carbon nanotubes include single atom carbon nanotubes such as nanotubes sold under the name VANTA BLACK® and available from Surrey NanoSystems of Newhaven, the United Kingdom. In some embodiments, the light leakage prevention material 1070 may be a light absorbing adhesive which may be used to adhere the spacers to an overlying waveguide. In some embodiments, the spacers may include light scattering features and light leakage prevention materials at the interface between the spacers and an overlying waveguide.

In some embodiments, the spacers 1020a may be formed of light absorbing material themselves. For example, a light absorbing resin can be provided to form the spacers 1020a. Alternatively, a light absorbing material (e.g., a resin) may be doped with some light absorbing materials such as carbon black, meso-porous carbon, carbon nanotubes (single-walled as well as multi-walled nanotubes). Examples of carbon nanotubes include single atom carbon nanotubes such as nanotubes sold under the name VANTA BLACK® and available from Surrey NanoSystems of Newhaven, the United Kingdom. In some embodiments, doping the resin may comprise mixing light absorbing materials while the light absorbing material is in liquid form. In some embodiments, the light absorbing material may be doped with light absorbing material prior to casting of the light absorbing material to form the spacers 1020a. In some embodiments, spacers with the light absorbing material may be formed by depositing the light absorbing material into a mold for forming the spacers, and subsequently adding optically transmissive material to the mold to form the remainder of a waveguide.

With continued reference to FIG. 11B, the light leakage prevention material 1070 may form an anti-reflective coating. Examples of anti-reflective coatings include single and multi-layer anti-reflective coatings formed of partially reflective and partially transmissive layers of material.

As discussed herein, an adhesive may be used to adhere the integral spacers disclosed herein to a neighboring waveguide. Preferably, the adhesive is a light-absorbing adhesive, to reduce or prevent light leakage as discussed herein. In some other embodiments, the adhesive may be a non-light absorbing adhesive. In some embodiments, adhesives may be used alone or in combination with indentations to secure spacers to an adjacent waveguide.

In some embodiments, a low-viscosity adhesive may be utilized to attach the spacers to the neighboring waveguide. In some other embodiments, a medium or high-viscosity adhesive (which may simply be referred to as a high-viscosity adhesive herein) may be utilized to form a pillar extending substantially a height of the spacers, the pillar attaching a waveguide to the neighboring waveguide. Thus, adhesives may be provided to bond the spacers and/or the major surface of an underlying waveguide to the surface of an overlying waveguide.

For example, adhesive may be provided on the bottom surface of an overlying waveguide or within indentations on the bottom surface of an overlying waveguide. For example, adhesive may be dispensed within an indentation on the bottom surface of a waveguide while the bottom surface is facing up. The waveguide may then be flipped and placed on top of an underlying waveguide with spacers to bond the overlying waveguide and the underlying waveguide using the adhesive. This method may be preferable when using a low-viscosity adhesive, which may be more difficult to keep localized than a high-viscosity adhesive. In some embodiments, the adhesive (e.g., a high-viscosity adhesive) is use for bonding and may be applied to a top surface of the integral spacer and then the overlaying waveguide is placed on top of the spacer and adhesive to attach the overlying waveguide to the underlying waveguide.

As discussed herein, the use of solid integral spacers which define the separation distance between the neighboring waveguides provides one or more advantages. Using the assemblies and methods described herein, less precision may be required in controlling adhesive dispensing parameters (e.g. pressure, presence of bubbles, etc.) and alignment. The integral spacers provide a fixed gap between the upper surface of an underlying waveguide and the bottom surface of an overlying waveguide, such that precise application of the adhesive may not be required to maintain a consistent gap between layers of a waveguide stack. The built-in spacers can be cast with a very consistent height, which provides a consistent gap (e.g., an air gap) between adjacent layers and can increase the performance of a display device, as discussed herein.

FIG. 11C illustrates an example of a stack of waveguides 1100 comprising an adhesive 1180 at the interface between integral spacers 1120b and an immediately neighboring waveguide 1110a. It will be appreciated that the spacers 1120x (the numeral 1120 followed by various letters) may correspond to the spacers 1020. Spacers 1120b are integral to a waveguide 1100b. Spacers 1120a on waveguide 1100a and spacers 1120b on waveguide 1100b preferably comprise widths of about 10 µm to about 2000 µm in some embodiments. As examples, the widths of spacers 1120a, 1120b may be about 10 µm, about 20 µm, about 30 µm, about 40 µm, about 50 µm, about 100 µm, about 200 µm, about 300 µm, about 400 µm, about 500 µm, about 750 µm, about 1000 µm, about 1250, about 1500 µm, about 17500 µm, about 2000 µm, or any value between any two of the aforementioned values. Furthermore, the widths of spacers may be decreased if multiple spacers forming a sequence of walls are provided on a single waveguide. The spacers are preferably located on the periphery of a major surface of the associated waveguide to avoid interference with light propagation within the waveguide and with sight lines of a user. However, as discussed below, spacers can be located across the entire area of a major surface of the waveguide in some embodiments. The height of the spacers may vary depending on the desired distance between adjacent waveguides 1100a and 1100b, but may generally in the range between about 10 µm and about 200 µm. As examples, the height of the spacers 1120a, 1120b, may be about 10 µm, about 15 µm, about 20 µm, about 25 µm, about 30 µm, about 35 µm, about 40 µm, about 45 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, or any value between any two of the aforementioned values.

With continued reference to FIG. 11C, waveguides 1100a, 1100b further comprise surface relief features 1140a, 1140b and 1140c, 1140d, respectively. Surface relief features 1140a, 1140b, 1140c, 1140d, may comprise a pattern of protrusions and indentations sized and arranged to form a diffractive optical element, such as diffractive gratings. It will be appreciated that such diffractive optical elements may correspond to one or more of the in-coupling optical elements 700, 710, 720; light distributing elements 730, 740, 750; or out-coupling optical elements 800, 810, 820 of FIGS. 9A-9C.

In some embodiments, the waveguides 1100a, 1100b may omit some or all of the surface relief features 1140a, 1140b, 1140c, 1140d such that the major surfaces of waveguides 1100a, 1100b may be smooth except for spacers 1120a, 1120b, respectively. Furthermore, it will be appreciated that the surface relief features 1140a, 1140b, 1140c, 1140d may differ in size, number placement, and/or orientation from the illustrated embodiments.

In some embodiments, an adhesive 1180 may be disposed on the spacers 1120b. In some embodiments, the adhesive 1180 may be a low-viscosity adhesive. The low-viscosity adhesive may include, for example, one or more of the following: epoxies, silicones, polyurethanes, cyanoacrylates, methyl-cyanoacrylates, ethyl-cyanoacrylates, elastomeric contact cements, UV curable adhesives, fast cure adhesives, low-viscosity glues, and adhesive resins, among others. The adhesive 1180 preferably has an as-deposited viscosity (the viscosity of the adhesive before being cured) in the range of about 5 mPa·s to about 100 mPa·s. As examples, the adhesive 1180 may have a viscosity of about 5 mPa·s, about 10 mPa·s, about 15 mPa·s, about 20 mPa·s, about 25 mPa·s, about 30 mPa·s, about 35 mPa·s, about 40 mPa·s, about 45 mPa·s, about 50 mPa·s, about 55 mPa·s, about 60 mPa·s, about 65 mPa·s, about 70 mPa·s, about 75 mPa·s, about 80 mPa·s, about 85 mPa·s, about 90 mPa·s, about 95 mPa·s, about 100 mPa·s, or any value between any two the aforementioned values. In some embodiments, the low-viscosity adhesive may be deposited by jet deposition (e.g., inkjet deposition), and the low-viscosity of the adhesive may facilitate the deposition of the adhesive. In some other embodiments, the adhesive may be applied to the spacer by contacting the spacer with an open reservoir of the adhesive. It will be appreciated that, after being deposited, the adhesive may become hardened, that is, change from a flowable liquid form to a solid form (e.g., by curing, such as by exposure to UV and/or heat).

The adhesive 1180 may be applied during a stacking process, wherein two or more waveguides are bonded and stacked to form a stacked waveguide assembly or waveguide stack, such as stacked waveguide assembly 260 of FIG. 6. In some embodiments, after stacking two adjacent waveguides, or after stacking of the entire waveguide assembly, the adhesive 1180 may undergo a curing process, wherein the adhesive 1180 may be hardened, e.g., by exposure to heat, light, air, etc. Once cured, the adhesive 1180 may provide a high strength and flexible or rigid bond between adjacent waveguides. After curing, adhesive 1180 may be resistant to changes in temperature or humidity, such that the adhesive is capable of maintaining a strong bond despite temperature changes or exposure to moisture inside of a display device.

In some embodiments, the adhesive may comprise a thickness defined by a distance between the top surface of spacers 1120b and the underlying surface of waveguide 1100a. In some embodiments, the thickness of the adhesive 1180 after curing may range from about 2 µm to about 20 µm. As examples, the thickness of adhesive 1180 may be about 2.0 µm, about 2.5 µm, about 3.0 µm, about 3.5 µm, about 4.0 µm, about 4.5 µm, about 5.0 µm, about 5.5 µm, about 6.0 µm, about 6.5 µm, about 7.0 µm, about 7.5 µm, about 8.0 µm, about 8.5 µm, about 9.0 µm, about 9.5 µm, about 10.0 µm, about 10.5 µm, about 11.0 µm, about 11.5 µm, about 12.0 µm, about 12.5 µm, about 13.0 µm, about 13.5 µm, about 14.0 µm, about 14.5 µm, about 15.0 µm, about 15.5 µm, about 16.0 µm, about 16.5 µm, about 17.0 µm, about 17.5 µm, about 18.0 µm, about 18.5 µm, about 19.0 µm, about 19.5 µm, about 20.0 µm, or any value between any two of the aforementioned values. Preferably, the adhesive has a high refractive index. For example, adhesive 1180 may have a refractive index above 1.65 and can be doped with a black colorant or light absorbing material (e.g., a light-absorbing dye). As discussed in further detail below, unutilized light, if not absorbed at the adhesive or edge of the waveguide, may potentially reflect back into an active display region and create undesirable ghost images or stray light, thus lowering image quality. A high refractive index and black dopant may advantageously reduce or eliminate the reflection of unutilized light from the adhesive 1180 to the active display region.

It will be appreciated that, in some embodiments, the waveguides 1100a, 1100b may each be parts of larger sheets of optically transmissive material, which may then be cut or singulated to form multiple discrete stacks of waveguides, each of which may form an individual eyepiece for the display device. Thus, after stacking the waveguides and curing the adhesive 1180, an excess peripheral area of the stack of waveguides 1100 may be removed as part of a singulation process. During singulation, excess material may be removed from the waveguide stack 1100 along, for example, the singulation path 1185. Singulation may be performed using, for example, a laser cutting apparatus. In embodiments in which the singulation path proceeds along a length of the spacer, the spacer may be understood to define an edge of the waveguide, since the edge of the waveguide and the spacer are effectively coextensive. In some embodiments, the waveguides disclosed herein may be understood to be sheets of optically transmissive material which have been singulated from larger sheets of optically transmissive material. Preferably, in some embodiments, the waveguides forming a stack of waveguides are substantially parallel relative to one another.

It will be appreciated that the location of the singulation path 1185 may be altered depending on the placement, number, orientation, and size of spacers 1120a, 1120b, as well as the placement, thickness, type, and physical properties of the adhesive 1185. As illustrated in FIG. 11C, the singulation path 1185 may be located such that singulation results in removal of a portion of spacers 1120a, 1120b. In some embodiments, such as that illustrated in FIG. 11E, the singulation path 1185 may be located such that singulation results in complete removal of spacers 1120a, 1120b. As will be further discussed below regarding FIG. 11E, in embodiments where singulation completely removes the spacers 1120a, 1120b from the waveguide stack 1100, a relatively large mass of adhesive forming one or more pillars may be provided between the upper surface of waveguide 1100b and the lower surface of waveguide 1100a to maintain a consistent separation between those waveguides. In some embodiments, singulation path 1185 may be located such that the peripheral sides of spacers 1120b are removed. As a result, after singulation, the waveguide stack 1100 may comprise a straight peripheral edge. However, in some embodiments, as described in further detail below, various edge treatments may be applied to waveguides 1100a, 1100b to increase performance of the waveguide stack 1100.

Figure 11D:
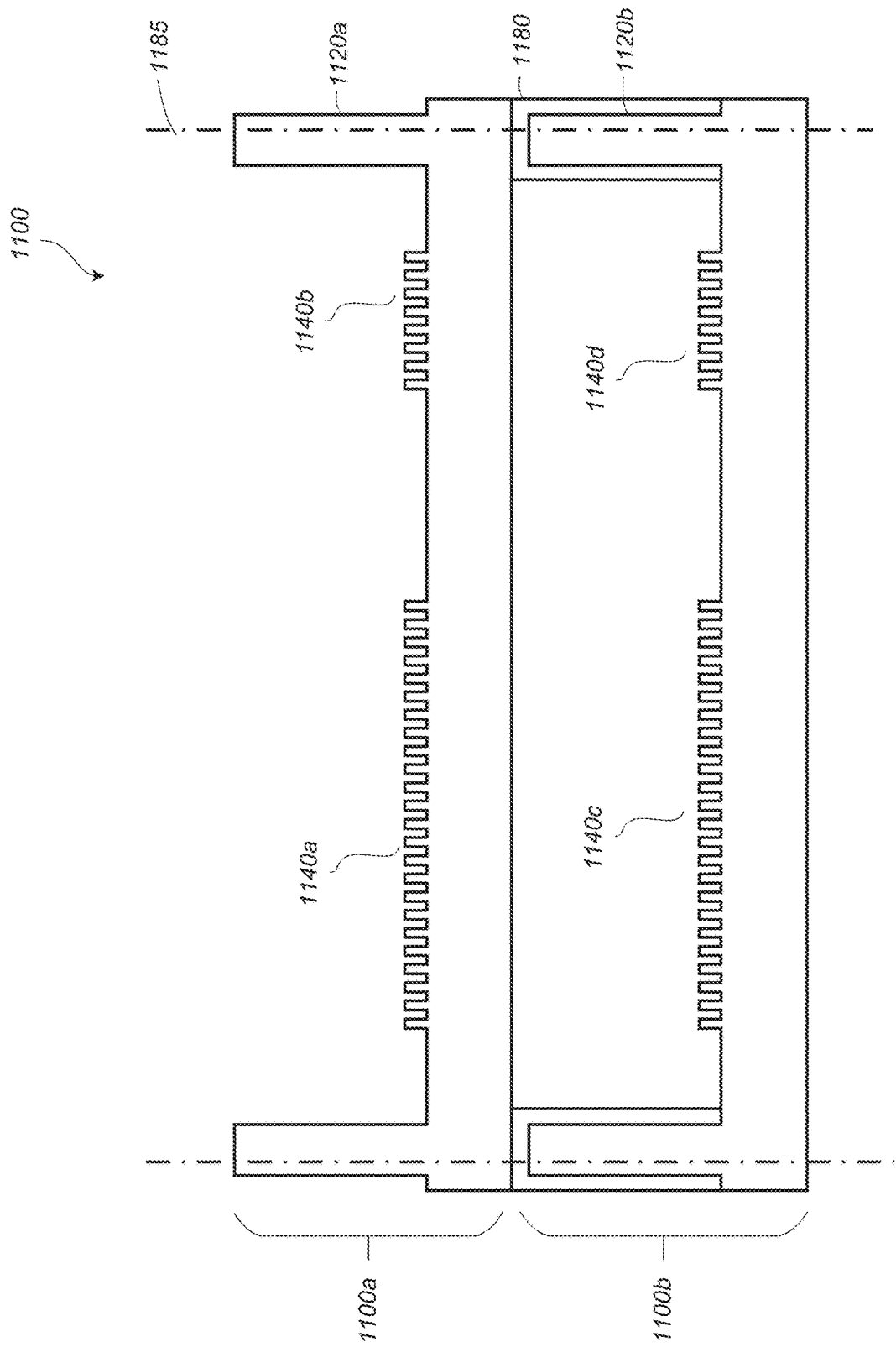
FIG. 11D illustrates an example of a stack of waveguides comprising an adhesive at both the interface between spacers and immediately neighboring waveguides and on the vertical sides of the spacers.

With reference now to FIG. 11D, an example is illustrated of a stack of waveguides comprising an adhesive at both the interface between spacers and an immediately neighboring waveguide and on the vertical sides of the spacers. In some embodiments, adhesive 1180 may be initially applied to the top of spacers 1120*b* and subsequently flow down the sides of spacers 1120*b*. This may occur, for example, if the adhesive 1180 comprises a low-viscosity adhesive, as a less viscous adhesive may readily flow from the top surface of spacers 1120*b* to the sides. As described in detail below with regard to FIG. 11H, in some embodiments, one or more hollow depressions can be provided on the upper major surface of waveguide 1100*b* to prevent the further flow of adhesive 1180 onto the active area, in particular the flow of adhesive to the active area defined by surface features 1140*c*, 1104*d*.

Figure 11E:
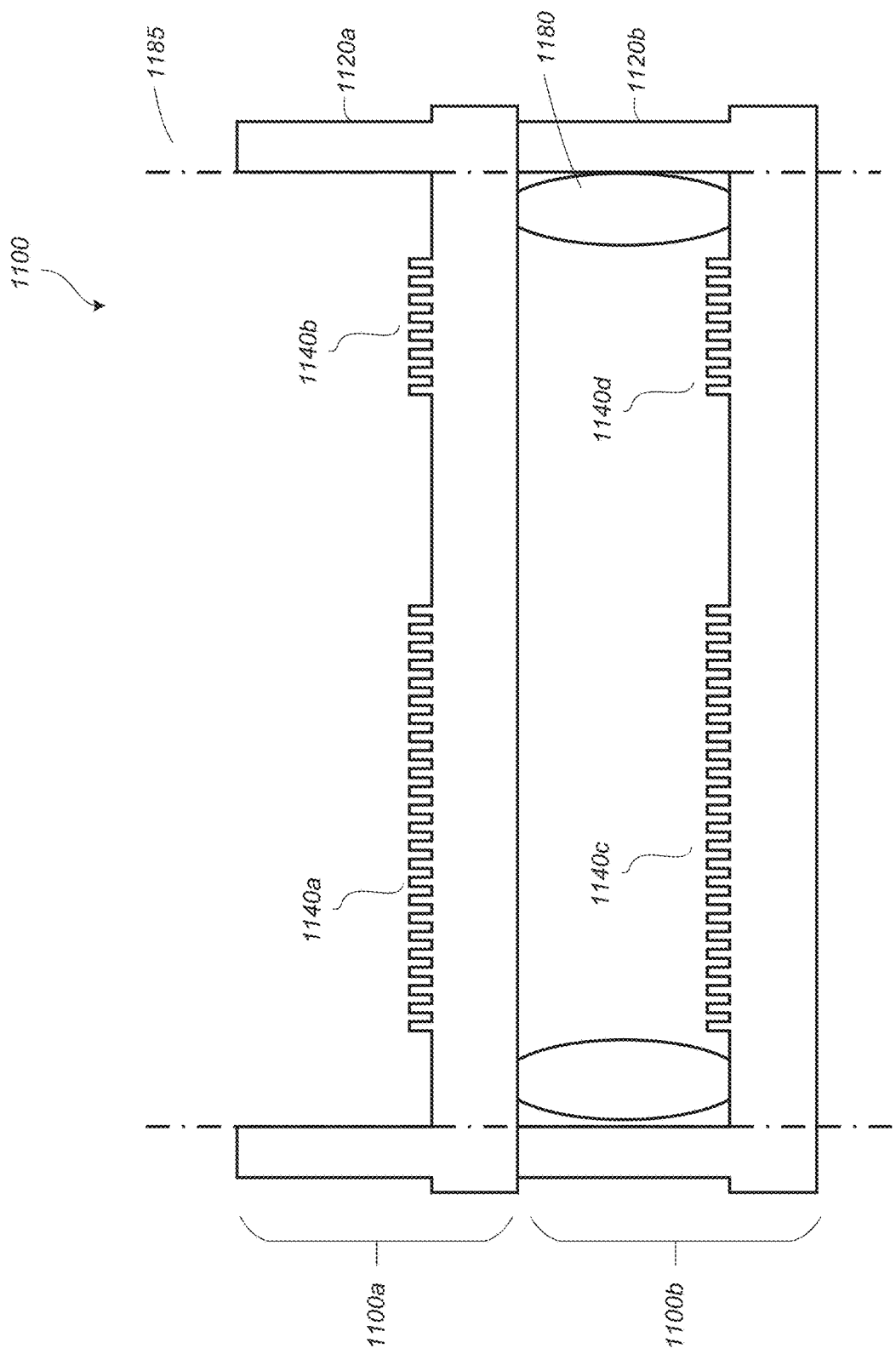
FIG. 11E illustrates an example of a stack of waveguides comprising adhesive forming pillars adjacent to the spacers.

In some embodiments, a relatively large mass of adhesive 1180 may be provided contacting and extending directly between an upper major surface of waveguide 1100*b* and a lower major surface of waveguide 1100*b*. Such a large mass of adhesive 1180 may be understood to form a pillar extending between those major surfaces. Advantageously, the pillar may increase the stability of the waveguide stack 1100. In some embodiments, adhesive 1180 may be provided adjacent to spacers 1120*b*. FIG. 11E illustrates an example of a stack of waveguides comprising an adhesive forming pillars adjacent to the spacers. In some embodiments, the integral spacers 1120*b* may be formed during casting of the waveguide 1100*b* and may be used to set the distance or gap between waveguide 1120*a* and 1120*b* during stacking of the waveguides. Before singulation, adhesive 1180 may be applied directly on the upper major surface of waveguide 1100*b* adjacent to spacers 1120*b*. Adhesive 1180 may be used to bond the lower surface of waveguide 1100*a* to the upper surface of waveguide 1120*b*.

Advantageously, using adhesive 1180 in combination with spacers 1120*b* reduces the precision needed when applying adhesive 1180. During stacking of waveguides 1100*a*, 1100*b*, the spacers 1120*b* provide a physical barrier between the waveguides, preventing the lower surface of waveguide 1100*a* from advancing nearer to the upper surface of waveguide 1100*b*. Consequently, adhesive 1180 is not necessarily needed to maintain the distance between waveguides 1100*a*, 1120*b* prior to singulation. The adhesive 1180 may be used to fix waveguide 1100*a* to waveguide 1100*b* and may be compressed until the spacers 1120*b* prevent further compression. As a result, the requirements for high precision and accuracy in the amount of adhesive dispensed may be lessened; rather, a surplus of adhesive may be applied and the spacers 1120*b* may be utilized to provide a consistent separation between waveguides 1100*b* and 1100*a*. Nevertheless, in some embodiments, the volume of applied adhesive 1180 is precisely controlled, such that during stacking of waveguides 1100*a*, 1100*b* the adhesive is prevented from flowing into an active area of waveguide 1100*b*. Utilizing integral spacers and adhesive in combination may therefore enable the creation of a consistent gap between two adjacent waveguides in a waveguide stack, increasing performance.

In some embodiments where the adhesive 1180 forms a pillar to bond two neighboring waveguides together, adhesive 1180 preferably comprises a medium or high-viscosity adhesive. Where adhesive 1180 is applied or deposited adjacent to spacers 1120*b* and interior to the spacers 1120*b* (on the inside of spacers 1120*b*, in the volume defined by the spacers 1120*b* and encompassing the features 1140*c*, 1140*d*), medium or high-viscosity adhesive may be preferred to limit or prevent the flow of adhesive into active areas of waveguide 1100*b*, particularly preventing flow to surface features 1140*c*, 1140*d*. When adhesive 1180 is applied adjacent to spacers 1120*b* and interior to spacers 1120*b*, the adhesive 1180 preferably has an as-deposited viscosity (viscosity before being cured or hardened) in the range of about 10,000 mPa·s to about 50,000 mPa·s. As examples, the adhesive may have a viscosity of about 10,000 mPa·s, about 12,000 mPa·s, about 14,000 mPa·s, about 16,000 mPa·s, about 18,000 mPa·s, about 20,000 mPa·s, about 22,000 mPa·s, about 24,000 mPa·s, about 26,000 mPa·s, about 28,000 mPa·s, about 30,000 mPa·s, about 32,000 mPa·s, about 34,000 mPa·s, about 36,000 mPa·s, about 38,000 mPa·s, about 40,000 mPa·s, about 42,000 mPa·s, about 44,000 mPa·s, about 46,000 mPa·s, about 48,000 mPa·s, about 50,000 mPa·s, or any value between any two the aforementioned values. It will be appreciated that, after being deposited, the adhesive may become hardened (e.g., by curing).

of high-viscosity adhesives include one or more of the following: epoxies, silicones, polyurethanes, cyanoacrylates, methyl-cyanoacrylates, ethyl-cyanoacrylates, elastomeric contact cements, UV cure adhesives, fast cure adhesives, medium or high-viscosity glues, and adhesive resins, among others. Preferably, adhesive 1180 has a high refractive index. For example, adhesive 1180 may have a refractive index above 1.65. Furthermore, adhesive 1180 may be doped with black colorant or light-absorbing material (e.g., a light-absorbing dye) in order to promote the absorption of underutilized light.

After completion of the stacking process, the entirety of integral spacers 1120*a*, 1120*b* may be removed during singulation. As illustrated in FIG. 11E, the singulation path 1185 may be along the inner side of spacers 1120*a*, 1120*b*, such that spacers 1120*a*, 1120*b* are removed from waveguide stack 1100, while adhesive 1180 remains intact as part of the final waveguide stack 1100. At the time of singulation, adhesive 1180 may have been previously cured and hardened such that the distance between waveguides 1100*a*, 1100*b* remains substantially constant despite removal of the spacers 1120*b*. Thus, in some embodiments, after singulation, waveguide stack 1100 may not comprise spacers 1120*a*, 1120*b*, and the gap between adjacent waveguides, for example, waveguide 1100*a* and 1100*b*, is maintained by cured adhesive 1180.

Figure 11F:
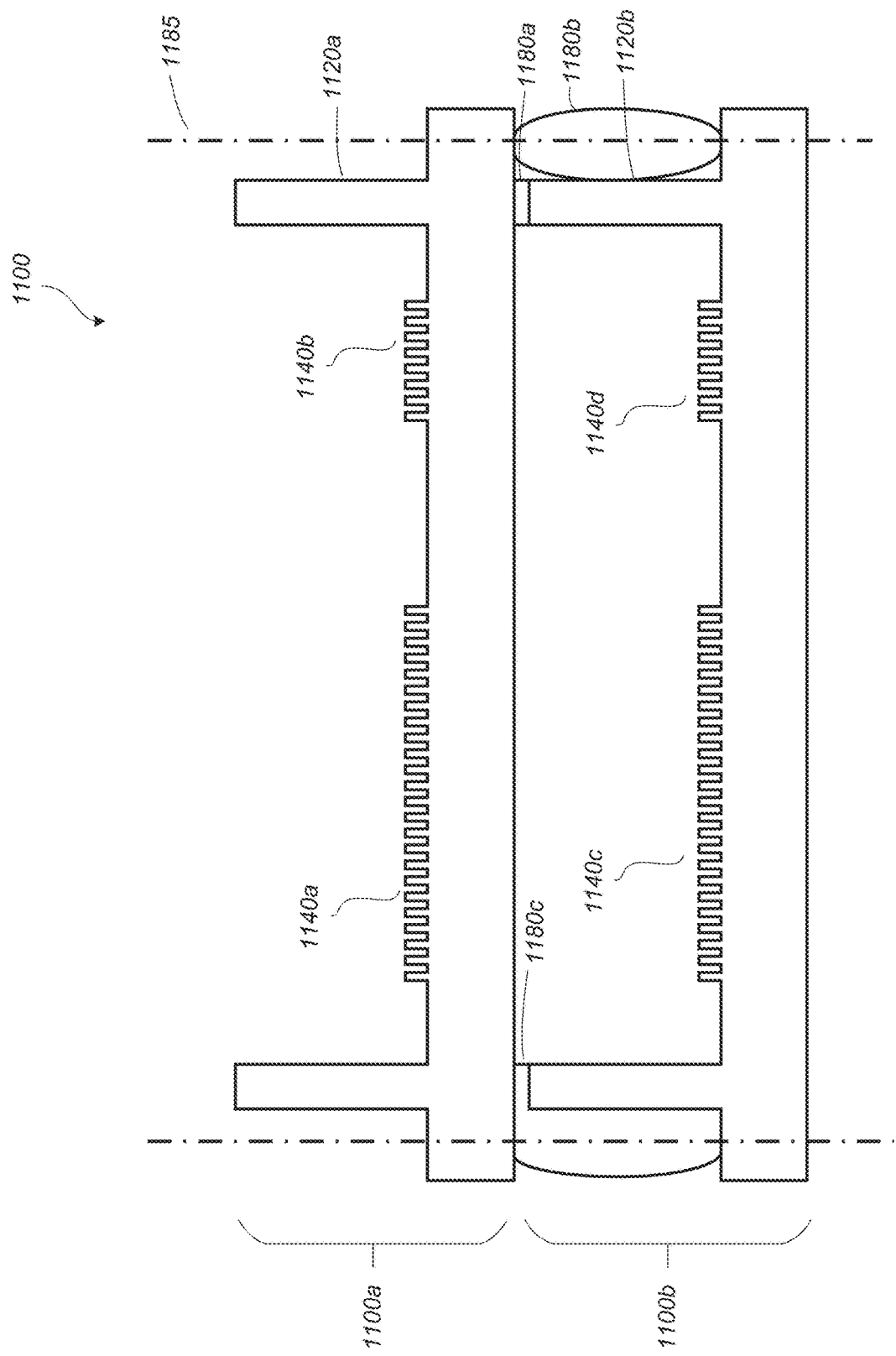
FIG. 11F illustrates an example of a stack of waveguides comprising a first adhesive at the interface between spacers and immediately neighboring waveguides and a second adhesive forming a pillar adjacent to the spacers.

In some embodiments, two or more adhesives may be provided on waveguide 1100*b* to further enhance the bond strength and mechanical stability of waveguide stack 1100. FIG. 11F illustrates an example of a stack of waveguides comprising a first adhesive at the interface between spacers and immediately neighboring waveguides and a second adhesive adjacent to the spacers. In some embodiments, the waveguide stack 1100 may comprise both a low-viscosity adhesive 1180*a* and a medium or high-viscosity adhesive 1180*b*. Low-viscosity adhesive 1180*a* may be dispensed and adhered onto the top surface of spacers 1120*b*, while medium or high-viscosity adhesive 1180*b* may be dispensed and adhered on an upper major surface of waveguide 1100*b* adjacent to spacers 1120*b*. As illustrated in FIG. 11F, prior to curing, low-viscosity adhesive 1180*a* and medium to high-viscosity adhesive 1180*b* may flow to form a mixed adhesive 1180*c*. In some other embodiments, the adhesive 1180*c* may be understood to be a single adhesive (e.g., a medium or high-viscosity adhesive) which extends to the side and above a spacer. It will also be understood that, in some embodiments, the adhesives 1180*a* and 1180*b* may remain distinct, such that both the left and right sides have a similar distinct arrangement of adhesives on the top and sides of an adjacent spacer. In some other embodiments, the adhesive 1180*c* may be understood to be present at both the left and right sides of the illustrated waveguide stack 1100.

Low-viscosity adhesive 1180*a* may comprise any of the low-viscosity adhesives described above with regard to FIG.

11C. Medium or high-viscosity adhesives may comprise any of the medium or high-viscosity adhesives described above with regard to FIG. 11E. Both low-viscosity adhesive 1180a and medium or high-viscosity adhesive 1180b preferably have a high refractive index. For example, the refractive index of both low-viscosity adhesive 1180a and medium or high-viscosity adhesive 1180b may be above 1.65 in some embodiments. Furthermore, both low-viscosity adhesive 1180a and medium or high-viscosity adhesive 1180b may be doped with black colorant or light absorbing material (e.g., a light-absorbing dye) to facilitate absorption of light to, e.g., prevent light leakage.

It will be appreciated that the use of multiple adhesives may increase adhesion between waveguide 1100a and waveguide 1100b and improve the robustness of waveguide stack 1100. In some embodiments, medium or high-viscosity adhesive 1180b may be provided on the periphery of waveguide 1100b, outside of spacers 1120b, as illustrated in FIG. 11F. Providing the medium or high-viscosity adhesive 1180b on the outside periphery of waveguide 1100b, beyond spacers 1120b, allows spacers 11029b to serve as a physical barrier between adhesive 1180b and the active area of waveguide 1100b, particularly surface features 1140c, 1140d. Nevertheless, it will be appreciated that medium to high-viscosity adhesive 1180b may be provided interior of the spacers 1120b, as described with regard to FIG. 11E. In some embodiments, medium to high-viscosity adhesive 1180b may be provided on both sides of spacers 1120b. Providing medium to high-viscosity adhesive 1180b on both sides of spacers 1120b may further increase the bond strength between waveguide 1100a and waveguides 1100b.

With continued reference to FIG. 11F, singulation path 1185 may be located such that at least a portion of medium to high-viscosity adhesive 1180b is removed upon singulation. Removal of a peripheral portion of medium to high-viscosity adhesive 1180b may result in a straightened peripheral edge of waveguide stack 1100. In some embodiments, as described in further detail below, various edge treatments may be applied to waveguides 1100a, 1100b to increase performance of the waveguide stack 1100.

Figure 11G:
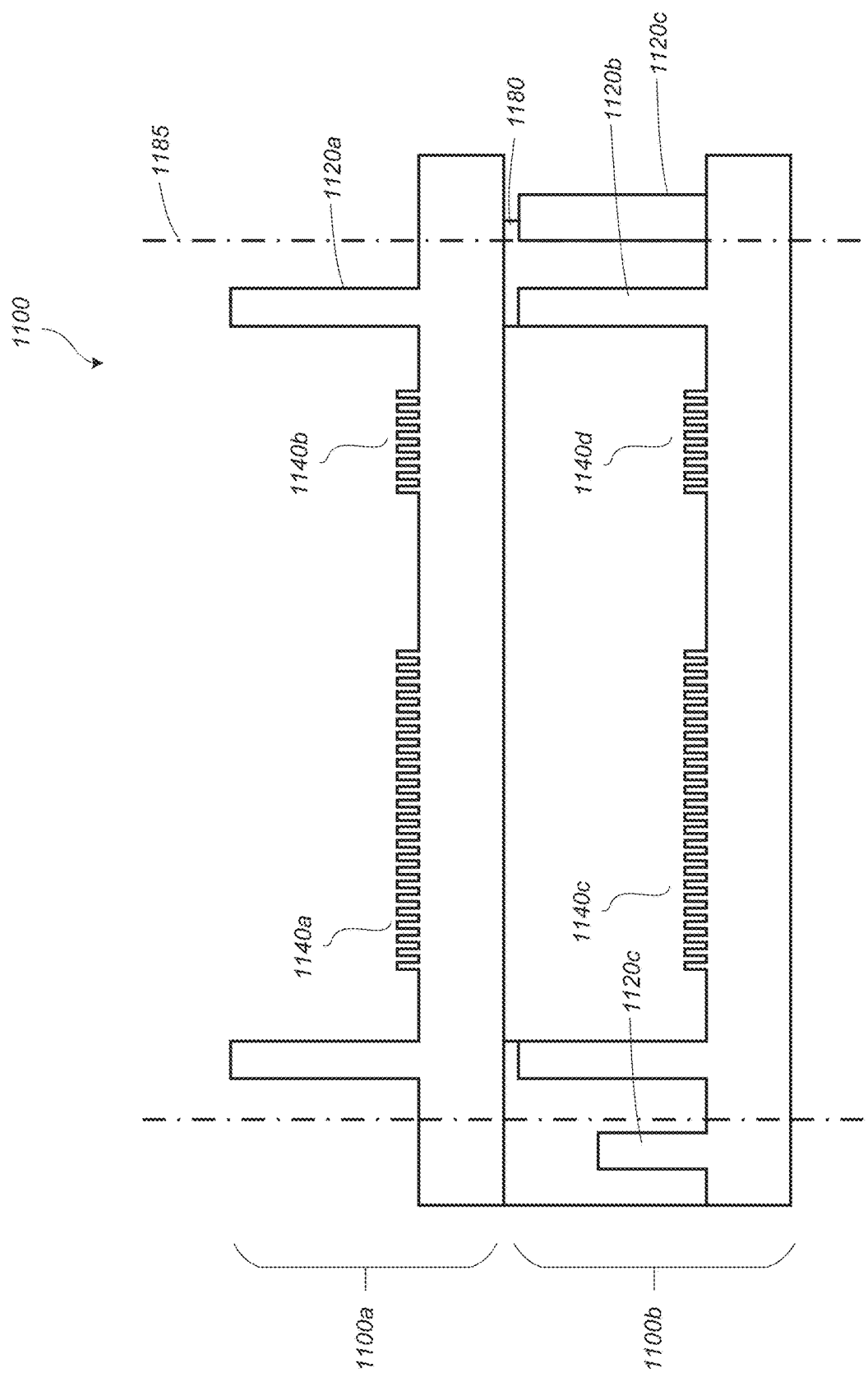
FIG. 11G illustrates an example of a stack of waveguides comprising a plurality of spacers forming volumes therebetween, the volumes holding adhesive extending up to immediately neighboring waveguides.

In some embodiments, multiple spacers may be provided extending along each peripheral edge of waveguides 1100a, 1100b. For example, the spacers may extend alongside one another along perimeters of the waveguides 1100a, 1100b. FIG. 11G illustrates an example of a stack of waveguides comprising a plurality of spacers and one or more adhesives both in the volume formed between the spacers and at the interface between top surfaces of spacers and immediately neighboring waveguides. Although the example waveguide stack 1100 of FIG. 11G illustrates only waveguide 1100b comprising multiple spacers 1120b, 1120c, it will be appreciated that some or all waveguides of a waveguide stack assembly may comprise multiple spacers on each peripheral edge. In some embodiments, spacers 1120b, 1120c extend alongside one another and may be, e.g., elongated parallel to one another.

With continued reference to FIG. 11G, two or more integral spacers may be created during casting of a polymer eyepiece. Each of spacers 1120b, 1120c may have identical heights, which may advantageously provide additional physical barriers between an adhesive or external debris and an active area of the waveguide 1100b. Furthermore, one or more waveguides having multiple spacers may provide additional stability to the waveguide stack 1100 during the stacking and singulation processes. Additionally, providing multiple spacers on a waveguide may ensure that a consistent gap is created between the entirety of the bottom surface of an overlying waveguide and the upper surface of an underlying waveguide by providing multiple points of contact with identical heights. In some embodiments, waveguide 1100b may be provided with a plurality of spacers, increasing bonding area and strength.

In some embodiments, as illustrated on the left side of the waveguide stack 1100 of FIG. 11G, spacers 1120c may have different heights than spacers 1120b. For example, the height of spacers 1120c may be less than or greater than the height of spacers 1120b. The height of spacers 1120c and additional spacers may be varied to trap adhesive between walls of spacers, prevent external contaminants such as debris from entering the active area of the waveguide 1100b, and to provide additional stability. In some embodiments, outer spacers 1120c have a lower height than inner spacers 1120b. This configuration may promote outward flow of adhesive 1180 away from the central active area of waveguide 1100b and towards the peripheral edge of waveguide 1100b. Furthermore, in any of the configurations described herein, adhesive may be applied at the edge of waveguide 1100b to reduce the spread of adhesive to the central area of the waveguide 1100b.

In some embodiments, adhesive 1180 may be provided between spacers 1120b and 1120c, on the top surface of spacers 1120b, 1120c, and on the outside of spacers 1120c, as illustrated in FIG. 11G. Alternatively, in some embodiments, adhesive 1180 may be provided only on the top surfaces of spacers 1120b, 1120c and between spacers 1120b and spacer 1120c. In some embodiments, adhesive 1180 may be provided only on the top surfaces of spacers 1120b and/or the top surfaces of spacers 1120c. Furthermore, any of the adhesive types, arrangements, and placements previously discussed with regard to FIGS. 11C-11F can be utilized with multiple spacers on a single waveguide. For example, low, medium, or high-viscosity adhesives may be used alone or in any combination. Adhesive can be provided on any location of waveguide 1100b, but is preferably not provided on the active area, particularly upon surface features 1140c, 1140d. In some embodiments, the space between adjacent walls of spacers, for example, the space between spacers 1120b and 1120c, may be devoid of adhesive 1180 to improve ease of singulation through the area. For example, the area of singulation path 1185 may be provided without adhesive 1180 to reduce the difficulty of simulation and reduce the creation of debris. In some embodiments, multiple spaces between adjacent walls of spacers may be left devoid of adhesive 1180.

During singulation, one or more walls of spacers may be removed from the waveguide stack 1100. For example, at least a portion of spacers 1120c may be removed during singulation. Prior to removal, spacers 1120c may confine adhesive 1180 from entering the central active area of the waveguide 1100b.

Figure 11H:
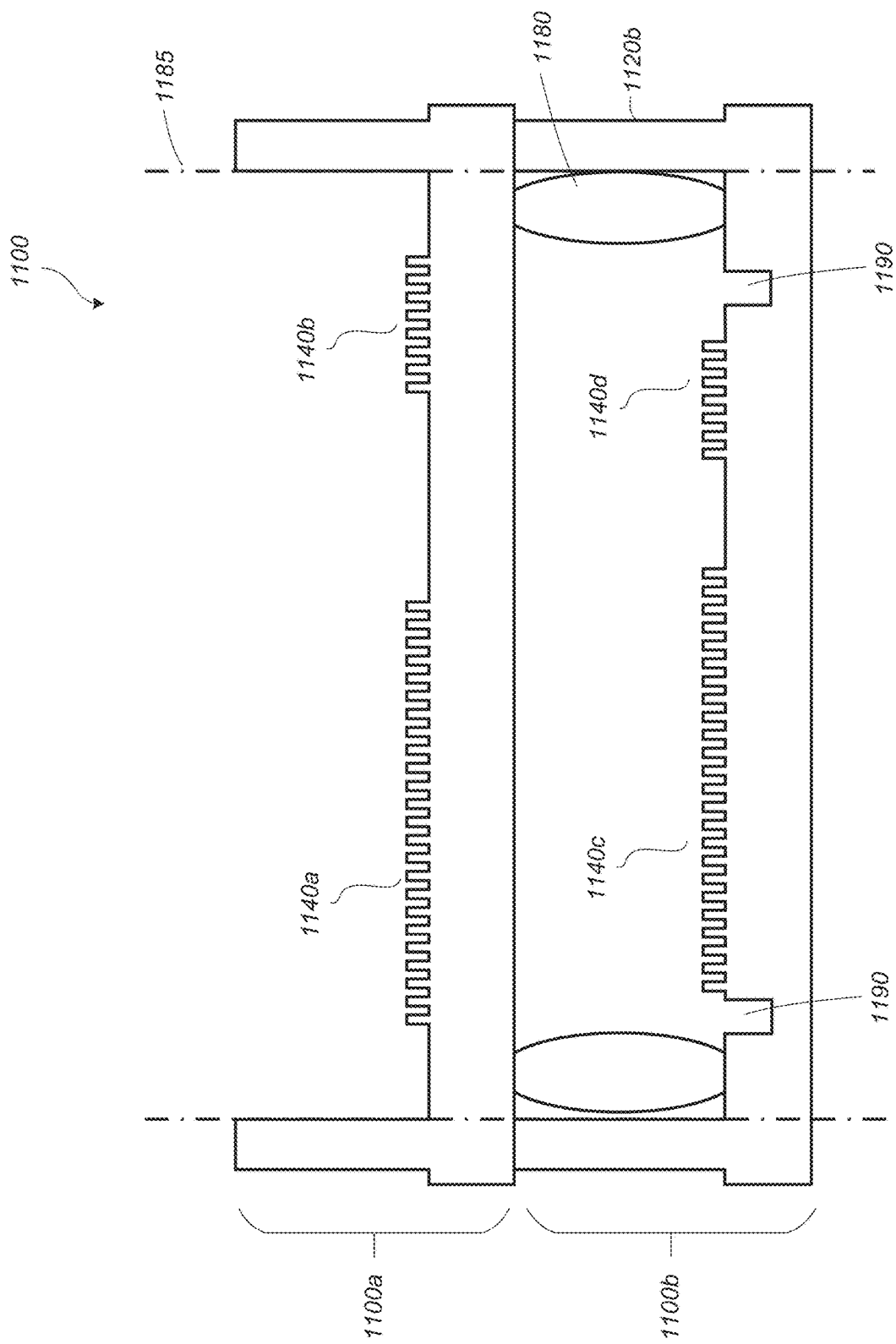
FIG. 11H illustrates an example of a stack of waveguides comprising an adhesive-trapping depression on a major surface of the waveguide between an adhesive and an active area of the waveguide.

In some embodiments, one or more depressions 1190 may be formed between surface features 1140c, 1140d and spacers 1120c. FIG. 11H illustrates an example of a stack of waveguides comprising a groove or depression on a major surface of the waveguide between an adhesive and an active area of the waveguide. Even when medium or high-viscosity adhesives are used, some adhesive may flow from the periphery of waveguide 1100b towards the active area that includes surface features 1140c, 1140d. Depressions 1190 may thus be provided on the upper major surface of waveguide 1100b to capture and prevent the flow of adhesive 1180 into the active area, particularly onto surface features 1140c, 1140d. In some embodiments, the depressions may have a width in the range of 50 µm to 2 mm, and a depth in the range of 50 µm to 0.4 mm. Depressions 1190 can be utilized in any of the aforementioned configurations, including, for example, the configurations of FIGS. 11C-11G. Depressions may also be provided between adjacent walls of spacers, such as between spacers 1120b and spacers 1120c of FIG. 11G.

Figure 11I:
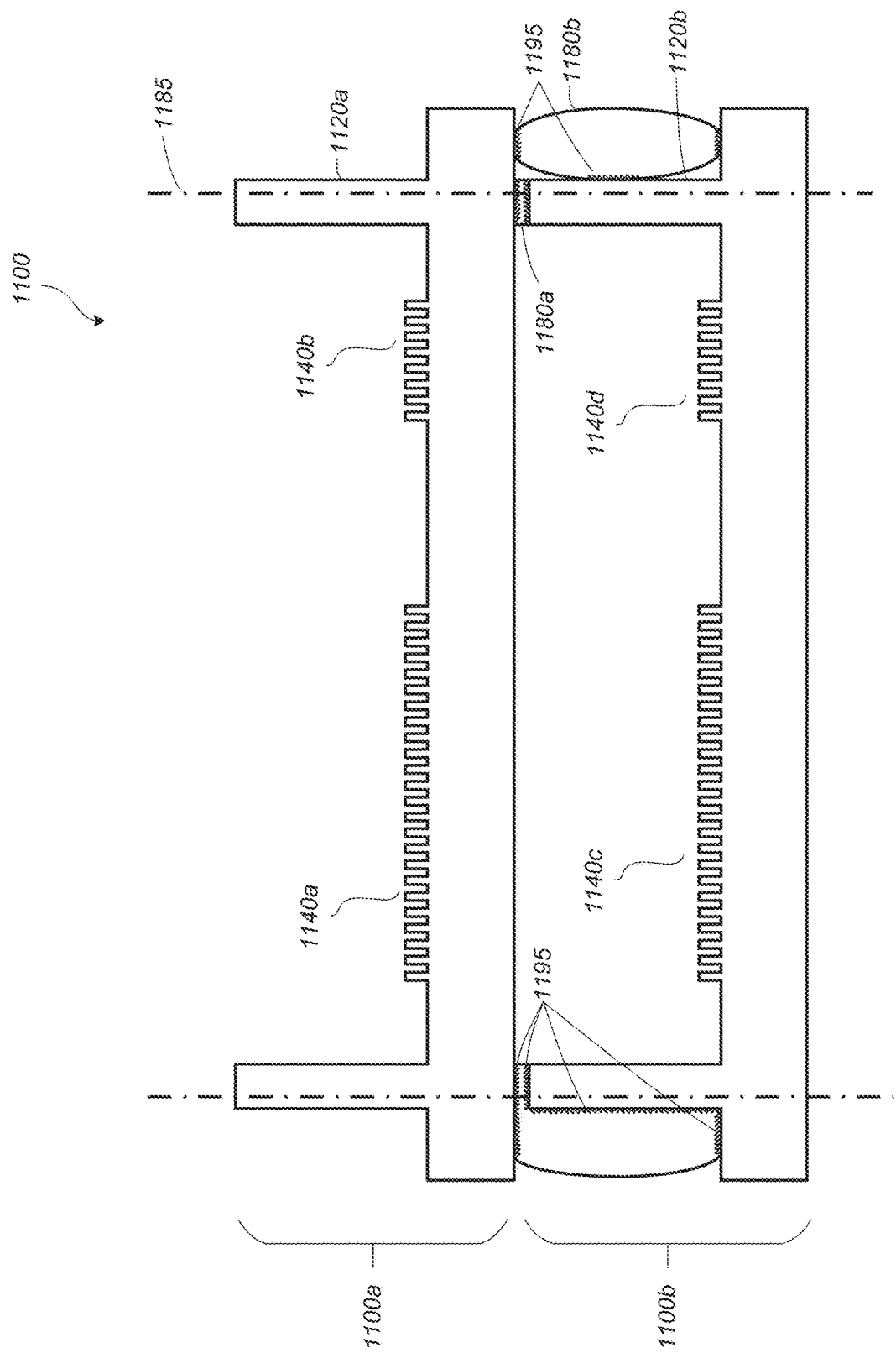
FIG. 11I illustrates an example of a stack of waveguides comprising rough surfaces in areas with applied adhesives.
Figure 11J:
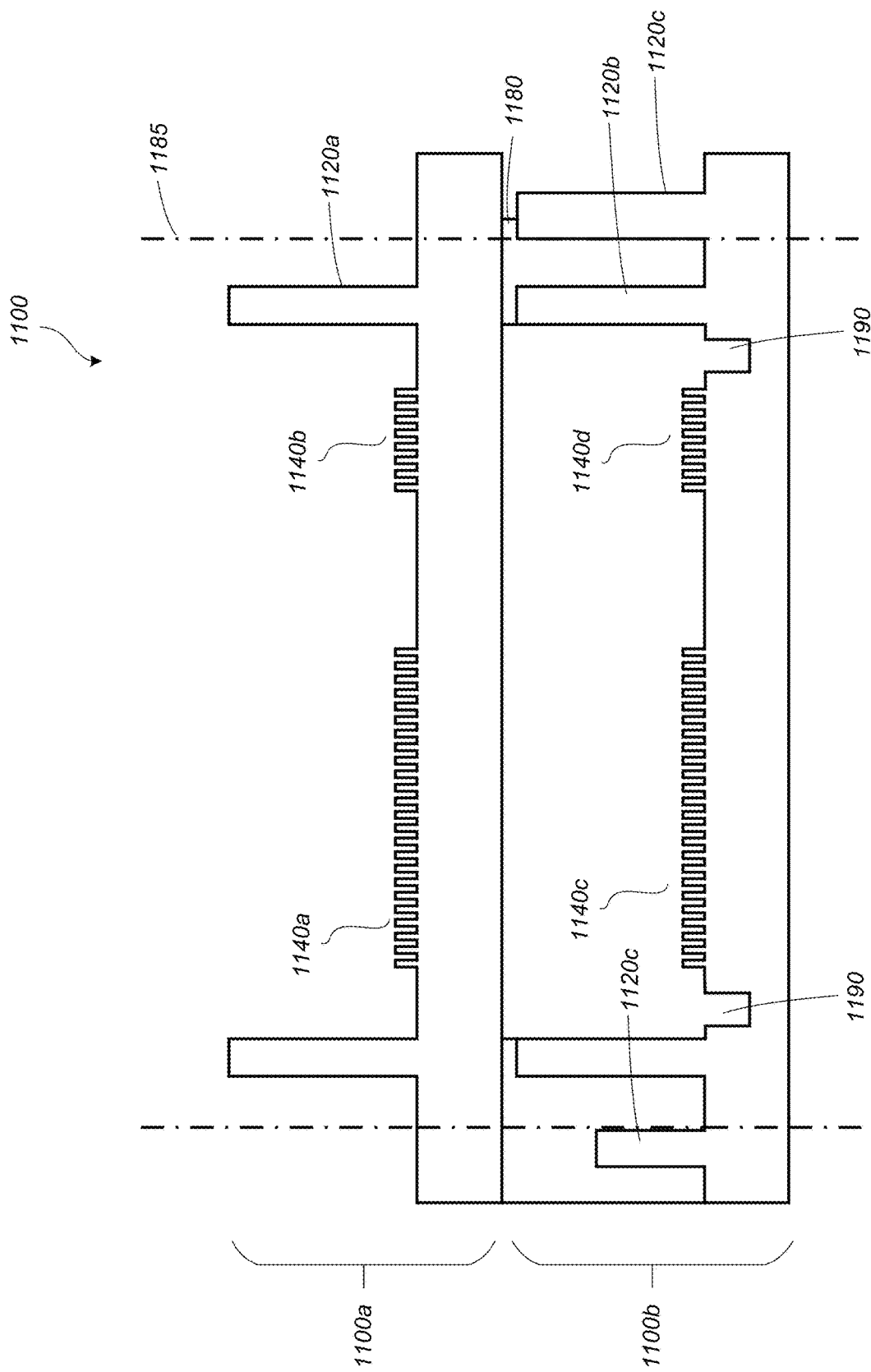
FIG. 11J illustrates an example of a stack of waveguides similar to that of FIG. 11G, with at least one of the waveguides comprising an adhesive-trapping depression on a major surface of the waveguide between an adhesive and an active area of the waveguide.

One or more depressions 1190 may also be provided on a major surface of a waveguide comprising a plurality of spacers. For example, FIG. 11J illustrates an example waveguide 1100b comprising a plurality of spacers 1120b, 1120c, and an adhesive-trapping depression 1190 provided between an adhesive 1180 and active areas 1140c, 1140d. In some embodiments, both the spacers 1120b, 1120c and the depression 1190 may serve as physical obstacles to the flow of adhesive 1180 to the active areas comprising the features 1140c, 1140d.

To further reduce the flow of adhesive to the active area of the waveguide and to increase the bonding strength of adhesives of the waveguide stack 1100, some or all surfaces of the waveguides 1100a, 1100b may be rough (e.g., textured and not smooth). FIG. 11I illustrates an example of a stack of waveguides comprising rough surfaces in areas with applied adhesives. In some embodiments, surfaces where adhesives 1180, 1180a, 1180b are to be applied can be roughened, e.g., by physical abrasion, and/or by nanostructures formed during casting of the waveguide and spacers to enhance adhesion of the adhesives 1180, 1180a, 1180b. For example, rough surface areas 1195 may be provided along the top and sides of spacers 1120b, along the bottom major surface of waveguide 1100a, and/or along the upper major surface of waveguide 1100b.

In embodiments where the rough surface is formed in a mold, it will be appreciated that the mold will typically need to be separated from the waveguide with the rough surface formed in that mold. As a result, forming a rough vertical surface may be challenging, since that vertical surface may be parallel to the direction of relative movement of the mold in waveguide during manufacture; having a rough vertical surface may cause the waveguide and integral spacers to "stick" in that mold. For ease of manufacturing, in some embodiments, the rough surface areas 1195 may be present on top surfaces of the spacers 1120b and/or the bottom surface of waveguide 1100a, and/or along the upper surface of waveguide 1100b.

In some embodiments, the rough surface areas 1195 may include random peaks and valleys (e.g., such as caused by physical abrasion), or may include regularly repeating peaks and valleys (e.g., such as a nanograting). It will be appreciated that the rough surface areas 1195 effectively increase the surface area in contact with adhesive to thereby enhance adhesion. Rough surface areas 1195 provided on any the spacer and waveguide surfaces disclosed herein, including any of the configurations shown in, for example, FIGS. 10C-11H, and 11J-11K.

Figure 11K:
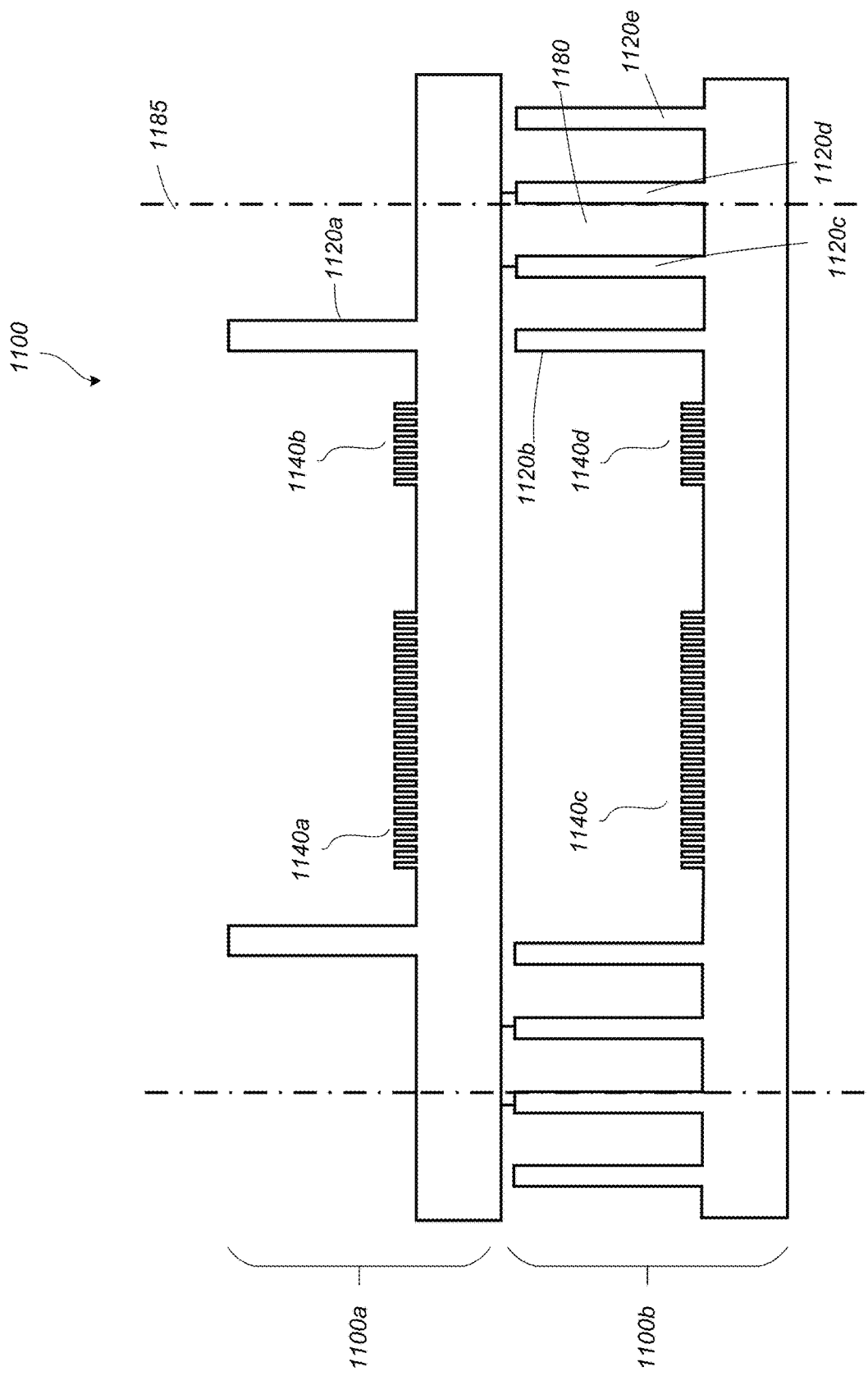
FIG. 11K illustrates an example of a stack of waveguides comprising a plurality of spacers with an applied adhesive in the volume between two adjacent spacers and additional spacers forming adhesive-trapping volumes neighboring the adhesive filled volumes.

As noted previously, a waveguide may be provided with multiple spacers forming, e.g., concentric or coaxial walls of spacers, and adhesive may be applied in a volume formed between pairs of immediately adjacent spacers. FIG. 11K illustrates an example of a stack of waveguides comprising a plurality of spacers with an applied adhesive in the volume between two adjacent spacers and additional spacers forming adhesive-trapping volumes neighboring the adhesive-filled volumes. In some embodiments, a space between adjacent spacers, such as the space between adjacent spacers 1120b and 1120c or the space between adjacent spacers 1120d and 1120e, may be left devoid of adhesive, to allow those volumes to trap excess adhesive that may escape from the volume between spacers 1120c and 1120d. In some embodiments, as illustrated, the volume between two adjacent spacers in the middle of a plurality of spacers (i.e. not adjacent to the peripheral edge of waveguide 1100b and not adjacent to surface features 1140c, 1140d) may be provided with adhesive. In some embodiments, spacers 1120b and/or additional spacers may provide a physical barrier between adhesive 1180 and the active area that includes surface features 1140c, 1140d. Similarly, spacers 1120e and/or additional walls of spacers may act as a physical barrier between adhesive 1180 and the peripheral edge of waveguide 1100b. When a plurality of spacers is provided, singulation path 1185 may cross waveguide 1120b at any point between the adhesive 1180 and the peripheral edge of waveguide 1100b.

As discussed herein, in some embodiments, the adhesive joining spacers to a directly neighboring waveguide may be a low-viscosity adhesive. Such low-viscosity adhesives provide advantages for ease of dispensing (e.g., by jet deposition, such by inkjet deposition), but may be prone to running off the surface of a spacer on which it is deposited. As a result, it may be difficult to deposit a thick adhesive layer with such low viscosity adhesives. It will be appreciated that relatively thick adhesive layers may provide superior adhesion between a spacer and overlying waveguide.

In addition or as an alternative to forming adhesive-trapping volumes adjacent to the spacers (e.g., as shown in FIGS. 11G-11K), the tops or ends of the spacers may be shaped to guard against undesired adhesive movement. In some embodiments, the end of a spacer may include structures to localize the adhesive on the end and to reduce movement of the adhesive off of the end of the spacer, to facilitate adhesion between the spacer and an overlying waveguide.

Figure 11L:
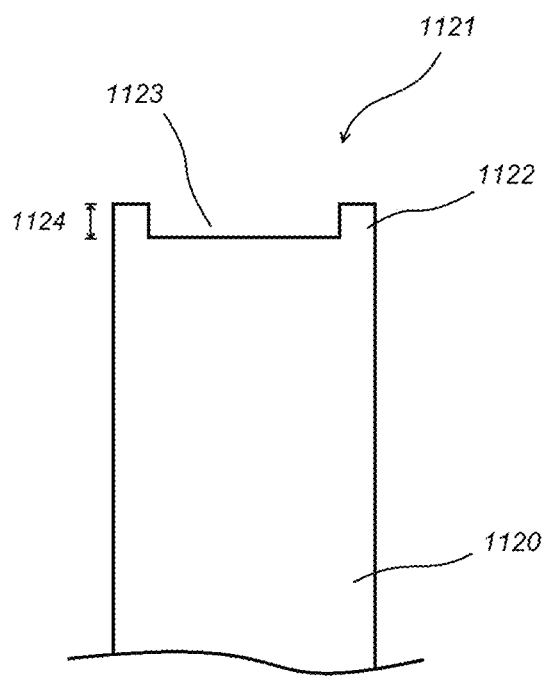
FIGS. 11L-11M illustrate examples of cross-sectional side and top-down views, respectively, of a spacer having ridges for retaining adhesive.
Figure 11M:
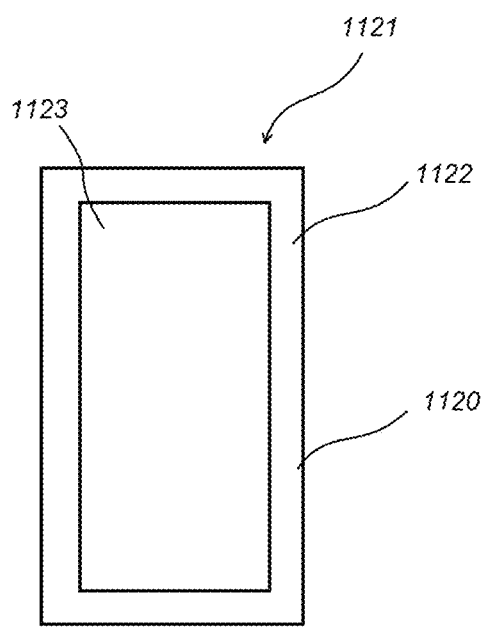

FIGS. 11L-11M illustrate examples of cross-sectional side and top-down views, respectively, of a spacer having ridges for retaining adhesive. These figures show an integral spacer 1120 in isolation. It will be appreciated that the spacer 1120 may be any of the integral spacers disclosed herein, and may correspond to, e.g., spacers 1020 and spacers 1120x (with x being a letter, as used in the various drawings herein).

With continued reference to FIG. 11L, the integral spacer 1120 has an end 1121 for receiving adhesive. In some embodiments, the end 1121 includes one or more ridges 1122, which act as physical barriers to the movement of the adhesive. The ridges 1122 may be elevated portions of the end 1121 and may extend across that end 1121 to define a volume 1123. In some embodiments, as illustrated in FIG. 11M, the one or more ridges 1122 may form a single continuous barrier structure that surrounds the volume 1123, to limit the lateral movement of adhesive deposited into that volume 1123. While shown as having a stepped profile for ease of illustration in the depicted cross-sectional view, it will be appreciated that the ridge 1122 may have a curved or multi-faceted profile and the bottom of the volume 1123 may also be curved (e.g., curved outwards), or may have an irregular profile (e.g., a multi-faceted profile).

In some embodiments, the volume 1123 has a depth 1124 that is sufficient to support an adhesive layer having a thickness of 1 µm or more, 5 µm or more, 10 µm or more, including 1-35 µm, and 5-10 µm, with this thickness measured at the thickest part of the adhesive layer. It will be understood that the thickness of the adhesive layer is typically greater than the depth 1124 of the volume 1123, to allow desired contact between the adhesive and an overlying waveguide. Nevertheless, as an approximation, in some embodiments, the maximum depth 1124 of the volume 1123 (that is, the depth of the volume at its lowest point) may be understood to be approximately 1 µm or more, 5 µm or more, 10 µm or more, including 1-35 µm, and 5-10 µm.

Figure 11N:
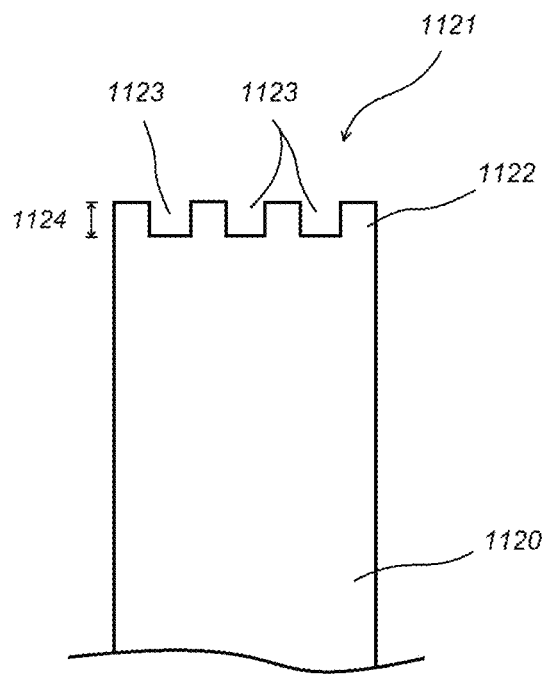
FIGS. 11N-11O illustrate other examples of cross-sectional side and top-down views, respectively, of a spacer having ridges for retaining adhesive.
Figure 11O:
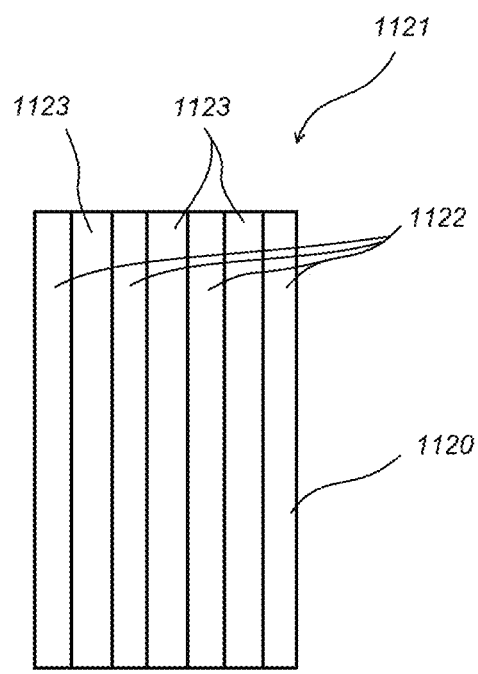

It will be appreciated that the end 1121 of the spacer 1120 may include a plurality of ridges 1122. FIGS. 11N-11O illustrate examples of cross-sectional side and top-down views, respectively, of a spacer having a plurality of ridges 1122 for retaining adhesive. The ridges 1122 define volumes 1123, between pairs of the ridges 1122, into which adhesive may be applied. In some embodiments, the volumes 1123 may have a depth of 1 µm or more, 5 µm or more, 10 µm or more, including 1-35 µm, and 5-10 µm. As discussed herein, the thickness of the adhesive layer occupying the volumes 1123 may be greater than the depth of the volumes 1123. In some embodiments, the ridges 1122 may form a grating, having regularly-spaced ridges 1122 separated by regularly-spaced volumes 1123.

With continued reference to FIG. 11O, the ridges 1122 may be elongated in a direction transverse to a direction that adhesive would flow to reach optical structures of the waveguide stack from the spacer 1120. For example, outcoupling optical structures may be understood to be on the left side of the drawing, and the ridges 1122 may be oriented to block the flow of adhesive towards that left side. Thus, the ridges 1122 may be understood to be substantially transverse to an axis extending from the spacer 1120 to optical structures of the waveguide, such as outcoupling optical elements or incoupling optical elements. Viewed another way, the volumes 1123 may be understood to be channels that divert adhesive away from optical structures of the waveguide.

While shown having a stepped profile for ease of illustration, it will be appreciated that the ridges 1122 may have other cross-sectional shapes. For example, in addition to the square shapes shown in FIG. 11N, the ridges 1122 may each have rounded edges, may be multifaceted, etc. In addition, in some embodiments, rather than a plurality of steps, the plurality of ridges 1122 may, in the aggregate, form a sawtooth profile.

With reference now to FIGS. 11L-11O, as discussed herein, the end 1121 may have adhesive applied onto that end. The adhesive may be applied by jet deposition (e.g., inkjet deposition), in some embodiments. In some other embodiments, the end 1121 may be provided with adhesive by touching that end to a reservoir containing the adhesive. The adhesive may be a high-, medium-, or low-viscosity adhesive, as discussed herein. In some embodiments, the adhesive is a low-viscosity adhesive, which may have advantages for manufacturing efficiency, such as rapid dispensing systems, such as jet deposition systems.

After applying adhesive to the end 1121, the adhesive may be contacted with another waveguide to adhere the spacer 1121 to that other waveguide. In some embodiments, the point of contact may simply be a major surface of the other waveguide. In some other embodiments, the point of contact may be a recess in the other waveguide, the recess being sized and shaped to accommodate the end 1121. As also discussed herein, in some embodiments, the point of contact may also be a rough or textured surface, which may have advantages for increasing the surface area in contact with the adhesive, to increase the strength of the adhesion between the spacer and the waveguide.

Figure 12A:
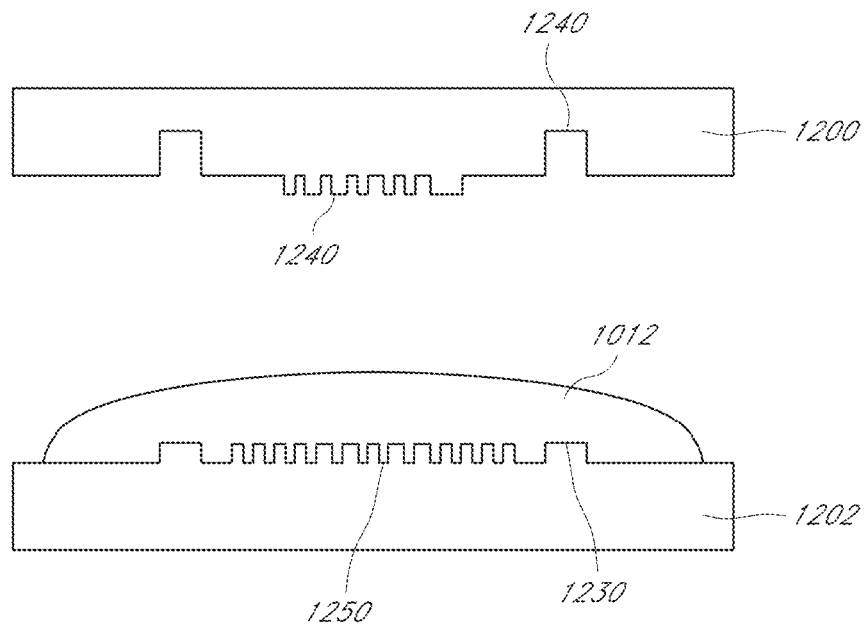
FIGS. 12A-12C illustrate an example of a method for forming a waveguide with spacers.
Figure 12B:
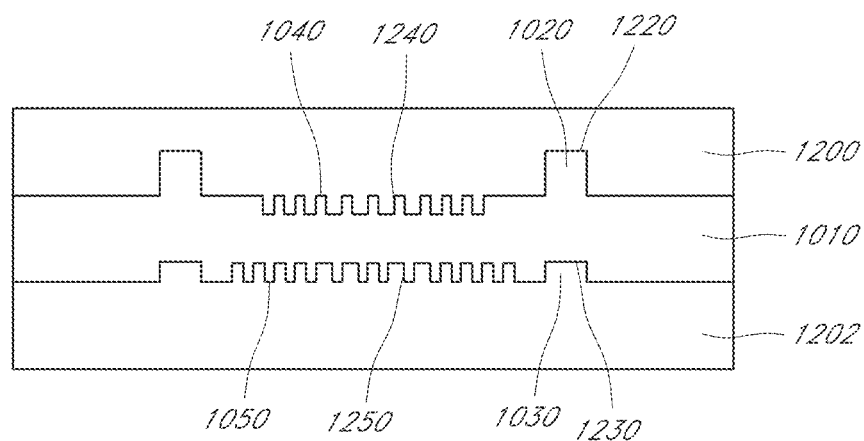
Figure 12C:
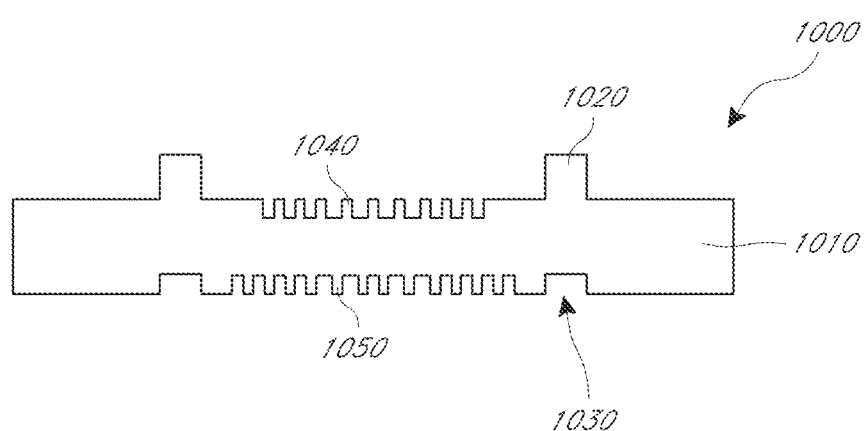

With reference now to FIGS. 12A-12C, an example of a method for forming a waveguide with spacers is illustrated. With reference to FIG. 12A, a pair of molds 1200, 1202 is provided. The mold 1202 comprises a pattern of raised features 1250, which may be the negative of a desired pattern to be defined in the waveguide to be formed. In some embodiments, the mold 1202 includes one or more raised features 1230 for forming indentations in the waveguide to be formed. A mass of material 1012 for forming the waveguide is deposited on the mold 1202.

With reference to FIG. 12B, the molds 1200, 1202 are brought together to compress the material 1012 (FIG. 12A). The compressed material may be subjected to a curing process (e.g., exposure to UV light) to harden that material to form the waveguide 1010. As illustrated, the negative pattern 1250 defines the patterned structure 1050, which may comprise diffractive optical elements. It will be appreciated that additional negative patterns may be provided on the mold 1202 to form additional structures, including diffractive optical elements, as desired.

With reference to FIG. 12C, the molds 1200, 1202 are moved apart relative to one another. The waveguide 1010 is released from the molds, thereby forming the waveguide 1000.

With reference to FIGS. 12A-12C, it will be appreciated that, in some other embodiments, the raised features 1230 are omitted, such that the resulting waveguide 1000 does not include the indentations 1030. Instead, in some embodiments, the spacers of underlying waveguides simply rest on the bottom major surface of the overlying waveguides.

With reference again to FIGS. 11C-11O, as discussed herein, the adhesives adhering spacers 1120 to overlying waveguides (e.g., the adhesives 1180, 1180a, 1180b) may be one or more of various low-, medium-, and/or high-viscosity adhesives. In some embodiments, the adhesives may be formed from a solution comprising the same chemical species (e.g., the same monomers or partially-formed polymers) used to form the polymer waveguide of which the integral spacers 1120 are a constituent part. As discussed herein, the waveguides and integral spacers 1120 may be formed by applying a solution, comprising chemical species for forming the polymer of the polymer waveguide, onto or into a mold and/or pressing a mold into the solution. In some embodiments, an adhesive solution comprising the same chemical species may be utilized as one or more of the adhesives adhering spacers to neighboring waveguides.

In some embodiments, the adhesive solution may comprise the chemical species along with other constituent chemical species to provide a lower-viscosity solution than used to form the main body of the polymer waveguide. For example, the adhesive solution may comprise a lower concentration of the polymer-forming chemical species and a greater amount of solvent than the solution used to form the polymer waveguide. In another example, the adhesive solution may have a higher viscosity or a similar viscosity as the solution used to form the polymer waveguide. Such high viscosity solutions may be utilized to form the high-viscosity adhesive structures 1180b.

The adhesive solution may be deposited on or adjacent the spacers 1120, as discussed herein. Subsequently, the adhesive solution is made to contact another waveguide to provide adhesion to the other waveguide. The adhesive solution may then be hardened to form a monolithic mass, comprising the integral spacer 1120, the waveguide, and the other waveguide. Hardening may be accomplished, for example, by curing through the application of energy (e.g., UV light and/or heat). Advantageously, the resulting monolithic structure may be formed of a single polymer that extends continuously from the waveguide, through the integral spacer, to the other waveguide. This may have advantages for providing an index-matched structure and a structure with high mechanical stability.

Figure 13A:
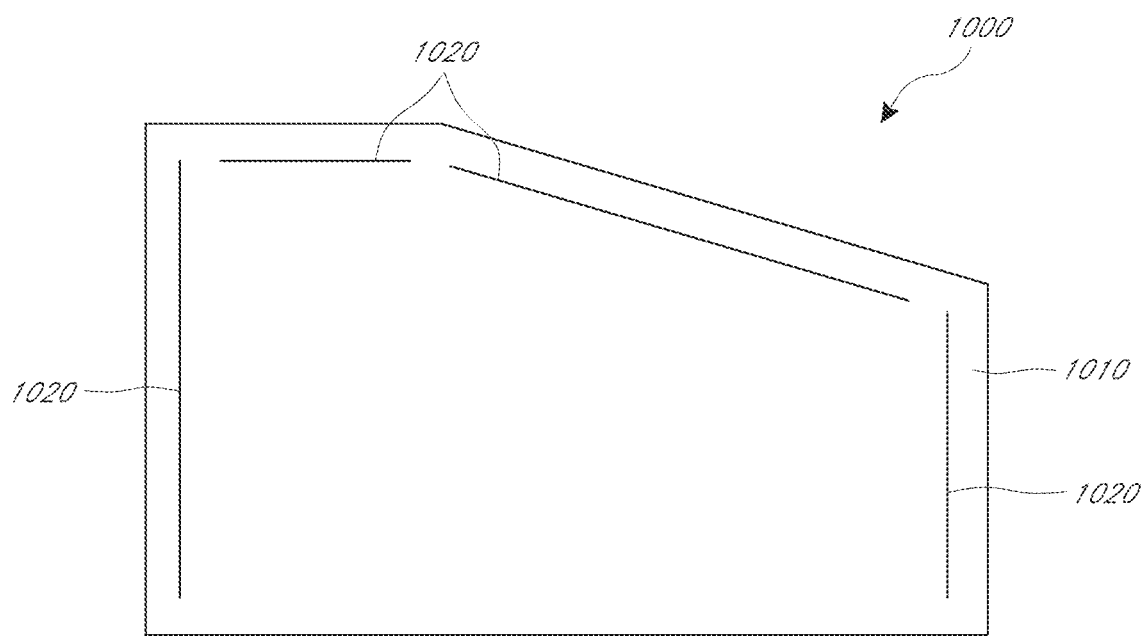
FIGS. 13A-13B illustrate examples of top-down plan views of waveguides comprising spacers.

As discussed herein, the spacers 1020, 1120 are preferably formed at locations away from the path of propagation of light between in-coupling and out-coupling optical elements of a waveguide. FIGS. 13A-13E illustrate examples of top-down plan views of waveguides comprising spacers. As shown in FIG. 13A, the spacers 1020 are preferably positioned along the periphery of the waveguide 1000. It will be appreciated that the spacers 1020 may thus surround an area in which diffractive optical elements, such as in-coupling and out-coupling optical elements, are disposed.

Figure 13B:
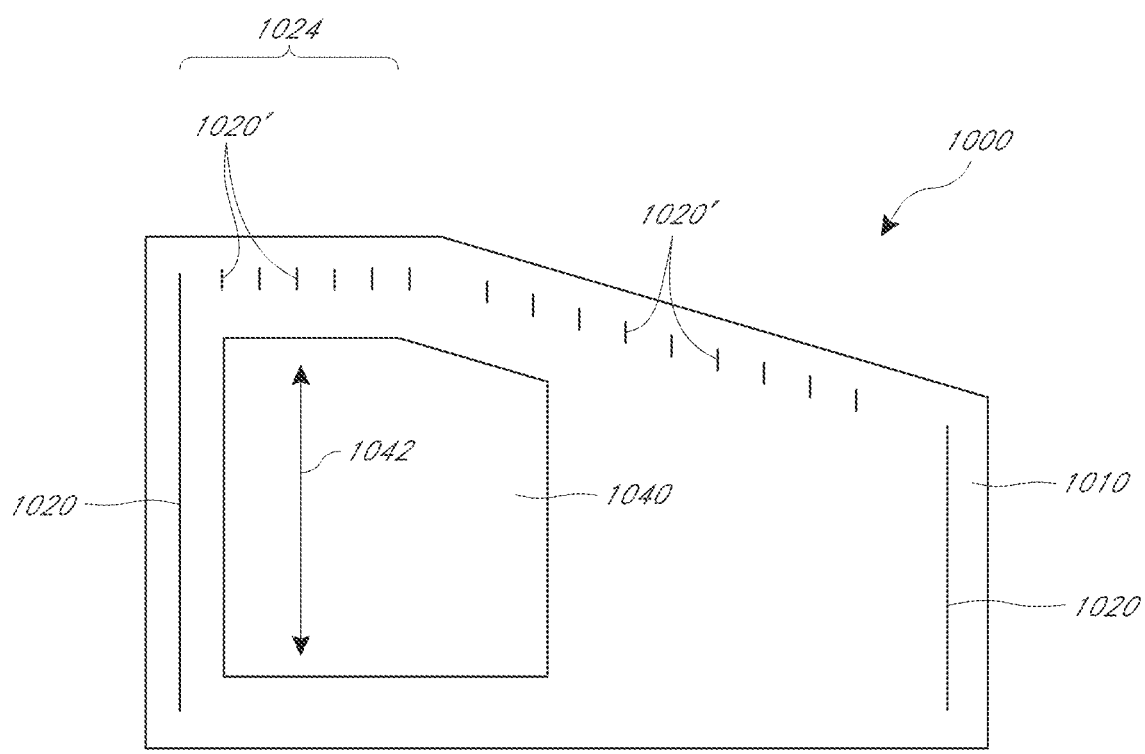

In some embodiments, with reference to FIG. 13B, the spacers 1020 may be elongated along the same axis 1042 as the surface relief features 1040. In such embodiments, the spacers 1020 may include spacers having a relatively long expanse along the axis 1042, and a plurality of other spacers 1020' having relatively shorter expenses. For example, these other spacers 1020' may be spaced-apart and arrayed in groups 1024, with the groups of spacers spaced-apart along an axis that crosses the axis 1042. Advantageously, having the spacers 1020, 1020' elongated along the same axis 1042 as the surface relief features 1040 can facilitate consistent manufacturing of the spacers and the surface relief features. For example, in some embodiments, the spacers and the surface relief features may be formed by imprinting using a mold that is subsequently removed by peeling the mold and the waveguide away from one another. It will be appreciated that this peeling away may be performed along the axis 1042 and that spacers or surface relief features elongated along a different axis may face an increased likelihood of breakage or deformation upon removal of the mold.

Figure 13C:
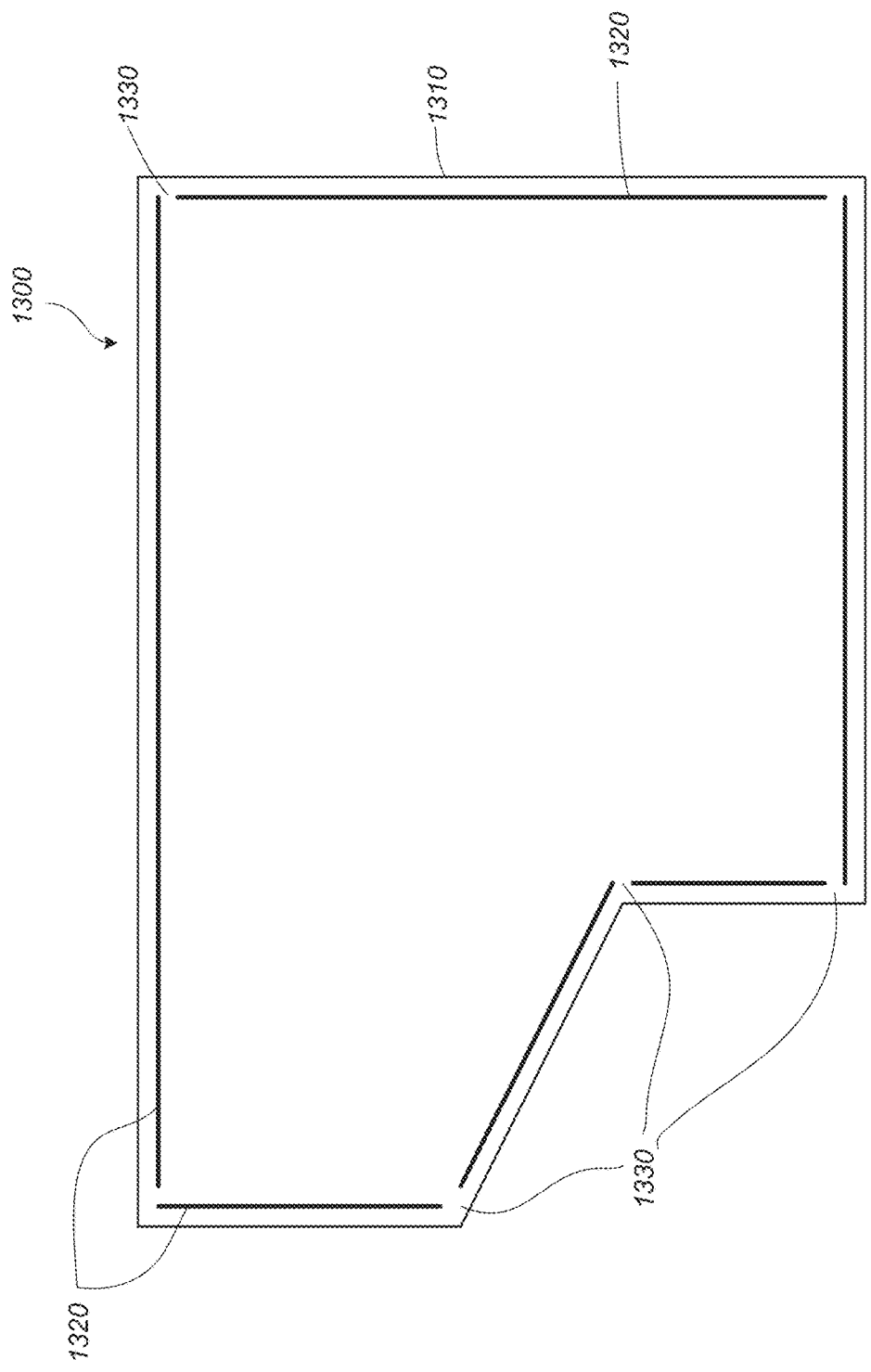
FIG. 13C illustrates an example of a top-down plan view of a waveguide comprising spacers defining a wall with vent holes therein.

In some embodiments, with reference to FIG. 13C, one or more vent holes 1330 may be provided extending laterally through spacer 1320. FIG. 13C illustrates an example of a top-down plan view of a waveguide comprising spacers 1320 with vent holes 1330. As previously noted, spacer 1320 may be cast as part of a monolithic waveguide 1300 comprising an optically transmissive body 1310, with the spacer 1320 extending along a perimeter of the waveguide 1300. During or after casting of waveguide 1300, vent holes 1330 may be created within the spacer 1320. In some embodiments, the spacer 1320 are cast with the vent holes 1330 formed within a mold used for casting. Alternatively, the vent holes 1330 may be created after casting using, for example, a milling nozzle or laser to remove portions of the spacer 1320. The milling nozzle may contact the surface of the waveguide 1300 from either the side or from the top of the waveguide 1300 in order to create vent holes 1330. If vent holes 1330 are to be formed after casting, the spacer 1320 is cast as a closed loop and the vent holes may be created during a separate milling step, either before or after stacking together a plurality of waveguides. A plurality of vent holes 1330 in spacers 1320 may be preferable as one or more vent holes 1330 may be blocked during processing, e.g., due to application of adhesive, debris from singulation, etc. It will be appreciated that the spacer 1320 in which the vent holes 1330 are formed may be understood to be a single spacer in which material has been removed to form the vent holes 1330. In some other embodiments, the spacer 1320 may be understood to refer to a plurality of distinct spacer structures which nevertheless trace out a loop around the waveguide 1300.

Vent holes 1330 may provide one or more advantages, including allowing gas flow into and out of the interior volume encircled by spacer 1320 in which the vent holes are formed. In some embodiments, about 1-10 vent holes 1330 may be provided. Preferably, rather than a single large vent hole, which may allow contamination of the interior volume by external particulates or debris, a plurality of small vent holes 1330 may be utilized to reduce the entry of debris into the active area of waveguide 1300. For example, while vent holes of up to 100 µm in diameter may be provided, vent holes 1330 are preferably between about 1 µm and about 10 µm in diameter to prevent particles and debris from entering the active area through vent holes 1330. As examples, the diameter of vent holes 1330 may be about 1.0 µm, about 1.5 µm, about 2.0 µm, about 2.5 µm, about 3.0 µm, about 3.5 µm, about 4.0 µm, about 4.5 µm, about 5.0 µm, about 5.5 µm, about 6.0 µm, about 6.5 µm, about 7.0 µm, about 7.5 µm, about 8.0 µm, about 8.5 µm, about 9.0 µm, about 9.5 µm, about 10.0 µm, about 15.0 µm, about 20.0 µm, about 25.0 µm, about 30.0 µm, about 35.0 µm, about 40.0 µm, about 45.0 µm, about 50.0 µm, about 55.0 µm, about 60.0 µm, about 65.0 µm, about 70.0 µm, about 75.0 µm, about 80.0 µm, about 85.0 µm, about 90.0 µm, about 95.0 µm, about 100.0 µm, or any value between any two of the aforementioned values.

Figure 13D:
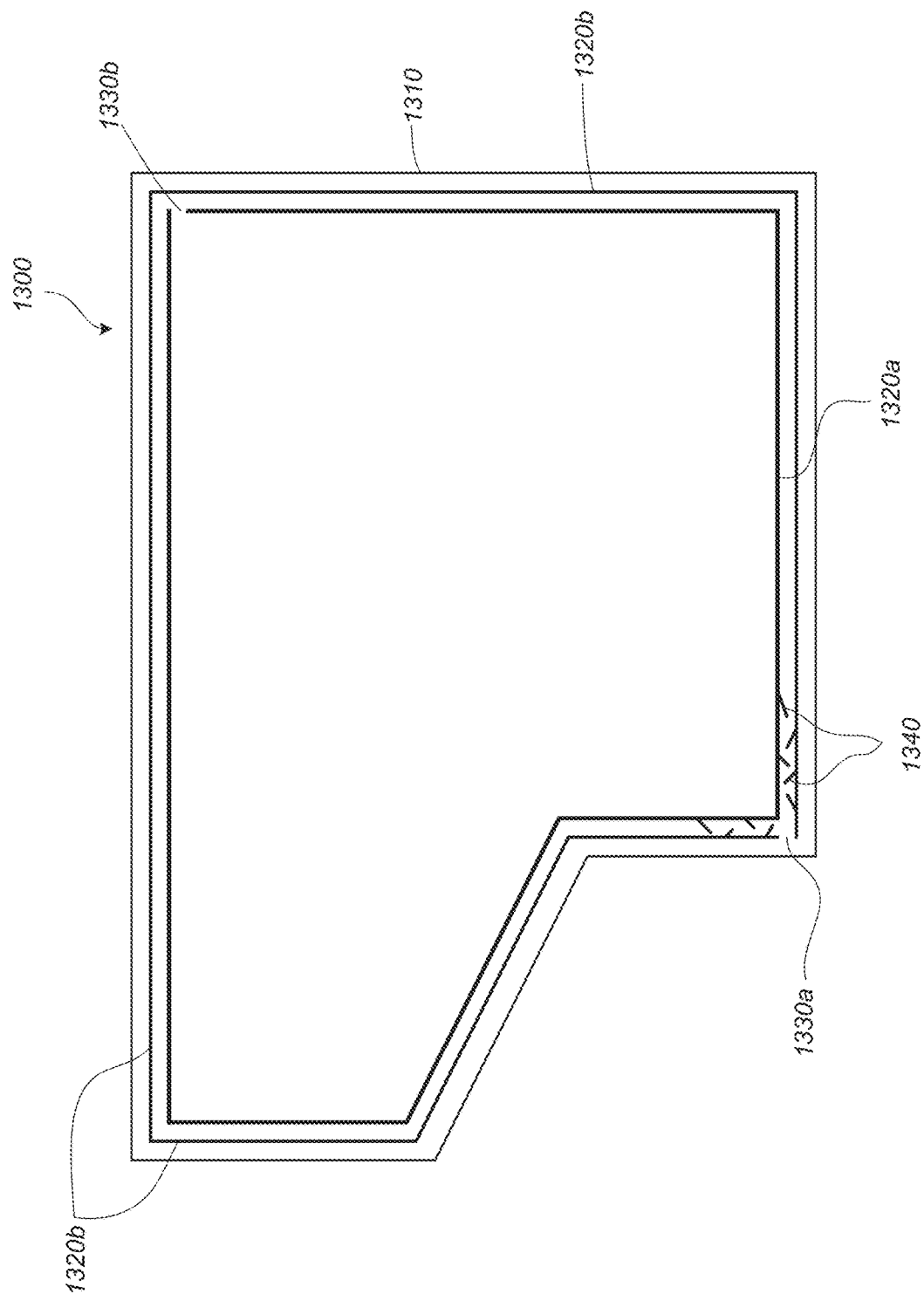
FIG. 13D illustrates an example of a top-down plan view of a waveguide comprising a plurality of walls of spacers with vent holes in the walls and debris-trapping structures in the volume between the walls.

As discussed in reference to FIG. 11G, in some embodiments, multiple spacers are provided extending around the periphery of a waveguide. FIG. 13D illustrates an example of a top-down plan view of a waveguide comprising a plurality of walls of spacers with vent holes and debris trapping structures. In some embodiments, each of spacers 1320a, 1320b may be provided with vent holes 1320a, 1330b, respectively. Vent holes may be required in each wall of spacers 1320a, 1320b to facilitate gas flow into and out of the interior regions delineated by the spacers 1320a, 1320b. To prevent particles or debris created during singulation from entering the active area of waveguide 1330, vent holes 1330a in spacers 1320a may be located remotely from vent holes 1330b in spacers 1330b; for example, the vent holes 1330a, 1330b may be located on different sides of the waveguide 1300. Thus, if debris enters through vent holes 1330a, it must travel an increased distance within the channel formed between spacers 1320a and spacers 1320b to reach vent holes 1330b, and ultimately, the active area of waveguide 1300.

To further guard against debris from entering the active area, one or more debris trapping structures 1340 may be provided in the space between adjacent spacers. For example, in the volume or channel formed between spacers 1320a and spacers 1320b, one of more debris trapping structures 1340 may be provided. Debris trapping structure 1340 may comprise angled features or walls which physically block or catch debris as it flows, for example, from vent holes 1330a to vent holes 1330b. For example, the debris-trapping structure 1340 may include angled extensions of the spacers which protrude into the channel formed between spacers 1320a and spacers 1320b. Debris trapping structures 1340 are preferably located near vent holes 1330a, 1330b to block debris from entering therethrough. However, it will be appreciated that debris trapping structures 1340 may be provided at multiple locations in the channel between adjacent spacers 1320a and 1320b. If a plurality of spacers are provided as part of waveguide 1300, debris trapping structures 1340 can be located between some or all adjacent spacers.

Figure 13E:
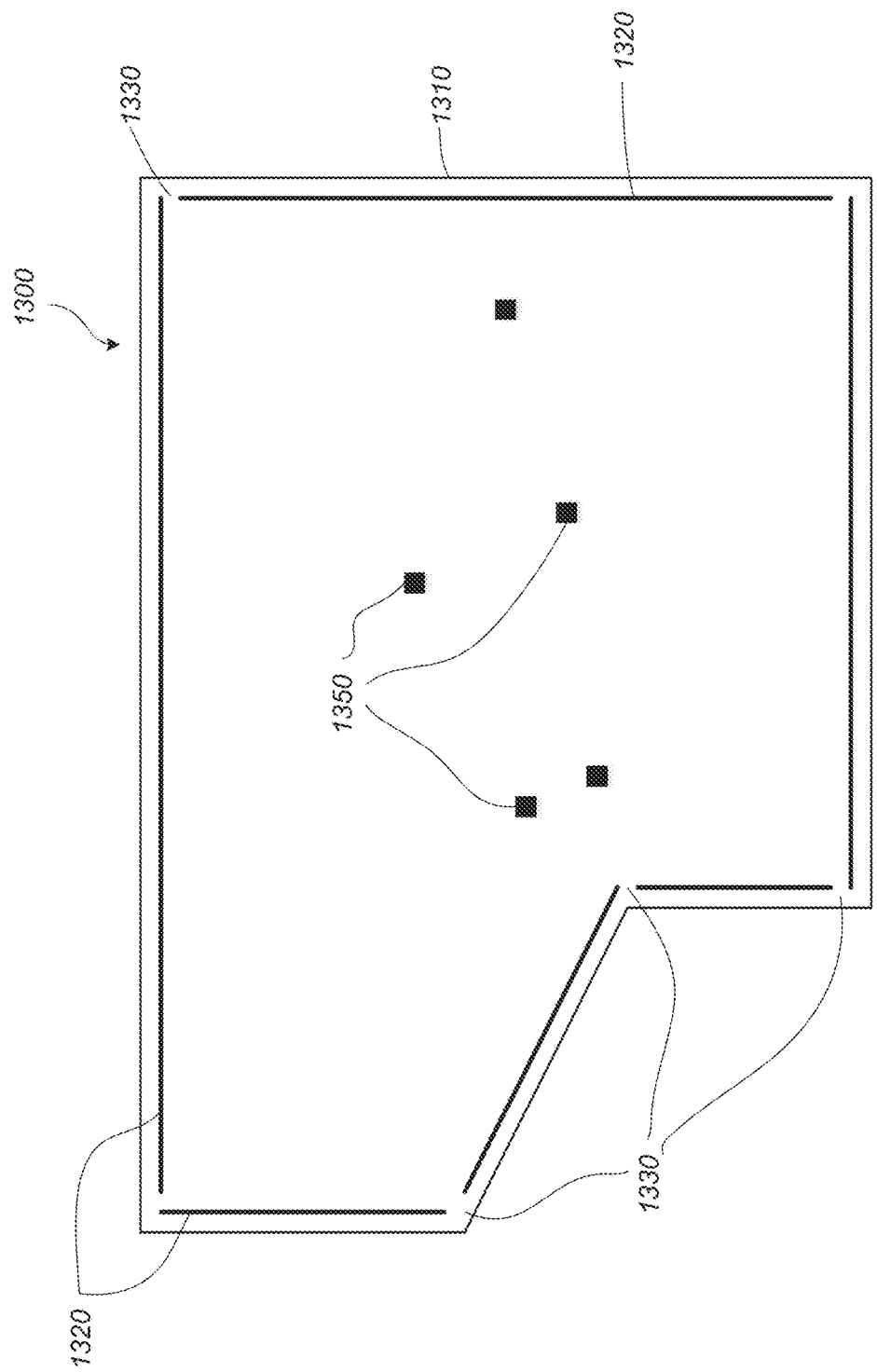
FIG. 13E illustrates an example of a top-down plan view of a waveguide comprising spacers in an interior area of a major surface of the waveguide.

Although integral spacers are preferably located on the periphery of waveguide 1300, in some embodiments, spacers may be provided at any point within the area of a major surface of waveguide 1300, including the active area. FIG. 13E illustrates an example of a top-down plan view of a waveguide comprising single point contact spacers in the active area. In some embodiments, single point contact spacers 1350 may be provided at any location on a major surface of waveguide 1300, including the middle of the active area. Single point contact spacers 1350 may help maintain a consistent gap between adjacent waveguides across the entire area of the adjacent waveguides.

Single point contact spacers 1350 may comprise any of the shapes discussed in reference to FIG. 10B. It will be appreciated that such three-dimensional volumes may provide advantages for structural stability and mechanical strength, particularly where the waveguides are utilized to form stacks of similar waveguides. It will be appreciated that, in a single waveguide and/or a stack of waveguides, multiple different shapes for single point contact spacers 1350 may be utilized in some embodiments. In some embodiments, the tops of the single point contact spacers 1350 may have a pointed shape (e.g., a rectangular pyramid (shape D), a triangular pyramid (shape E), or a cone (shape F)), may be rounded or flattened at the point of contact with an overlying structure such as another waveguide. Where the single point contact spacers 1350 are formed by imprinting, the desired rounding or flattening of the tops of the shapes may be formed by an appropriately shaped mold or imprint reticle. It will be appreciated that the sides and tops of the single point contact spacer 1350 may have one or more cross-sectional shapes (with the cross-section taken transverse to the long vertical axis of the spacers). The cross-sectional shapes comprise any shape according to the requirements and specifications of an optical device comprising the stack of waveguides.

The spacers 1350 may be referred to as single point contact spacers because they contact an overlying waveguide at a single point, which may be sized and shaped to be substantially imperceptible to the human eye. For example, the longest lateral dimension of the cross-sectional shapes of the single point contact spacers 1350 may be in the range of about 10 µm to about 500 µm. Preferably, the longest lateral dimension of is less than 300 µm. More preferably, the longest lateral dimension is less than 250 µm. As examples, the longest lateral dimension may be about 10 µm, about 15 µm, about 20 µm, about 25 µm, about 30 µm, about 35 µm, about 40 µm, about 45 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 µm, about 280 µm, about 290 µm, about 300 µm, about 310 µm, about 320 µm, about 330 µm, about 340 µm, about 350 µm, about 360 µm, about 370 µm, about 380 µm, about 390 µm, about 400 µm, about 410 µm, about 420 µm, about 430 µm, about 440 µm, about 450 µm, about 460 µm, about 470 µm, about 480 µm, about 490 µm, about 500 µm, or any value between any two of the aforementioned values. In some embodiments, the spacers are roughly symmetrical about the above-noted longest lateral dimension. Formation of smaller single point contact spacers 1350 (having smaller cross-sectional areas) may be less optically objectionable than larger single point contact spacers 1350. Similarly, to further reduce the perceptibility of a plurality of the spacers 1350 and to reduce interference with sight lines of a user, single point contact spacers 1350 are preferably provided at a density of one or fewer spacers/mm$^2$ on the major surface of the waveguide. As examples, single point contact spacers 1350 may be provided at a density of about 0.05 spacers/mm$^2$, about 0.10 spacers/mm$^2$, about 0.15 spacers/mm$^2$, about 0.20 spacers/mm$^2$, about 0.25 spacers/mm$^2$, about 0.30 spacers/mm$^2$, about 0.35 spacers/mm$^2$, about 0.40 spacers/mm$^2$, about 0.45 spacers/mm$^2$, about 0.50 spacers/mm$^2$, about 0.55 spacers/mm$^2$, about 0.60 spacers/mm$^2$, about 0.65 spacers/mm$^2$, about 0.70 spacers/mm$^2$, about 0.75 spacers/mm$^2$, about 0.80 spacers/mm$^2$, about 0.85 spacers/mm$^2$, about 0.90 spacers/mm$^2$, about 0.95 spacers/mm$^2$, about 1.00 spacers/mm$^2$, or any value between any two of the aforementioned values.

Single point contact spacers 1350 may be provided in any pattern, orientation, placement, geometry, or number, and at any location on a major surface of waveguide 1350, including the active area. In some embodiments, single point contact spacers 1350 may be provided centrally on waveguide 1300, but away from various surface features, including in-coupling optical elements and out-coupling optical elements.

Figure 14:
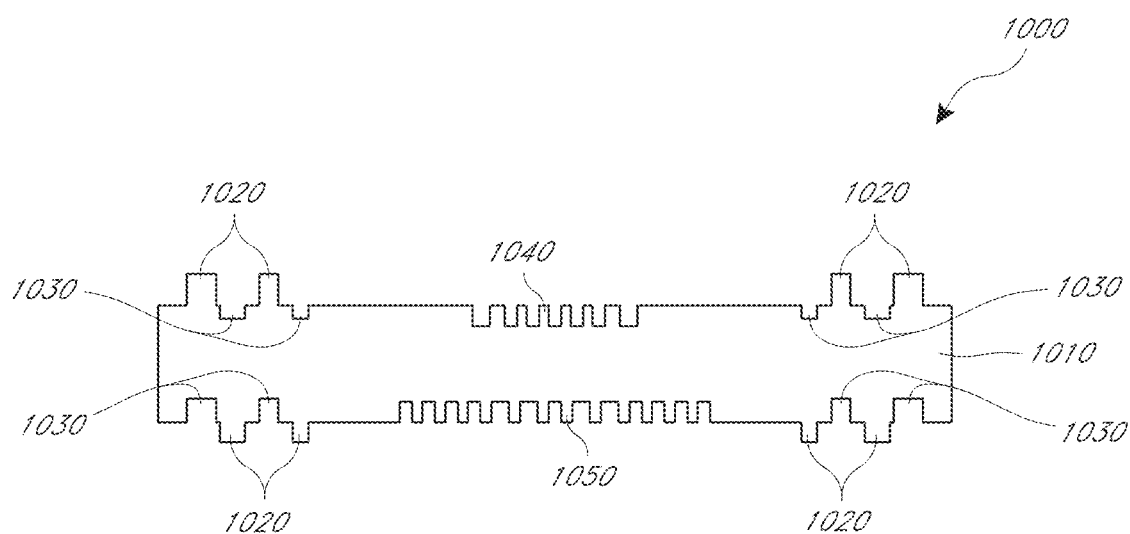
FIG. 14 illustrates an example of a waveguide comprising spacers and indentations of varying dimensions.

With reference now to FIG. 14, an example of a waveguide comprising spacers 1020 and indentations 1030 of varying dimensions is illustrated. It will be appreciated that some spacers 1020 may be wider than others. The widths of the spacers 1020 may vary depending upon their location on the waveguide 1000. For example, spacers 1020 at locations less likely to interact with light may be wider than spacers 1020 at locations in which the spacers 1020 are more likely to receive light and unintentionally leak that light into neighboring waveguides.

With continued reference to FIG. 14, in some embodiments, multiple side-by-side spacers 1020 and/or multiple side-by-side indentations 1030 may be provided in place of a single one of the spacers 1020 and indentations 1030 illustrated in FIG. 10A. For example, as illustrated, two side-by-side spacers 1020 and two corresponding side-by-side indentations 1030 may be provided in place of a single one of the spacers 1020 and 1030 of FIG. 10A. In some embodiments, the side-by-side spacers and indentations may have different widths. In some embodiments, spacers may be provided on both top and bottom major surfaces of the waveguide 1000. In such embodiments, the spacers and the indentations may interlock when forming a stack, thereby advantageously increasing the stability and mechanical strength of a stack of waveguides formed using these waveguides. In some embodiments, individual ones of the spacers 1020 may include multiple tiers which decrease in width with distance from a major surface of the waveguide.

In some embodiments, the waveguide 1000 may be a hybrid waveguide formed by multiple layers of different materials. For example, the hybrid waveguide may include a core layer and at least one auxiliary layer. Preferably, the core layer is formed of a highly transparent material and the auxiliary layer is formed of a thinner layer of material, in which surface relief structures, such as diffractive optical elements, are provided. In some embodiments, the material forming the core layer is a highly transparent polymer, e.g., having a transparency relay transmission of greater than 85%, greater than 90%, or greater than 96% in the visible light spectrum across the thickness of the core layer. The material may be a flowable material (e.g., a flowable polymer) which may be flowed onto a surface and subsequently hardened, e.g., by curing. The auxiliary layer may be thinner than the core layer and is preferably formed of a different material than the core layer. In some embodiments, the auxiliary layer is formed of a polymer (e.g., an organic polymer), an inorganic material, a hybrid organic/inorganic material, or combinations thereof. In some embodiments, for a given thickness, the auxiliary layer may have lower transparency in the visible spectrum and/or have lower homogeneity (in composition and/or optical properties such as transparency) than the core layer. However, this lower transparency and/or lower homogeneity may be ameliorated by the relative thinness of the auxiliary layer in comparison to the core layer.

Preferably, the core layer is formed of a material with a high refractive index, which may provide an advantageously large field of view for display devices utilizing the core layer in the waveguide. In some embodiments, the material forming the core layer may have a refractive index of about 1.65 or more, about 1.70 or more, or about 1.80 or more. In addition, the auxiliary layer may be formed of a material with a different refractive index than the core layer. It will be appreciated that differences in refractive indices at an interface comprising nanophotonic structures can facilitate the ability of diffractive optical elements in that layer to redirect light. In some embodiments, the material forming the auxiliary layer has a refractive index that differs from the refractive index of the material forming the core layer by about 0.05 or more, about 0.1 or more, or about 0.2 or more. In some embodiments, waveguide may include an additional auxiliary layer in which indentations and/or additional surface relief features (e.g., diffractive optical elements) are formed. Additional details regarding hybrid waveguides are disclosed in U.S. Application No. 62/651,507 filed on Apr. 2, 2018, entitled HYBRID POLYMER WAVEGUIDE AND METHODS FOR MAKING THE SAME, the entirety of which is incorporated by reference herein.

In some embodiments, the core and auxiliary layers may be formed using flowable materials, without vapor deposition. The core layer may be formed of relatively high refractive index materials as described above for the waveguide 1000, and the auxiliary layer may be formed of a lower refractive index material. Examples of lower refractive index materials (e.g., having a refractive index lower than 1.65) include organic polymer materials, low refractive index resins, sol-gel based hybrid polymers (e.g., $TiO_2$, $ZrO_2$, and ITO sol-gel materials), polymers doped with nanoparticles (such as $TiO_2$, $ZrO_2$), and active materials (e.g., polymers doped with quantum dots). Examples of low refractive index organic polymer materials include those commercially available from Sigma-Aldrich of St. Louis, Mo., USA, such as the polymer material sold under the names CPS 1040 UV, CPS1040 UV-A, CPS1030, CPS 1020UV, CPS 1040UV-VIS, CPS 1030 UV-VIS, and CPS 1020 UV-VIS. Examples of low refractive index resins include those commercially available from Miwon of the Nagase Group, Osaka, Japan.

In some embodiments, patterns (e.g., patterns defining diffractive optical elements) may be formed during the formation of the core and/or auxiliary layer without separate patterning and etch processes. For example, the patterns may be formed by imprinting and subsequently hardening or curing of the imprinted material.

Figure 15A:
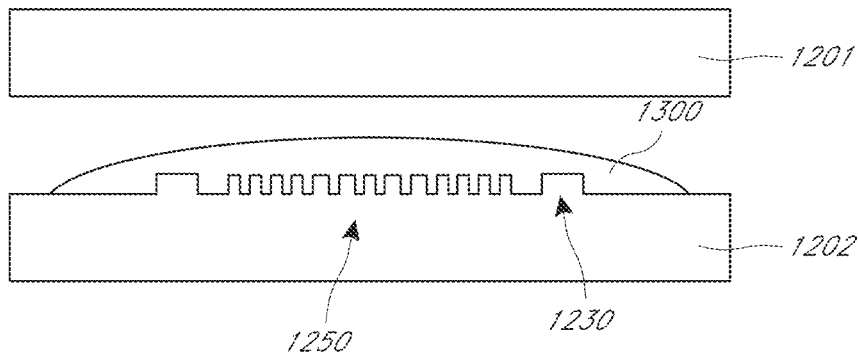
FIGS. 15A-15G illustrate an example of a method for forming a hybrid waveguide with spacers.
Figure 15B:
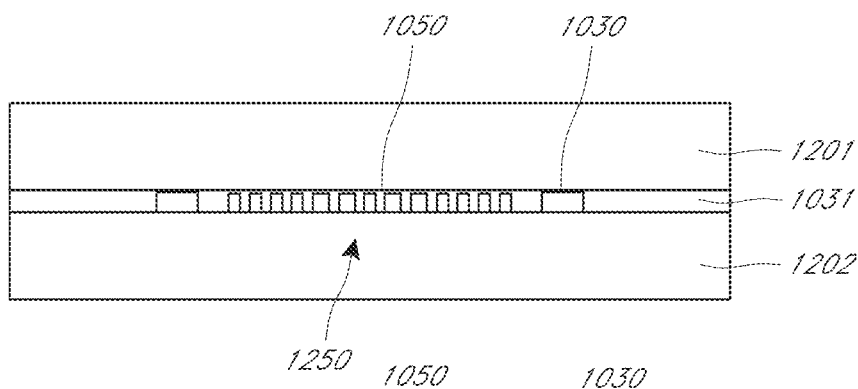
Figure 15C:
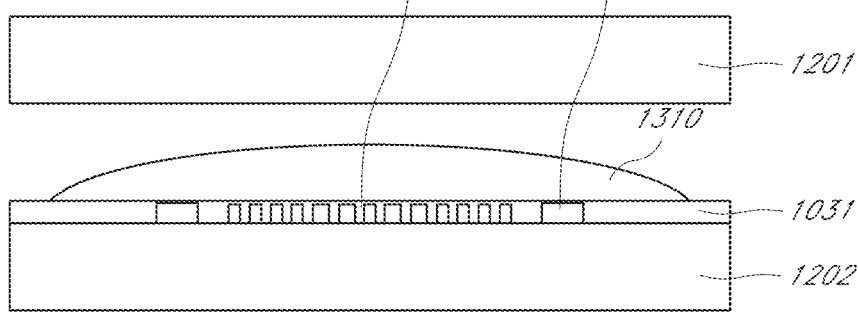
Figure 15D:
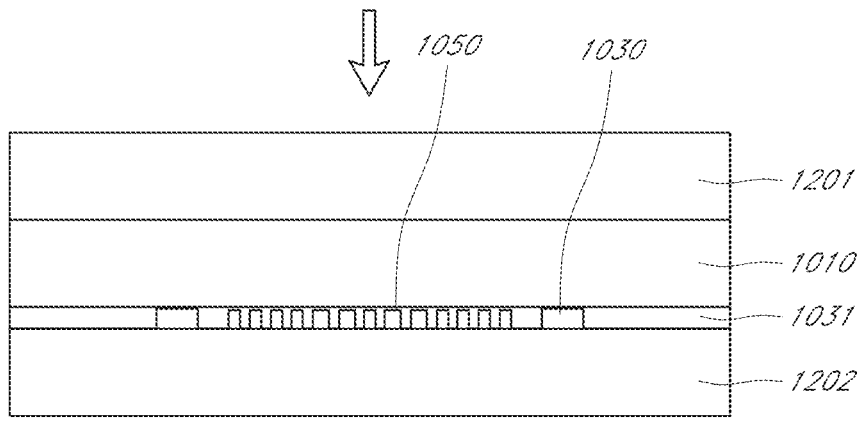
Figure 15E:
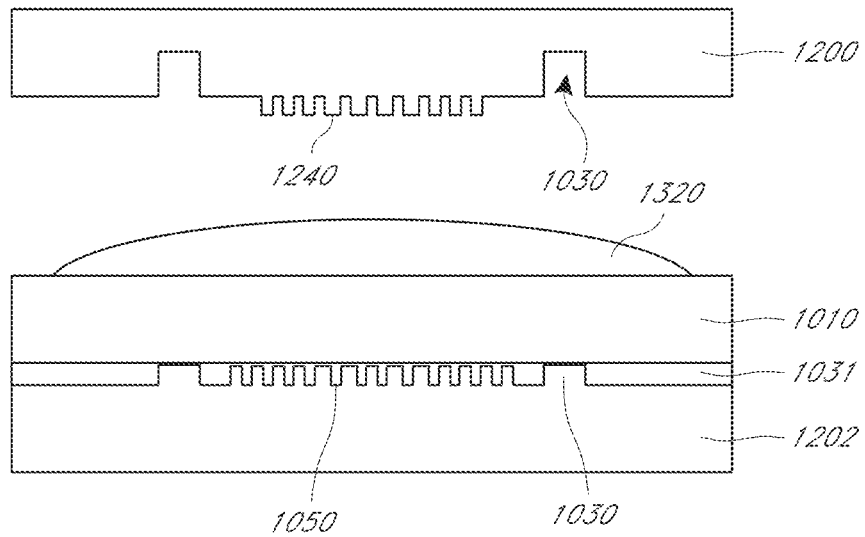
Figure 15F:
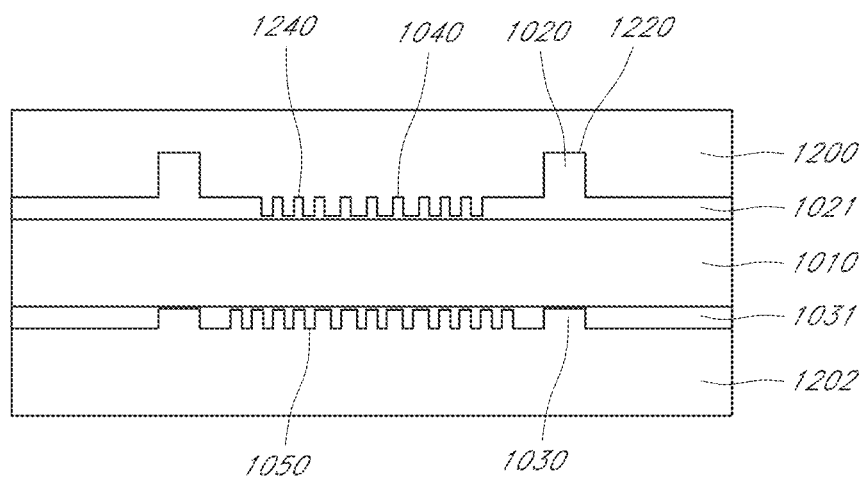
Figure 15G:
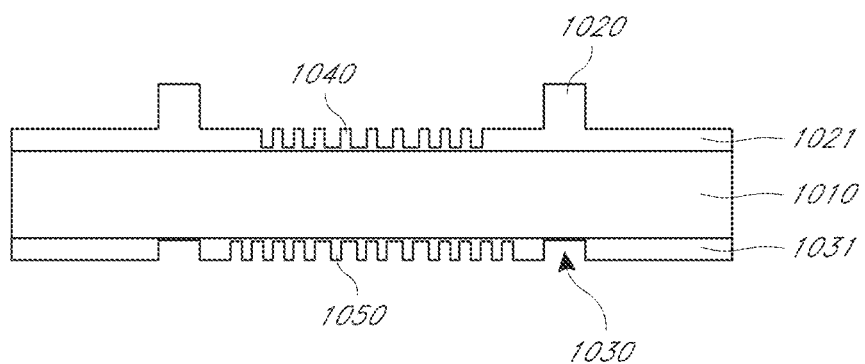

FIGS. 15A-15G illustrate a method of forming a hybrid waveguide with a core layer and overlying and underlying auxiliary layers. With reference to FIG. 15A, a pair of molds 1201, 1202 is provided, with the mold 1202 comprising a pattern of raised features 1250 for forming surface relief features in the auxiliary layer to be formed. A mass of material 1300 for forming the auxiliary layer is subsequently deposited on the mold 1202. With reference to FIG. 15B, the molds 1201, 1202 are moved closer together to compress the mass of material 1300 (FIG. 16A). The compressed material 1300 may be subjected to a curing process (e.g., by exposure to UV light), which hardens those materials to form a solid auxiliary layer 1031. With reference to FIG. 15C, the molds 1201 is separated from the auxiliary layer 1031 and a mass of core layer material 1310 is deposited on the auxiliary layer 1031. With reference to FIG. 15D, the molds 1201, 1202 are moved closer together to compress the mass of material 1310, thereby forming the core layer 1010. The compressed material may be subjected to a curing process (e.g., exposure to UV light), which hardens that material to form a solid core layer 1010. With reference to FIG. 15E, the mold 1201 is separated from the core layer 1010 and replaced with the mold 1200. The mold 1200 includes a pattern of protrusions 1240 for defining surface relief features in an additional auxiliary layer. An additional mass of material 1320 for forming the additional auxiliary layer is deposited on the core layer 1010. With reference to FIG. 15F, the molds 1200, 1202 are moved closer together to compress the mass of material 1320 (FIG. 16E) to define the auxiliary layer 1021. It will be appreciated that the pattern of features 1240 imprints the desired surface relief features 1040 in the auxiliary layer 1021. The compressed material forming the auxiliary layer 1021 may be subjected to a curing process to harden that material to form the solid auxiliary layer 1020. With reference to FIG. 15G, the molds 1200, 1202 are moved apart and a hybrid waveguide comprising the core layer 1010 and the auxiliary layers 1031, 1021 is released from the molds.

In some other embodiments, the core and auxiliary layers may be formed of different flowable materials which are immiscible. These materials may be deposited one on top of the other and then subsequently compressed and hardened. Further details regarding such a process are found in U.S. Application No. 62/651,507 filed on Apr. 2, 2018, entitled HYBRID POLYMER WAVEGUIDE AND METHODS FOR MAKING THE SAME.

With reference again to FIGS. 12A-12C and 15A-15G, it will be appreciated that the molds 1200, 1201, 1202 may be patterned with negatives of the spacers and the surface relief features to be formed. In addition, the molds preferably have sufficient rigidity to imprint features into the various flowable materials used to form the waveguides. Examples of materials for forming the molds include glass, fused silica, quartz, silicon, and metals.

Negatives of the spacers may be defined in these materials using various processes, depending upon whether the spacers have vertical or inclined sidewalls. For spacers with vertical sidewalls, the spacers, as seen in a top-down view, may first be patterned using lithography, e.g. by patterning a photoresist deposited on the material to be patterned, and then etched through the patterned photoresist using a directional etch. Examples of directional etches include dry etches such as RIE, ICP, sputter etching. In some other embodiments, a wet etch (e.g., comprising HF) may be utilized.

For spacers with inclined sidewalls, the negatives of the spacers may be formed using gray-scale lithography to pattern a three-dimensional shape in a resist layer as a mask, and the geometries of that shape are transferred into the underlying substrate (the mold material) by one or more dry etch techniques such as RIE, ICP, and sputter etching, or by wet etching. For silicon substrates, the inclined sidewall surfaces may also be fabricated using wet chemical etching. In some embodiments, the top-down view shapes/geometries may first be patterned in a resist layer using lithography, and then the substrate (the mold) is etched first using a dry etch, and then a wet etch. In the case of a silicon mold, the silicon wet etch may include KOH and TMAH.

Example Waveguide Structures for Reducing Propagation of Unutilized Light Out of the Waveguide As discussed herein, not all of the light propagating through a waveguide may be out-coupled as the light makes a single pass across the waveguide. The light which remains after propagating across the waveguide to an edge of the waveguide may be referred to as unutilized light. As also discussed herein, optical artifacts may result if this unutilized light were to propagate out of the waveguide. Various embodiments disclosed herein provide edge treatments which mitigate the recirculation of light within the waveguide after it contacts an edge or the area near an image, thereby reducing the likelihood that unutilized light will propagate out of the waveguide.

Figure 16:
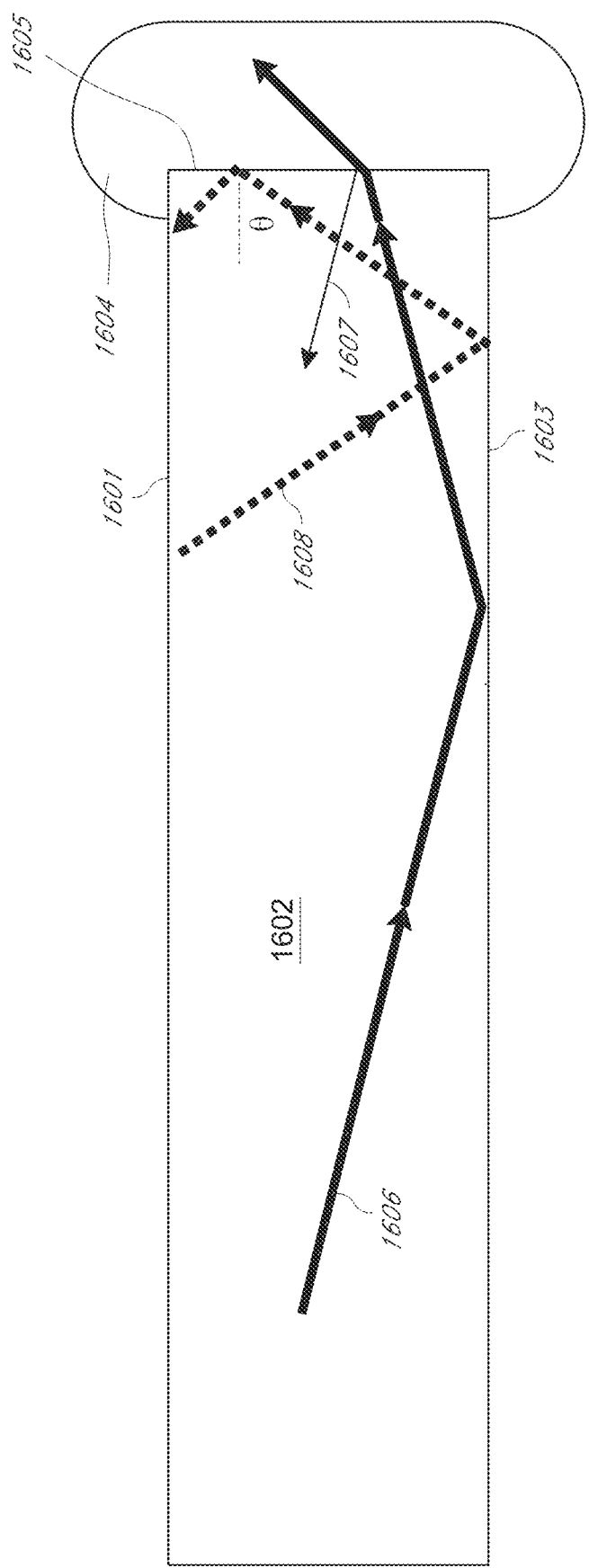
FIG. 16 illustrates an example of a waveguide having edges covered with absorbing material.

In some embodiments, the edge treatment may comprise light absorbing materials covering one or more images of a waveguide. Referring now to FIG. 16, an example of a waveguide 1602 having edges covered with light absorbing materials illustrated. The waveguide 1602 has a top major surface 1601 and bottom major surface 1603 and an edge 1605. The edge 1605 is covered with light absorbing material 1604. The light absorbing material 1604 may, in some embodiments, be a layer of light absorbing material applied on the edge of waveguide 1602 and may absorb unutilized light beams, as such light beams 1606 and 1608, that are travelling towards the edges. The unutilized light beams may include light beams that are not outcoupled from the waveguide 1602 to a viewer. The unutilized light beams may reflect off of the edge 1605 of the waveguide 1602, propagate back through the waveguide 1602, and then be outcoupled from waveguide 1602 (e.g., via outcoupling elements such as out-coupling optical elements 800, 810, 820 of FIG. 9B) as ghost images and/or stray light which decrease image quality.

With continued reference to FIG. 16, without the light absorbing material 1604, light beams, such as light beam 1608, that strike the edge of waveguide 1602 with relatively large incident angles may reflect back from the edge and reduce the contrast (e.g. by impinging on the top major surface 1601 of the waveguide at an angle such that the light escapes total internal reflection to propagate out of the waveguide 1602). Similarly, light beams having relatively small incident angles, such as light beam 1606, that exit out of the waveguide 1602 may still have some portion, such as reflection 1607, reflecting back into the waveguide due, as examples, to a difference in refractive index ($\Delta n = n_{waveguide} - n_{ink}$) between the waveguide 1602 forming an interface with the edge of the waveguide.

Without being limited by theory, it has been found that the refractive index (n) and the extinction coefficient (k) of an edge-applied light absorbing material, such as material 1604 applied to waveguide 1602, influence how well the by the absorbing material extracts and absorbs light from a waveguide. Simulations were performed for light absorption versus reflection for light beams striking an edge-applied light absorbing material, as a function of the extinction coefficient (k) of the light absorbing material and as a function of the angle of incidence (e.g., measured relative to a vector that is normal to the plane of the waveguide edge, shown in FIG. 16 as Θ, where light beam 1606 has a larger incident angle than light beam 1608). The simulations were performed for absorption of s-polarized light (e.g., transverse-electric TE polarized light) and absorption of p-polarized light (e.g., transverse-magnetic TM polarized light), and averages were obtained to determine an absorption average for s-polarized light and p-polarized light. The simulations assumed a waveguide having an index of refraction of 1.73. Some of the simulations assumed light absorbing material having an index of refraction of 1.55, while some of the simulations assumed light absorbing material having an index of refraction of 1.65. The simulation results indicated that light beams with higher incident angles (e.g., light beams that strike the light absorbing material 1604 relatively directly instead of in a glancing manner) are not fully absorbed and may be reflected. In particular, as incident angles increase beyond about 65 degrees, absorption drops off and the light starts to reflect off of the edge 1605 (e.g., due to the difference in index of refraction between waveguide 1602 and the light absorbing material 1604). The simulation results also indicate that increasing the extinction coefficient, k, of the light absorbing material 1604 boosts the absorption of higher-incident-angle light beams, but the boost is relatively limited (e.g., absorption at k=0.05 is only about 50% higher than absorption at k=0.005, all other factors being constant).

Again, without being limited by theory, the simulation results indicate that the light absorbing material having an index of refraction of 1.65 significantly outperformed the light absorbing material having an index of refraction of 1.55. This is believed to be due to the lower difference in index of refraction between the waveguide and the light absorbing material. Thus, the simulation results illustrate that, to improve light absorption by the light absorbing material 1604, it is helpful to reduce the difference in indices of refraction of the waveguide 1602 and the light absorbing material 1604 and also helpful, but to a lesser extent, to utilize a light absorbing material 1604 with a high extinction coefficient (k). In some embodiments, the difference in indices of refraction of the waveguide 1602 and the light absorbing material 1604 is 0.2 or less. In addition, in some embodiments, the light absorbing material 1604 has an extinction coefficient (k) of at least 0.02.

It will be appreciated that the above discussion relates to a single interaction of light beams and with the edge 1605 and the light absorbing material 1604. To further improve absorption of light beams into the light absorbing material, the coverage area of the light absorbing material may be increased as illustrated in FIGS. 17 and 18, in which the light absorbing material extends over a larger portion of the waveguide.

Figure 17:
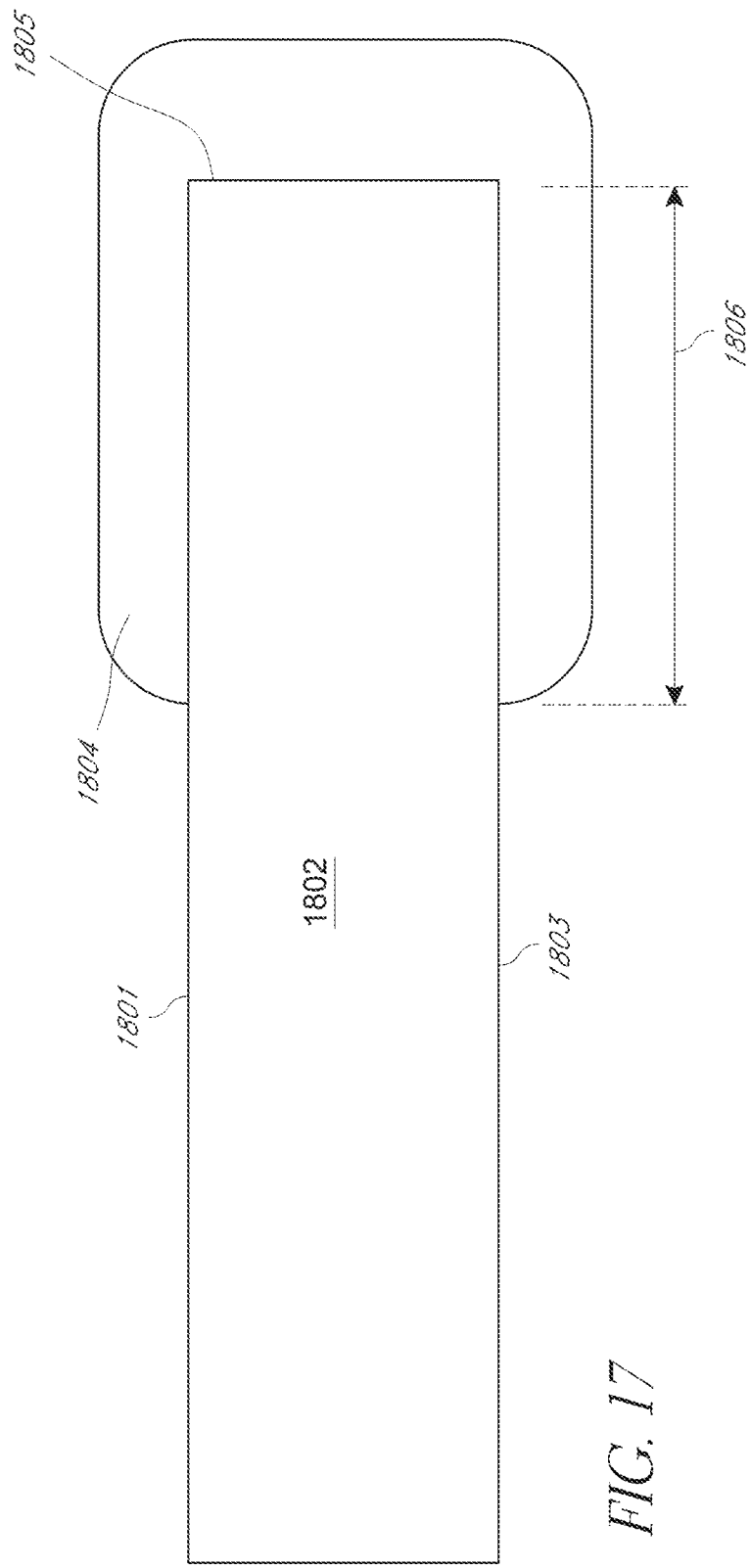
FIGS. 17-18 illustrate an example of a waveguide having light absorbing material extending on portions of top and bottom major surfaces of the waveguide.
Figure 18:
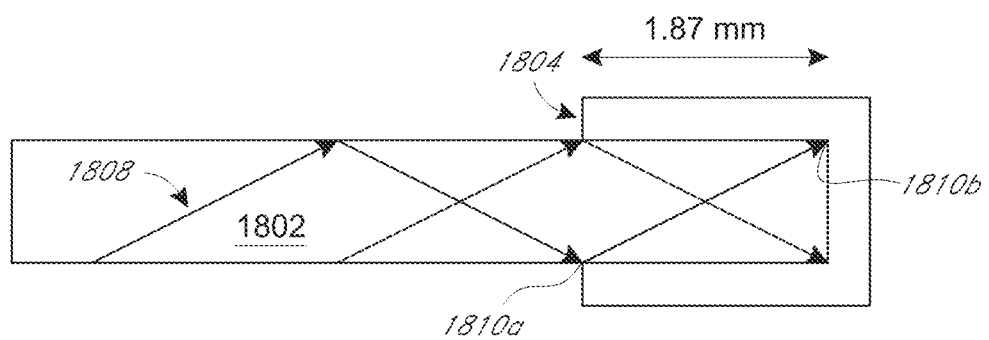

FIGS. 17-18 illustrate an example of a waveguide having light absorbing material extending on portions of top and bottom major surfaces 1801, 1803 of the waveguide 1802. As illustrated, light absorbing material 1804 that covers at least one edge 1805 of the waveguide 1802 and also extends over edge-adjacent portions of the top and bottom major surfaces 1801, 1803 of the waveguide. In particular, the light absorbing material 1804 may be formed on portions of the waveguide 1802 that extend for a particular distance, illustrated as length of blackening 1806, away from the edge 1805 of the waveguide 1802.

As shown in FIG. 18, extending the light absorbing material 1804 over the length 1806 can create multiple interactions between propagating light beams and the light absorbing material 1804, thus increasing absorption of the unutilized light beams. In particular, FIG. 18 illustrates how a particular light beam 1808 propagating within waveguide 1802 via total internal reflection (TIR) may interact with light absorbing material 1804 at point 1810a and also at point 1810b.

In general, the length 1806 needed to ensure that propagating light interacts with the light absorbing material 1804 multiple times may vary depending on the difference in index of refraction between the waveguide 1802 and adjacent materials (which may be air), the thickness of the waveguide 1802, the wavelengths of light passing through the waveguide 1802, a grating design (e.g., a design of outcoupling elements such as out-coupling optical elements 800, 810, 820 of FIG. 9B), the field of view of waveguide 1802, among other possible factors. FIG. 18 illustrates a particular example of blue light propagating via TIR inside glass having an index of refraction of 1.8 with air as an adjacent material, where a length of blackening of at least approximately 1.87 mm of black ink (with n=1.73) is sufficient to ensure multiple interactions. In some embodiments, the length 1806 may extend approximately 2 mm, approximately 5 mm, or between approximately 2-5 mm from the waveguide edge in order to effectively absorb a large portion of the propagating light that reaches the edge of the waveguide.

It has been determined that the thickness of an edge-applied light absorbing material, such as material 1604 applied to waveguide 1602 and material 1804 applied to waveguide 1802, influences well the material extracts and absorbs light from a waveguide. Studies of absorption of light by a light absorbing material such as black ink were performed for materials of three different indices of refraction (n=1.55, n=1.65, and n=1.73). Various simulations showed potential thicknesses of material that may be utilized to achieve a desired level of absorption (e.g., a certain minimum percentage of absorption, which may be at least 95% absorption) as a function of the incident angle and as the extinction coefficient was varied from approximately $7 \times 10^{-3}$ to approximately $10 \times 10^{-3}$. In general, larger thicknesses of material achieved a desired level of absorption when the incident angle is low (e.g., when light strikes the material relatively perpendicularly) as compared to when the incident angle is high (e.g., when light strikes the material in a glancing manner). Additionally, larger thicknesses of material achieved the desired level of absorption when the extinction coefficient is lower, however, the absorption rates were less dependent on the extinction coefficient than on the incident angle. The simulations further indicated that a material thickness of approximately 20 µm may be utilized to achieve advantageously high levels of absorption for a range of simulated incident angles (e.g., approximately 20 degrees from perpendicular to approximately 70 degrees from perpendicular) and a desired range of simulated extinction coefficients (e.g., extinction coefficients from approximately $7 \times 10^{-3}$ to approximately $10 \times 10^{-3}$). In some embodiments, the light absorbing material has a thickness of 20 µm or more.

Any suitable material may be used as edge-applied light absorbing or blackening material (e.g., material 1604 applied to waveguide 1602 and material 1804 applied to waveguide 1802). As examples, edge-applied light absorbing or blackening materials may include thin film materials such as fullerene, graphene, amorphous silicon, germanium, etc., which may be deposited on a waveguide surface by physical or chemical vapor deposition or via other suitable processing deposition processes; black inks including low viscosity black ink such as black inkjet available from Nazdar of Shawnee, Kans., which may be applied by inkjet printing or other suitable methods; and light absorbing additives dispersed or dissolved in a polymer (e.g., an UV curable polymer resin), such as carbon black, carbon nanopowder, carbon nanotubes, metallic nanoparticles, color dyes, pigments, phosphors, etc.

Figure 19:
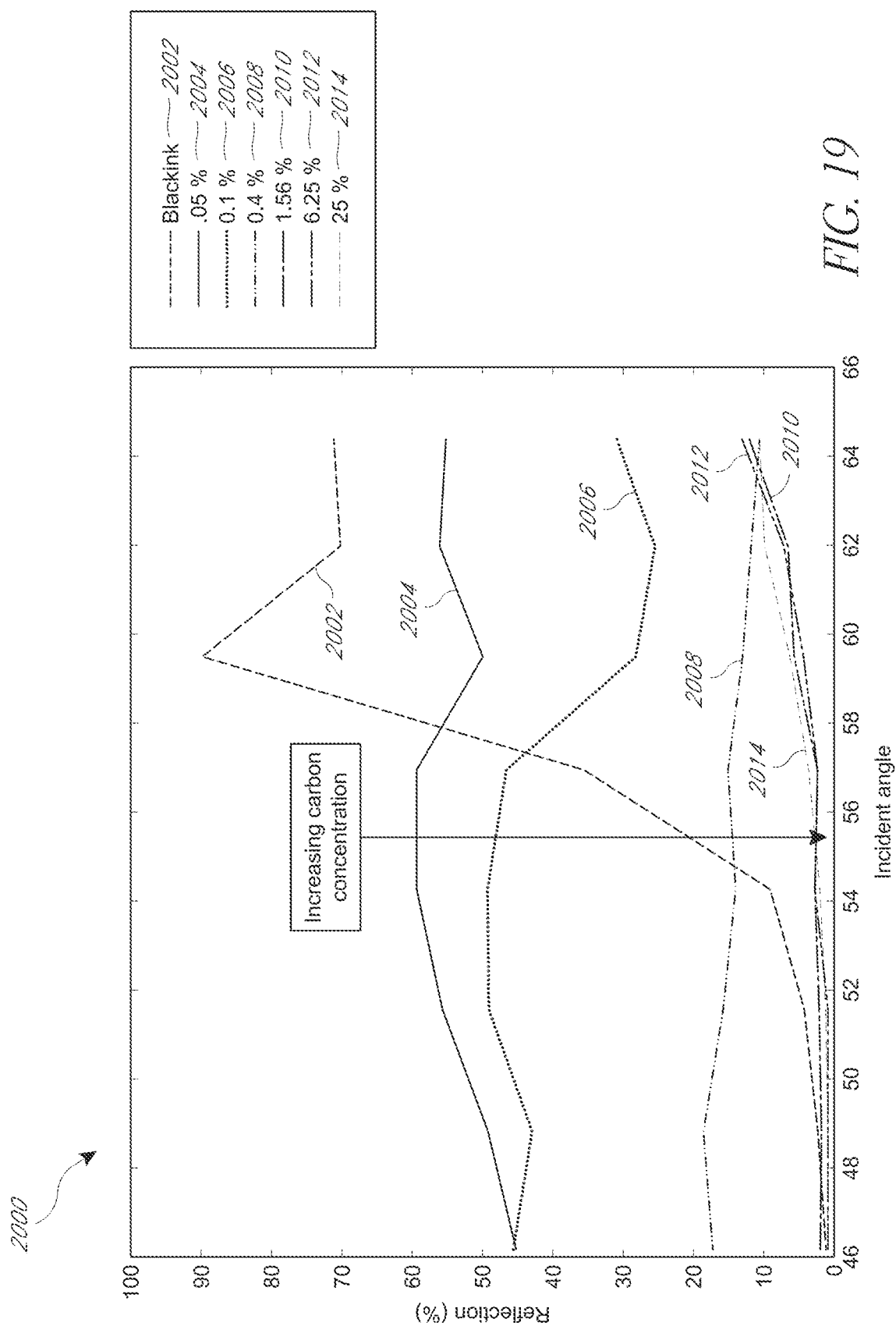
FIGS. 19-20 illustrate simulation results of light absorption as a function of incident angle for different absorbing materials.
Figure 20:
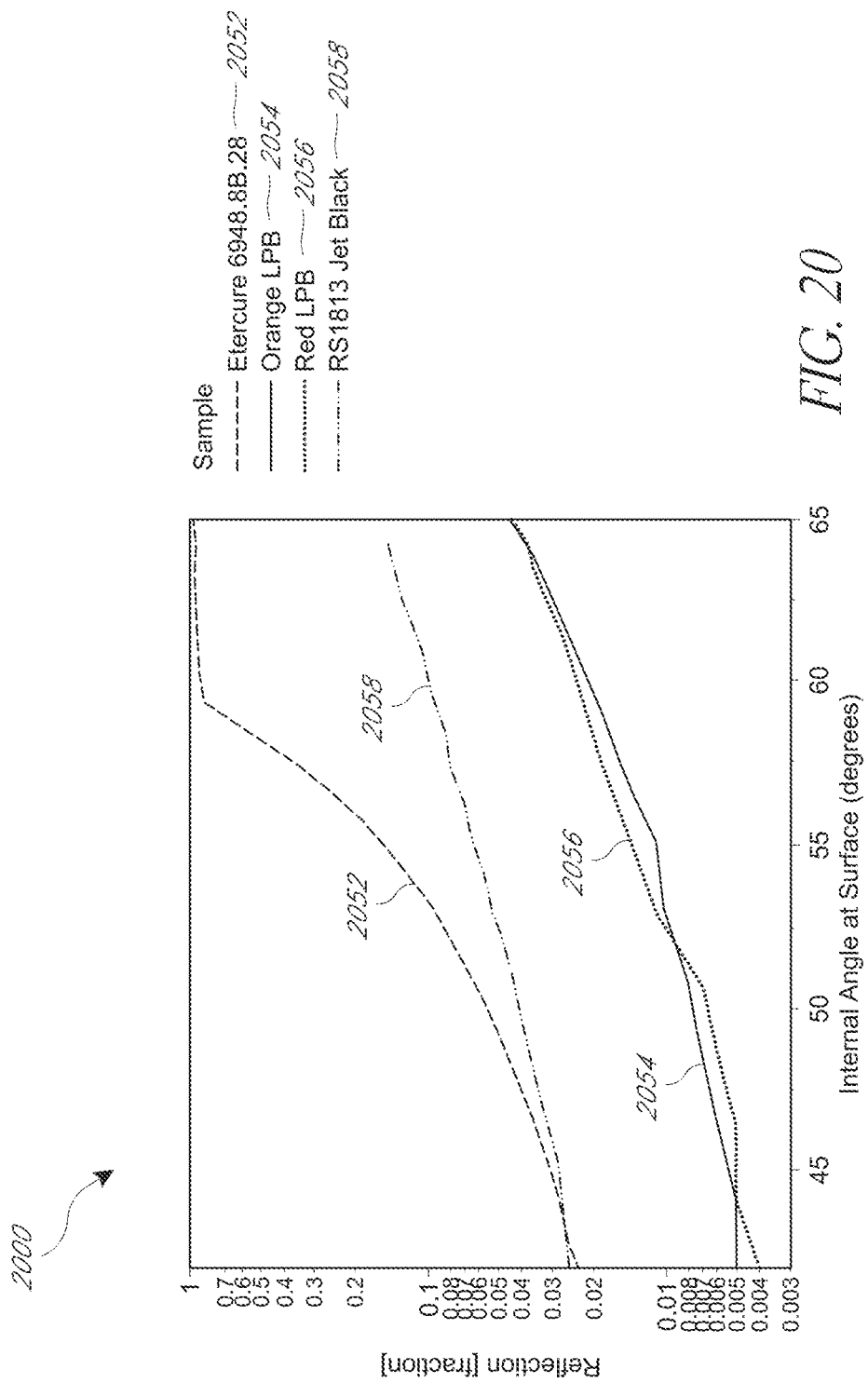

Simulation results of the reflection rates of various different light absorbing materials are shown in graph 2000 of FIG. 19 and graph 2050 of FIG. 20. The simulations of FIGS. 19 and 20, involve a single interaction of a light beam with the light absorbing materials.

The different light absorbing materials simulated for FIG. 19 include a plot 2002 for black ink and plots 2004, 2006, 2008, 2010, 2012, 2014 for varying concentrations of carbon nanopowder dispersed or dissolved in a resin. As shown by plot 2002 in FIG. 19, black ink has a low reflectance (e.g., a reflectance below 10% and thus an absorption rate of at least 90%) for incident angles below about 55 degrees. However, the reflectance of the black ink substantially increases above 55 degrees. As shown by plots 2004, 2006, 2008, 2010, 2012, and 2014, increasing the concentration of carbon in the light absorbing materials tends to decrease the reflectance, and thus increase the absorption rate, of the light absorbing materials. However, once a certain concentration of carbon is reached, the performance of the light absorbing materials levels off and further increases in carbon concentration to not further decrease reflectance. In particular, FIG. 19 illustrates that concentrations of approximately 1.56% carbon (plot 2010), 6.25% carbon (plot 2012), and 25% carbon (plot 2014) have relatively similar reflection and absorption performance across the simulated incident angles.

The different light absorbing materials simulated for FIG. 20 include a plot 2052 for etercure 6948.8B.28 (e.g., a blue dye), plot 2054 for orange LPB (e.g., an orange dye), plot 2056 for red LPB (e.g., a red dye), and plot 2058 for RS1813 jet black (e.g., a black dye). As shown in FIG. 20, the orange and red dyes are able to maintain reflection rates below 10% over the entire range of simulated incident angles, as seen in plots 2056 and 2058. In contrast, the blue dye has a reflection rate below 10% only for the simulated incident angles that are below approximately 53 degrees, as seen in plot 2054, and the black dye has a reflection rate below 10% only for the simulated incident angles that are below approximately 63 degrees, as seen in plot 2052.

Figure 21:
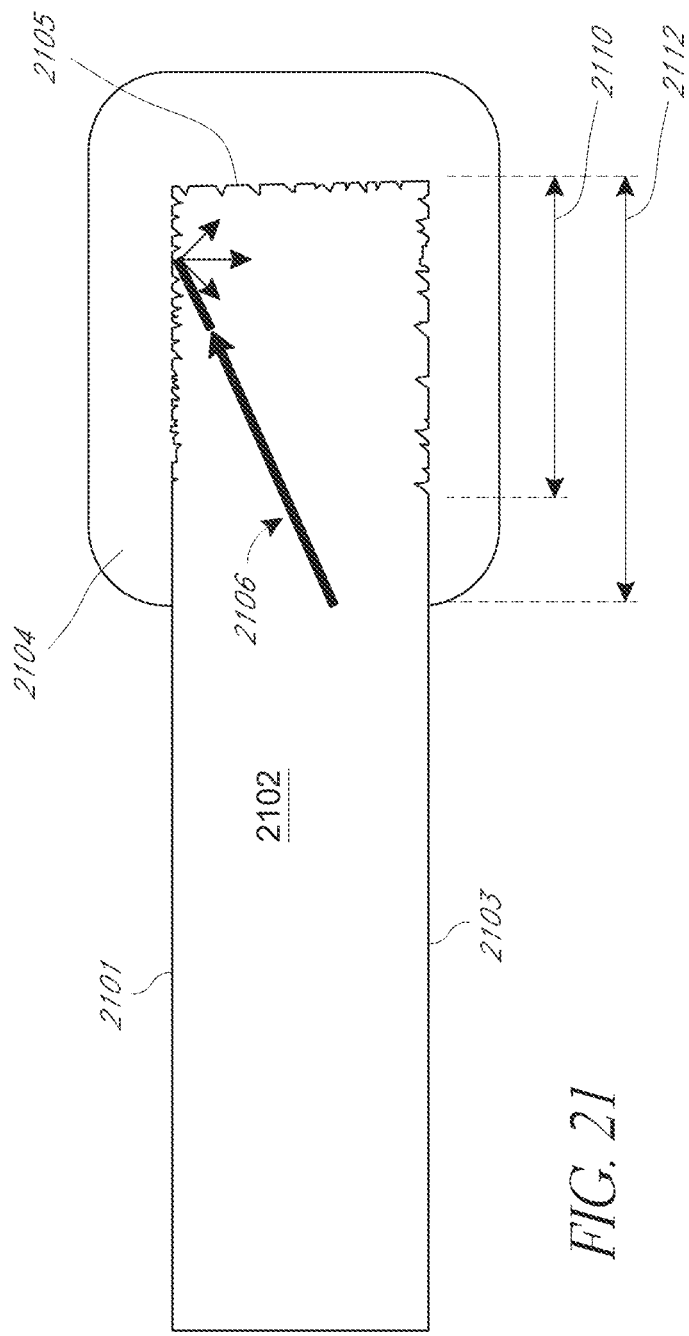
FIG. 21 illustrates an example of a waveguide having rough edges, which may be covered with absorbing materials.

Another technique for absorption and/or preventing reflection of light beams at the edge of a waveguide is roughening of a waveguide edge, as shown in FIG. 21. A waveguide 2100 may be roughened to provide an edge 2105 with a rough texture. In some embodiments, edge 2105 is covered with light absorbing material 2104. The waveguide 2102 may be roughed along its edge and also over top and bottom major surfaces 2101, 2103 extending away from the edge over a length of roughening 2110, which may be less than a length of blackening 2112 over which the light absorbing material 2104 is applied. In some embodiments, the length of roughening 2110 may be between 2 mm and 5 mm from the edge of waveguide 2100 and the length of blackening 2112 may extend from the waveguide edge to between 2 mm and 5 mm beyond the roughened area. Roughening the waveguide 2100 in this manner may help to diffuse propagating light, as shown by the scattering of light beam 2106 when it hits the roughened area of the waveguide 2100 with applied light absorbing material 2104. Without being limited by theory, the diffusion of light beams such as light beam 2106 may increase interaction between the light beam and the light absorbing material 2104, leading to increased rates of absorption overall.

The edges and adjacent surfaces of waveguide 2100 (extending in from the waveguide edge over length of roughing 2110) may be roughened by sanding the waveguides, by forming the waveguides with molds having a rough texture, or by other methods. Different grit sizes may be used to in sanding waveguides to different roughness. As examples, grit having P150-100 µm particles or grit having P2500-8.4 µm particles may be used in sanding waveguides to a desired roughness. Waveguides may be formed, sanded, or otherwise processed to have a surface roughness (Sa) of at least 1, in certain embodiments. In some embodiments, the surface roughness (Sa) is in a range of 1 to 100. In some embodiments, the waveguide may be roughened radially, such that less light is scattered back towards an active eyepiece area (e.g., away from the edge).

Figure 22A:
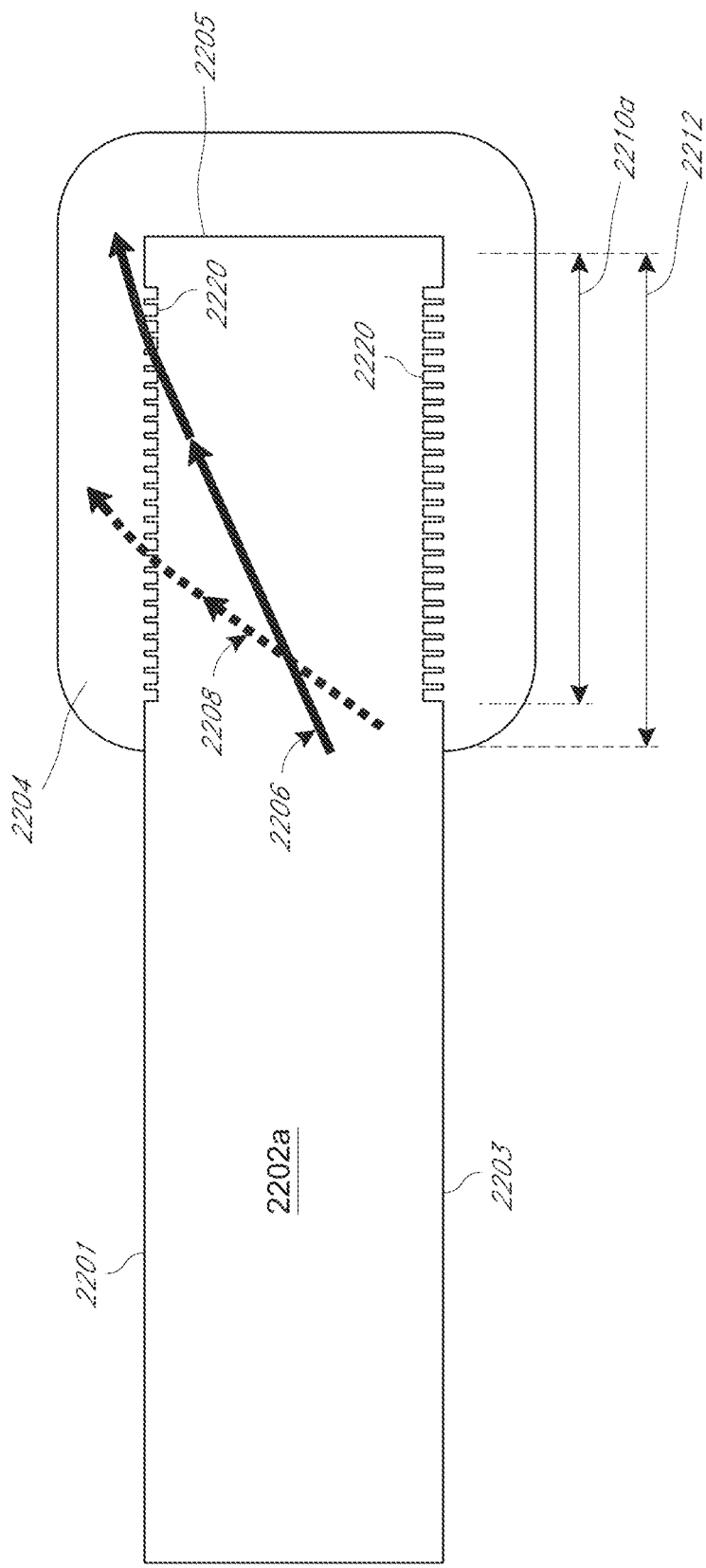
FIG. 22A illustrates an example of a waveguide having edges with out-coupling gratings and absorbing materials.
Figure 22B:
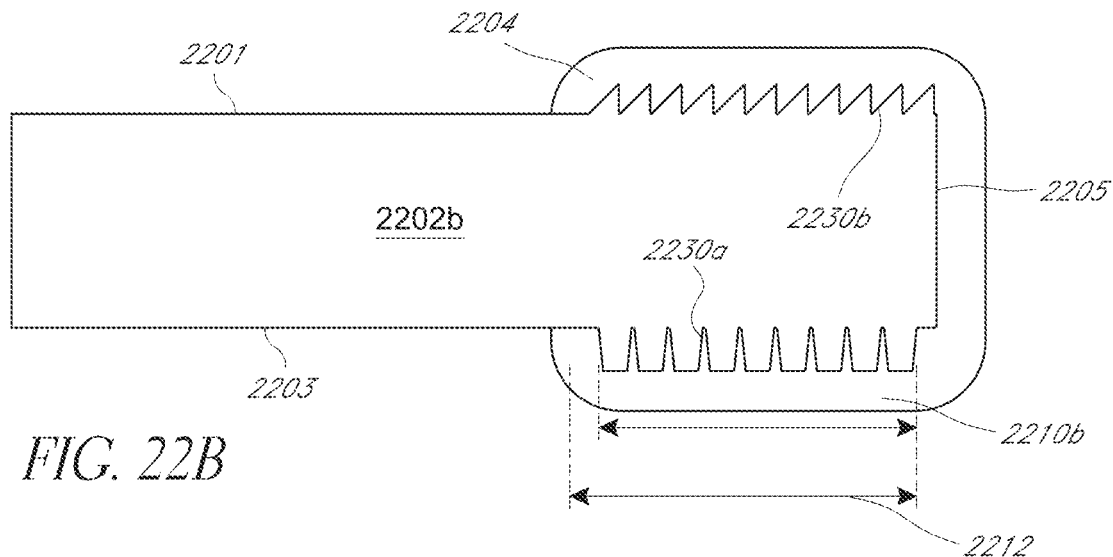
FIGS. 22B-22C illustrates an example of a waveguide having edges with light trapping structures and light absorbing materials.
Figure 22C:
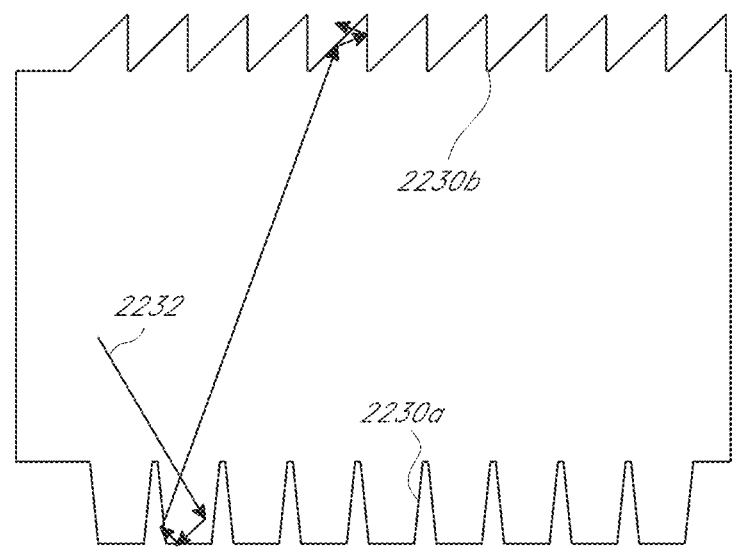

Additional techniques for improving the absorption of light beams at the edge of a waveguide include forming diffractive gratings, as shown in FIG. 22A, or light-trapping structures, as shown in FIGS. 22B and 22C, along the edges of a waveguide.

FIG. 22A illustrates a waveguide 2200a with an edge 2205 covered with light absorbing material 2204, the light absorbing material 2204 extending over an area of blackening 2212 on the top and bottom major surfaces 2201, 2203, where the waveguide 2202a includes out-coupling optical elements 2220 over an area of gratings 2210a extending on the top and bottom major surfaces 2201, 2203 of the waveguide 2202a. In some embodiments, the out-coupling optical elements 2220 are diffractive gratings. In some embodiments, waveguide 2202a may have out-coupling optical elements on its edge in addition or instead of having such gratings on the top and bottom major surfaces 2201, 2203 adjacent to the edge. In some embodiments, the light absorbing material 2204 may be omitted.

The out-coupling optical elements 2220 may, as an example, be out-coupling diffractive gratings that are configured to out-couple light propagating in waveguide 2202a such as light beams 2206 and 2208 into the light absorbing material 2204, where the light is absorbed. As an example, the area of gratings 2210a may extend out between 2 mm and 5 mm from the edge of waveguide 2202a (e.g., which may ensure that any light beams propagating in the waveguide interact with the gratings) and the area of blackening 2212 may further extend out between 2 mm and 5 mm from the area of gratings 2210a (e.g., which may facilitate the absorption of light, scattered by the gratings, by the light absorbing material 2204). The design of the gratings 2220 may vary depending on the indices of refraction of the waveguide 2202a and light absorbing materials 2204, the wavelength(s) of light propagating through the waveguide 2202a, and among other possible factors. In some embodiments, diffractive gratings 2220 may be formed in waveguide 2202a by patterning a mold in which the waveguide 2202a is formed. Diffractive gratings 2200 may, in some embodiments, be formed as part of and/or using the same fabrication techniques used in forming other diffractive elements disclosed herein, such as the out-coupling optical elements 800, 810, and 820 of FIG. 9B, and integral spacers, as disclosed herein.

FIG. 22B illustrates a waveguide 2202a with an edge 2205 covered with light absorbing material 2204 which also extends over an area of blackening 2212 on the top and bottom major surfaces 2201, 2203, where the top and bottom major surfaces 2201, 2203 of the waveguide 2202a include light trapping structures 2230a and/or 2230b over a light trapping area 2210b extending from the edge 2205. In some embodiments, waveguide 2202b may have light trapping structures on its edge in addition or instead of having such structures on the top and bottom major surfaces 2201, 2203 adjacent to the edge. In some embodiments, the light absorbing material 2204 may be omitted. The light trapping structures 2230a and 2230b may, as an example, be microstructures. As shown in FIG. 22C, a simulated light beam 2232 that enters the edge region of waveguide 2202b does not escape the edge region without multiple interactions, due to the shape and size of the light trapping structures 2230a and 2230b. As illustrated, during one of these interactions, light may escape the waveguide and propagate into the light absorbing material 2204 (FIG. 22B) light absorbing material 2204. Without being limited by theory, the light trapping structures 2230a and 2230b may advantageously increase the absorption of light.

In some embodiments, the area of light trapping 2210b may be between 2 mm and 5 mm from the edge of waveguide 2202b (e.g., which may increase the likelihood that light beams propagating in the waveguide interact with the light trapping structures) and the area of blackening 2212 may extend between 2 mm and 5 mm from the area of light trapping 2210b (e.g., which may increase the likelihood that that any light scattered by the light trapping structures is absorbed by the light absorbing material 2204). In some embodiments, light trapping structures such as structures 2230a and 2230b may be formed in waveguide 2202b by patterning a mold in which the waveguide 2202b is formed. Light trapping structures 2230a and 2230b may, in some embodiments, be formed as part of and/or using the same fabrication techniques used in forming diffractive elements disclosed herein, such as the out-coupling optical elements 800, 810, and 820 of FIG. 9B and integral spacers, as disclosed herein.

The design of the light trapping structures 2230a and 2230b may vary depending on the indices of refraction of the waveguide 2202b and light absorbing materials 2204, the wavelength(s) of light propagating through the waveguide 2202b, and among other factors. In some embodiments, the width and heights of the light trapping structures 2230a and 2230b ranges from 0.5 μm to 100 μm. As examples, the width and heights of the light trapping structures 2230a and 2230b may approximately 0.5 μm, approximately 1.0 μm, approximately 2.0 μm, approximately 4.0 μm, approximately 10.0 μm, approximately 20.0 μm, approximately 50 μm, approximately 75 μm, or approximately 100 μm, wherein approximately is understood to be within 0.4 μm.

It will be appreciated that any of the strategies for improving light absorption at the edge of a waveguide may be combined together. As an example, a waveguide may include light absorbing material on an edge and also extending inwardly from the waveguide edge (as disclosed in FIGS. 17 and 18), having a sufficient thickness for desired levels of light absorption, being made from materials as disclosed at least in FIGS. 19 and 20, and having any of a roughening of the waveguide surface (as disclosed in FIG. 21), diffractive gratings (as disclosed in FIG. 22A), and/or light trapping structures (as disclosed in FIGS. 22B and 22C).

Figure 23:
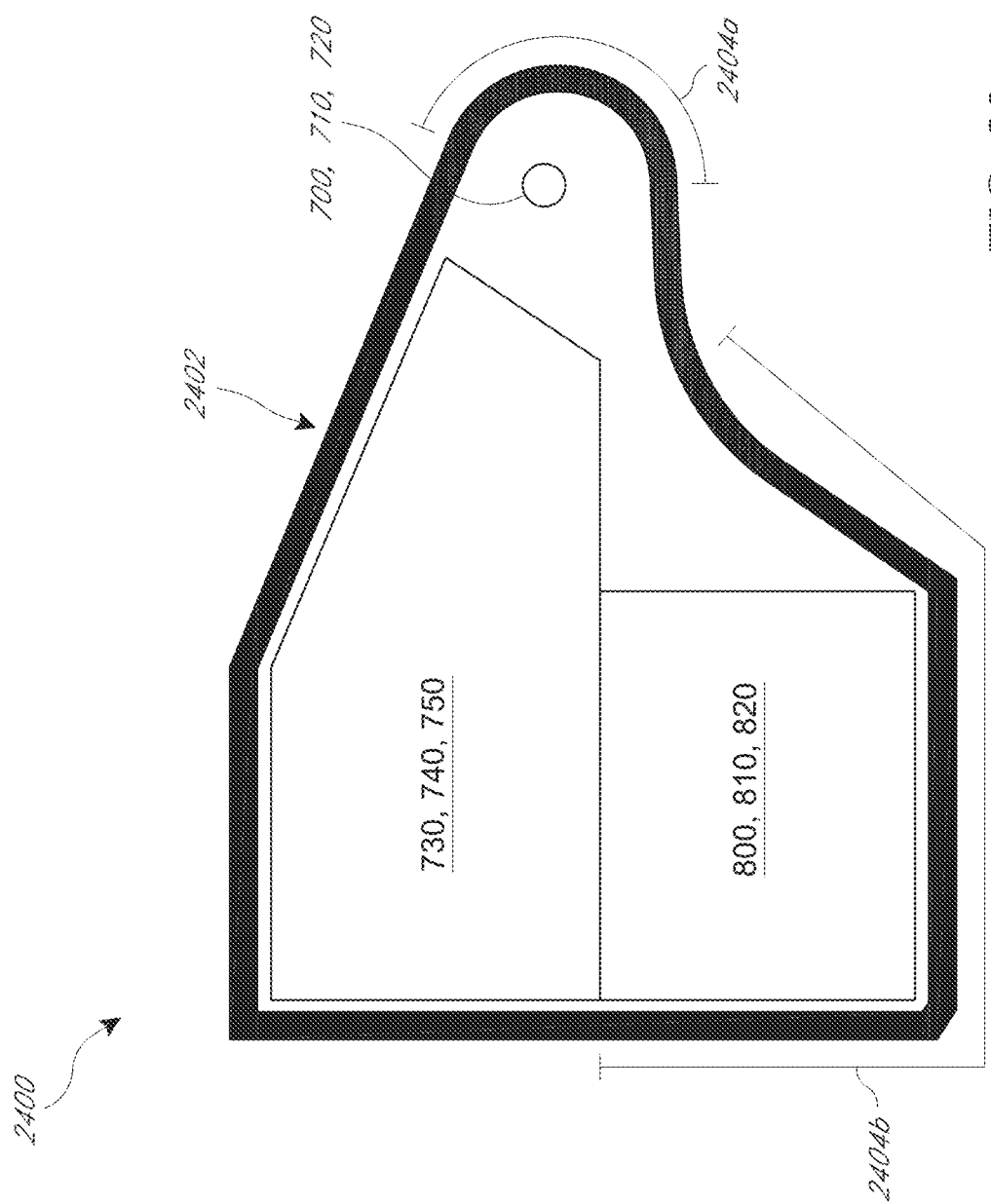
FIG. 23 illustrates edges of examples of the placement of light absorbing materials along edges of a waveguide.

FIG. 23 illustrates edges 2404a, 2404b of a waveguide 2400 that have higher levels of unutilized light. The strategies disclosed herein for improving light absorption at the edge of a waveguide may be applied to all of the edges of a waveguide or, in some embodiments, may be applied only to the areas of the waveguide expected to have higher levels of unutilized light relative to other areas of the waveguide. For example, the edges 2404a, 2404b of FIG. 23 may be considered to have high levels of unutilized light. The areas with the high levels of unutilized light may be the areas of the waveguide in which relatively high amounts of light reach the waveguide edge without being out-coupled. Such unutilized light, if not absorbed at the edge, could potentially reflect back into an active display region and create undesirable ghost images or stray light, thus lowering image quality. In some embodiments, the area of waveguide 2400 with the high levels of unutilized light include edges 2404a adjacent to the in-coupling optical elements 700, 710, 720. The edges 2404a are on a side of the in-coupling optical elements 700, 710, 720 opposite to the direction in which light is directed by the in-coupling optical elements 700, 710, 720 for eventual out-coupling. Another area with high levels of unutilized light includes the edges 2404b adjacent to the out-coupling optical elements 800, 810, 820. Light in this area includes light that has propagated across the out-coupling optical elements 800, 810, 820 without being out-coupled. It will be appreciated that light incident on these edges is unutilized since the light was not out-coupled after passing through these optical elements intended for out-coupling. In contrast, edges adjacent to the light distributing elements 730, 740, 750 may have relatively low levels of unutilized light and thus may not benefit as much from the light absorption strategies described herein.

As noted herein, it will be appreciated that the various waveguides 1602, 1802, 2102, 2202a, and 2202b of FIGS. 16-18 and 21-23 may include one or more integral spacers and/or indentations for accommodating a spacer. In addition, in some embodiments, the waveguides 1602, 1802, 2102, 2202a, and 2202b may be part of a stack of waveguides, each of which may include an integral spacer and indentation for accommodating an underlying spacer from an underlying waveguide, which also includes an integral spacer.

Figure 24:
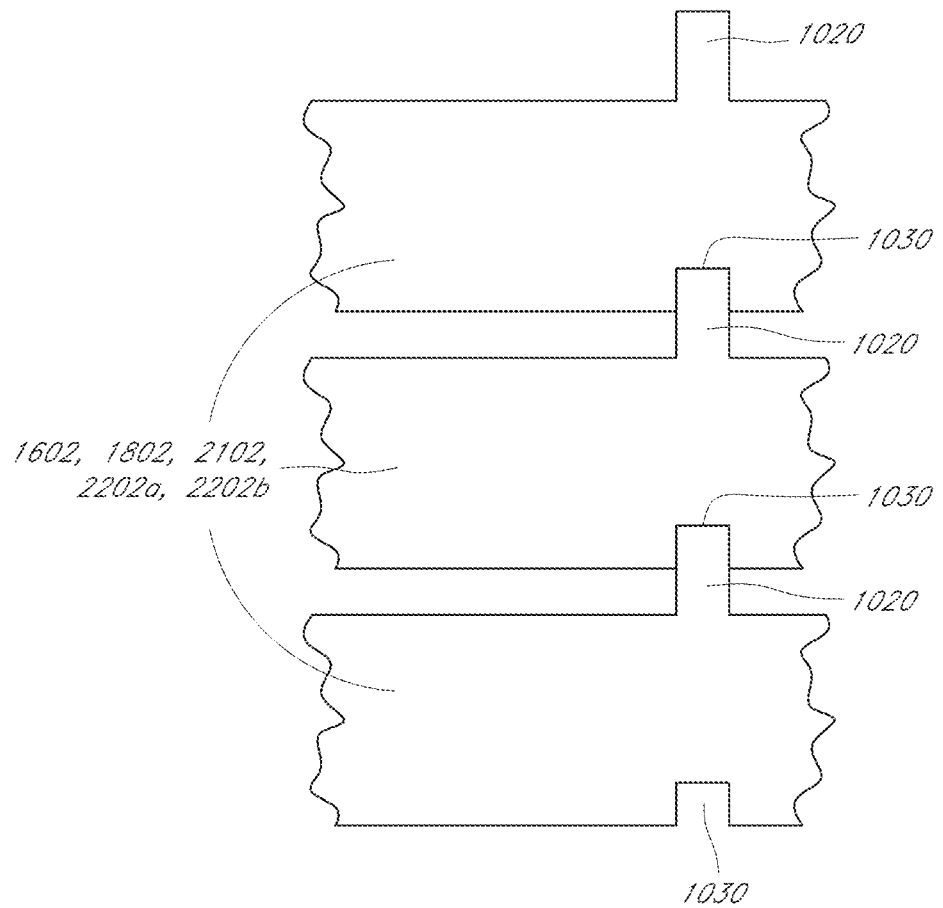
FIG. 24 illustrates a stack of waveguides with integral spacers.

FIG. 24 illustrates a stack of waveguides with integral spacers. The illustrated individual waveguides may be any of the waveguides 1602, 1802, 2102, 2202a, 2202b which are also illustrated in FIGS. 16-18 and 21-23. It will be appreciated that only the portions of the waveguides 1602, 1802, 2102, 2202a, 2202b having an integral spacer 1020 and/or indentation 1030 are shown in this figure for clarity. The remainder of the waveguides 1602, 1802, 2102, 2202a, and 2202b are shown in the corresponding one of FIGS. 16-18 and 21-23, and may include various edge treatments (e.g., light absorbing material, rough textures, out-coupling optical elements, light-trapping microstructures) as disclosed herein. In some embodiments, the waveguides 1602, 1802, 2102, 2202a, 2202b each have one or more integral spacers 1020 configured to provide separation between that waveguide and an immediately neighboring, overlying waveguide. Thus, as illustrated, the waveguides 1602, 1802, 2102, 2202a, 2202b with integral spacers may form a waveguide stack (e.g., corresponding to the waveguide stack 660 of FIGS. 9A-9C). In some embodiments, each of the waveguides 1602, 1802, 2102, 2202a, 2202b of the waveguide stack may be similar (e.g., have similar edge treatments). In some other embodiments, the waveguides forming the waveguide stack may have different edge treatments (e.g., different ones of the waveguides 1602, 1802, 2102, 2202a, 2202b from FIGS. 16-18 and 21-23 may be utilized in different positions within the waveguide stack).

It will be appreciated that the integral spacers 1020 and/or indentations 1030 of the waveguides 1602, 1802, 2102, 2202a, and 2202b may be formed and have shapes and orientations as described above regarding FIGS. 10A-15G. For example, in some embodiments, the waveguides 1602, 1802, 2102, 2202a, 2202b and integral spacers 1020 may be formed of a polymer material that may be molded (e.g., using an imprint mold) to define the integral spacers 1020. In addition, as discussed herein, the mold may include relief features for defining one or more of in-coupling optical elements, out-coupling optical elements, rough surface textures on and adjacent an edge 2105 (FIG. 21), out-coupling optical elements 2220 (FIG. 22A), and light trapping structures 2230a and/or 2230b (FIGS. 22B and 22C).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display system comprising a stack of waveguides, the stack of waveguides comprising:
    a first waveguide comprising an optically transmissive body, a first major surface, and a spacer integral with the optically transmissive body, the spacer extending vertically from the first major surface;
    a second waveguide comprising an optically transmissive body and a second major surface, the second major surface facing and spaced apart from the first major surface of the first waveguide by the spacer; and
    an adhesive provided on a top surface of the spacer, the adhesive attaching the spacer to the second major surface of the second waveguide,
    wherein the adhesive has an as-deposited viscosity of 10 mPa·s to 100 mPa·s,
    wherein the adhesive constitutes a first adhesive,
    wherein the stack of waveguides further comprises a second adhesive forming an adhesive mass extending between and attaching the first major surface of the first waveguide to the second major surface of the second waveguide,
    wherein the first adhesive and the second adhesive have different viscosities, and
    wherein the second adhesive has an as-deposited viscosity of 10,000 mPa·s to 50,000 mPa·s.

2. The display system of claim 1, wherein the spacer extends along a perimeter of the first waveguide.

3. The display system of claim 1, wherein the spacer defines an edge of the stack.

4. The display system of claim 1, wherein the second adhesive is located peripherally to the spacer on the first major surface of the first waveguide.

5. The display system of claim 1, wherein the first waveguide further comprises one or more diffractive optical elements in an area of the first major surface interior of the spacer.

6. The display system of claim 5, wherein the first major surface of the first waveguide further comprises an adhesive-trapping depression between the one or more diffractive optical elements and the adhesive.

7. The display system of claim 1, wherein the adhesive is disposed on the top surface and on lateral sides of the spacer.

8. The display system of claim 1, wherein the first waveguide comprises a plurality of spacers.

9. The display system of claim 1, wherein one or more surfaces contacting the adhesive are rough.

10. The display system of claim 9, wherein the one or more surfaces are nanotextured.

11. The display system of claim 9, further comprising an adhesive flow barrier extending along two or more sides of the top surface, the adhesive flow barrier defining a central volume occupied by the adhesive.

12. The display system of claim 1, wherein the spacer comprises one or more vent holes extending laterally through the spacer.

13. The display system of claim 12, wherein the first waveguide comprises a plurality of spacers, wherein each spacer comprises one or more vent holes.

14. The display system of claim 13, wherein pairs of spacers of spacers of the plurality of spacers are laterally elongated alongside one another, wherein the stack of waveguides further comprises one or more debris trapping structures located in a volume between adjacent pairs spacers of the plurality of spacers.

15. The display system of claim 1, wherein the spacer is located in an interior area of the first major surface of the first waveguide.

16. The display system of claim 15, wherein the spacer comprises a single point contact spacer having a maximum transverse cross-sectional dimension of 500 μm or less.

17. The display system of claim 1, wherein the second major surface of the second waveguide comprises an indentation accommodating the spacer in the indentation.

18. The display system of claim 17, wherein the stack of waveguides comprises a plurality of waveguides, wherein two or more waveguides of the plurality of waveguides comprise a spacer and an indentation, wherein the indentations accommodate spacers of underlying waveguides.

19. The display system of claim 1, wherein the spacer comprises a shape selected from the group consisting of rectangular prism, rectangular pyramid, triangular prism, triangular pyramid, cylinder, and cone.

20. The display system of claim 1, wherein the adhesive comprises a light absorber.

21. The display system of claim 20, wherein the adhesive is doped with a black colorant.

22. The display system of claim 1, wherein the first and the second waveguide are separated by an air gap having a size defined by the spacer and adhesive.

23. The display system of claim 1, wherein the adhesive has a refractive index greater than 1.65.

24. The display system of claim 1, wherein the first and second waveguides each comprise:
    in-coupling optical elements configured to in-couple incident image light; and
    out-coupling optical elements configured to out-couple the in-coupled image light.

25. The display system of claim 24, further comprising a light projector system configured to project the image light to the in-coupling optical elements.

26. The display system of claim 1, wherein the spacer comprises a light absorbing material.

27. A display system comprising a stack of waveguides, the stack of waveguides comprising:
    a first waveguide comprising an optically transmissive body, a first major surface, and a spacer integral with the optically transmissive body, the spacer extending vertically from the first major surface;
    a second waveguide comprising an optically transmissive body and a second major surface, the second major surface facing and spaced apart from the first major surface of the first waveguide by the spacer; and
    an adhesive provided on a top surface of the spacer, the adhesive attaching the spacer to the second major surface of the second waveguide,
    wherein the adhesive has an as-deposited viscosity of 10 mPa·s to 100 mPa·s,
    wherein the first waveguide further comprises one or more diffractive optical elements in an area of the first major surface interior of the spacer, and
    wherein the first major surface of the first waveguide further comprises an adhesive-trapping depression between the one or more diffractive optical elements and the adhesive.

28. The display system of claim 27, wherein the adhesive is disposed on the top surface and on lateral sides of the spacer.

29. The display system of claim 27, further comprising an adhesive flow barrier extending along two or more sides of the top surface, the adhesive flow barrier defining a central volume occupied by the adhesive.

30. The display system of claim 27, wherein the spacer comprises one or more vent holes extending laterally through the spacer.

31. The display system of claim 27, wherein the spacer is located in an interior area of the first major surface of the first waveguide.

32. The display system of claim 27, wherein the second major surface of the second waveguide comprises an indentation accommodating the spacer in the indentation.

33. The display system of claim 27, wherein the adhesive comprises a light absorber.

34. A display system comprising a stack of waveguides, the stack of waveguides comprising:
- a first waveguide comprising an optically transmissive body, a first major surface, and a spacer integral with the optically transmissive body, the spacer extending vertically from the first major surface;
- a second waveguide comprising an optically transmissive body and a second major surface, the second major surface facing and spaced apart from the first major surface of the first waveguide by the spacer;
- an adhesive provided on a top surface of the spacer, the adhesive attaching the spacer to the second major surface of the second waveguide; and
- an adhesive flow barrier extending along two or more sides of the top surface, the adhesive flow barrier defining a central volume occupied by the adhesive,
- wherein the adhesive has an as-deposited viscosity of 10 mPa·s to 100 mPa·s,
- wherein one or more surfaces contacting the adhesive are rough.

35. The display system of claim 34, wherein the adhesive is disposed on the top surface and on lateral sides of the spacer.

36. The display system of claim 34, further comprising an adhesive flow barrier extending along two or more sides of the top surface, the adhesive flow barrier defining a central volume occupied by the adhesive.

37. The display system of claim 34, wherein the spacer comprises one or more vent holes extending laterally through the spacer.

38. The display system of claim 34, wherein the spacer is located in an interior area of the first major surface of the first waveguide.

39. The display system of claim 34, wherein the second major surface of the second waveguide comprises an indentation accommodating the spacer in the indentation.

40. The display system of claim 34, wherein the adhesive comprises a light absorber.

41. A display system comprising a stack of waveguides, the stack of waveguides comprising:
- a first waveguide comprising an optically transmissive body, a first major surface, and a spacer integral with the optically transmissive body, the spacer extending vertically from the first major surface;
- a second waveguide comprising an optically transmissive body and a second major surface, the second major surface facing and spaced apart from the first major surface of the first waveguide by the spacer; and
- an adhesive provided on a top surface of the spacer, the adhesive attaching the spacer to the second major surface of the second waveguide,
- wherein the adhesive has an as-deposited viscosity of 10 mPa·s to 100 mPa·s,
- wherein the spacer comprises one or more vent holes extending laterally through the spacer.

42. The display system of claim 41, wherein the first waveguide comprises a plurality of spacers, wherein each spacer comprises one or more vent holes.

43. The display system of claim 42, wherein pairs of spacers of spacers of the plurality of spacers are laterally elongated alongside one another, wherein the stack of waveguides further comprises one or more debris trapping structures located in a volume between adjacent pairs spacers of the plurality of spacers.

44. The display system of claim 41, wherein the adhesive is disposed on the top surface and on lateral sides of the spacer.

45. The display system of claim 41, further comprising an adhesive flow barrier extending along two or more sides of the top surface, the adhesive flow barrier defining a central volume occupied by the adhesive.

46. The display system of claim 41, wherein the spacer is located in an interior area of the first major surface of the first waveguide.

47. The display system of claim 41, wherein the second major surface of the second waveguide comprises an indentation accommodating the spacer in the indentation.

48. The display system of claim 41, wherein the adhesive comprises a light absorber.

* * * * *